United States Patent [19]
Sutphin

[11] Patent Number: 5,109,403
[45] Date of Patent: Apr. 28, 1992

[54] SYSTEM FOR PROGRAMMING OF FEATURES OF A MOBILE CELLULAR TELEPHONE UNIT

[75] Inventor: Melvin W. Sutphin, Scottsdale, Ariz.

[73] Assignees: Goldstar Products Co., Limited, Scottsdale, Ariz.; Goldstar Telecommunication Co., Ltd., Seoul, Rep. of Korea

[21] Appl. No.: 522,372

[22] Filed: May 11, 1990

[51] Int. Cl.$^5$ ............................................. H04M 11/00
[52] U.S. Cl. ........................................ 379/59; 379/62; 379/63
[58] Field of Search ..................... 379/57-60, 379/63, 210-213, 200, 216, 157, 354, 355, 62, 168

[56] References Cited

U.S. PATENT DOCUMENTS

| | | | |
|---|---|---|---|
| 4,718,082 | 1/1988 | Parker et al. | 379/355 |
| 4,817,190 | 3/1989 | Comroe et al. | 379/63 |
| 4,860,336 | 8/1989 | D'Avello et al. | 379/63 |
| 4,939,768 | 7/1990 | Inaba et al. | 379/58 |
| 4,947,422 | 8/1990 | Smith et al. | 379/200 |

FOREIGN PATENT DOCUMENTS 0214126 10/1985 Japan ........................................ 379/63

Primary Examiner—James L. Dwyer
Assistant Examiner—Dwayne D. Bost
Attorney, Agent, or Firm—Cahill, Sutton & Thomas

[57] ABSTRACT

A system for programming software feature switches in a mobile telephone, wherein a host computer initiates a first call to the mobile telephone, thereby causing a cell site facility to broadcast an initiate signal via a digital paging channel. A processor in the mobile telephone monitors the paging channel. An alert signal is generated in the mobile telephone in response to the initiate signal, and an answer signal is generated in the mobile telephone if the subscriber answers the first call. The first processor causes first acknowledge signal to be broadcast via the paging channel in response to the answer signal, to thereby cause the cell site facility to complete a voice channel connection between the mobile telephone and a modem of the host computer. A tone generator associated with the host computer generates a distinct tone on the voice channel, which is detected by the mobile telephone. The processor of the mobile telephone then establishes a programming mode and sends a second acknowledge signal to the host computer. The host computer then broadcasts feature switch data via the voice channel. The processor of the mobile telephone monitors and/or writes feature switch data received from the voice channel into a plurality of the software feature switches in the mobile telephone.

15 Claims, 4 Drawing Sheets

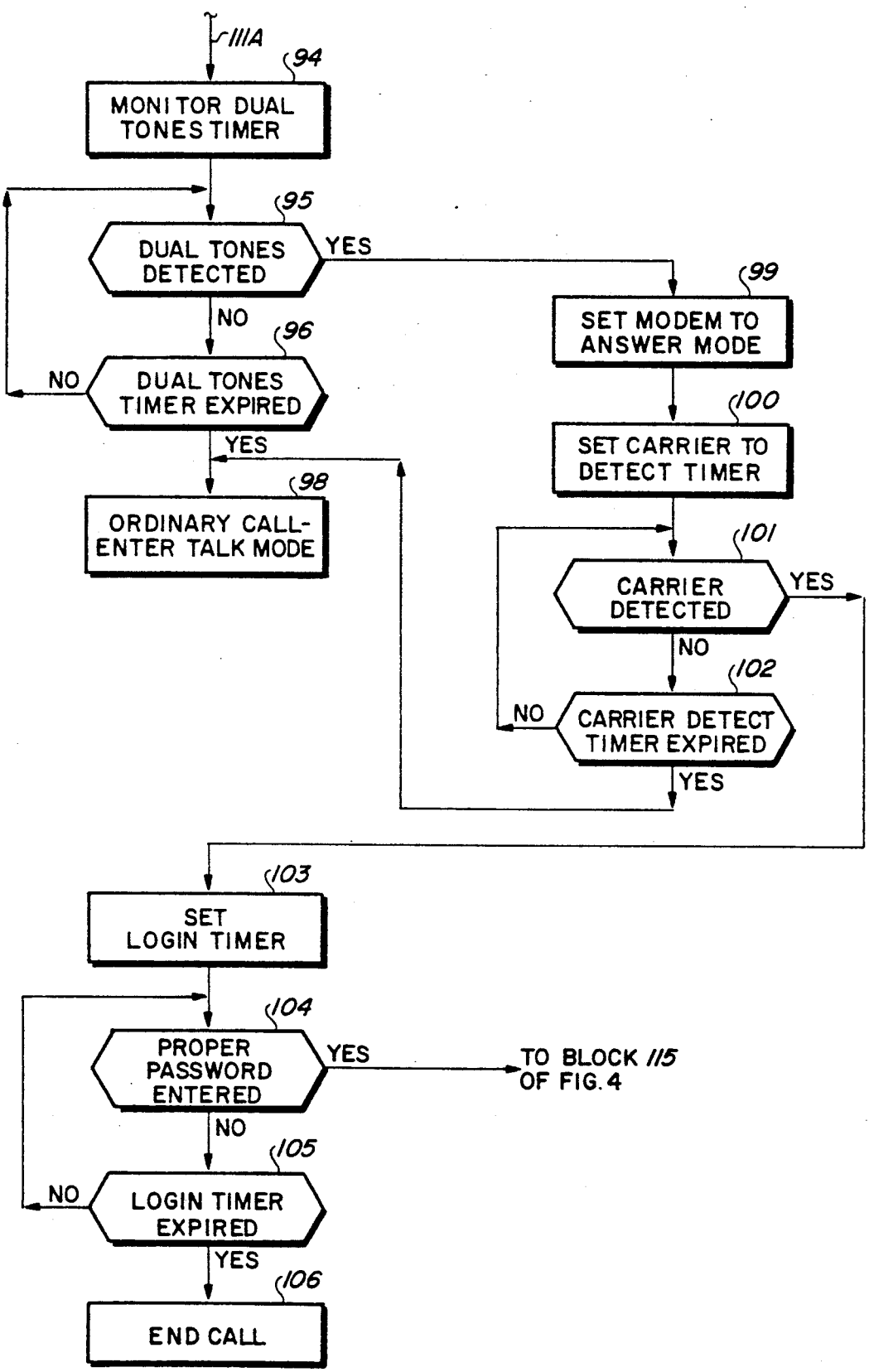

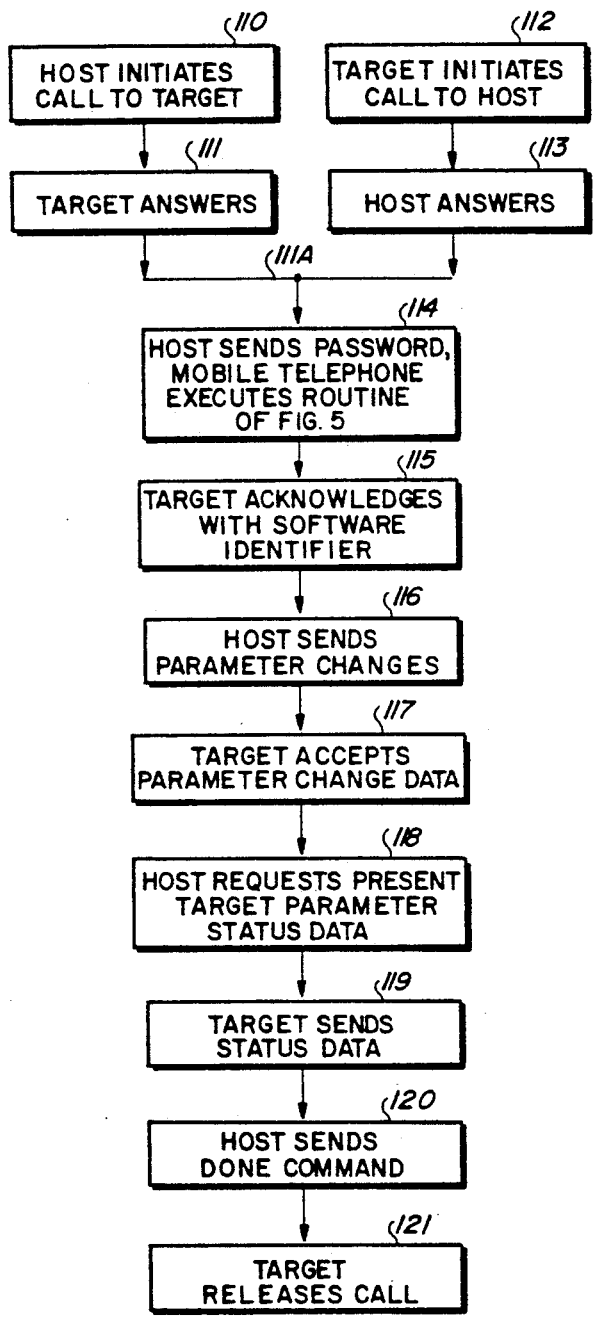
FIG. 4
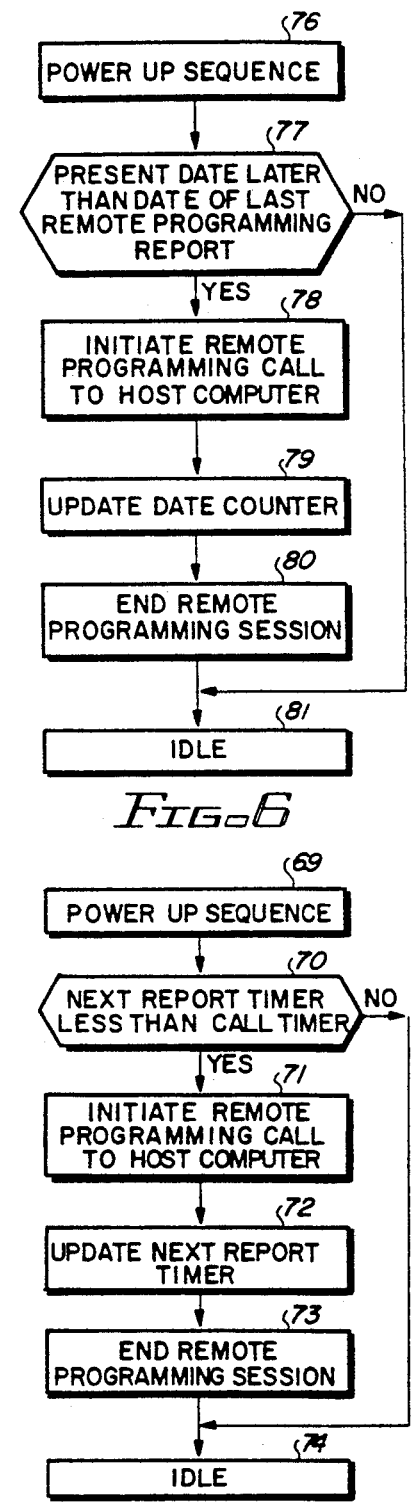
FIG. 6
FIG. 7

SYSTEM FOR PROGRAMMING OF FEATURES OF A MOBILE CELLULAR TELEPHONE UNIT

BACKGROUND OF THE INVENTION

The invention relates to cellular telephone systems, and particularly to systems which avoid the need for a serviceman to have physical access to a mobile cellular telephone unit in order to connect or disconnect various telephone features, parameters, etc.

Cellular telephone systems are very commonplace, and typically include a mobile telephone switching office (MTSO) which couples a "land side" telephone to a "cell site" facility that includes a transmitter, a receiver, filtering circuitry, and control equipment. Various mobile cellular telephone units, hereinafter referred to as "mobile telephones", communicate with the cell site via assigned rf channels. A number of overlapping cell sites usually are spaced throughout a metropolitan area. As a particular mobile unit moves out of the range of one cell site into the range of another, automatic "hand-off" operations occur as a result of continuous communication between the various cell sites and mobile telephones on a "voice channel". Voice communication on a "voice channel" occurs between the user of each mobile telephone and "land side" telephones through the cell sites and the MTSO.

Mobile telephones frequently are sold or leased by distributors. The mobile telephones contain software "feature switches" that allow the subscriber to be assigned a telephone number and have various operating features and parameters such as hands-free operation, repertory memory storage, auxiliary horn/light alert capability, call-in absence indicator, call restrictions (i.e., local calls only), theft alarm, and provision of a dealer security code. The subscriber's fee may increase according to the number of such features that are switched on. Ordinarily, the mobile telephone unit is taken to a service shop. The serviceman plugs in a test set to access the various feature switches and set up the mobile telephone for use with the features desired by the subscriber. The parameters and feature selection information are entered through the test set. The test set then is disconnected, and the mobile telephone unit is ready for use.

A long-standing problem is that some subscribers do not pay their monthly bills for the cellular telephone service. There exists no convenient way for the cellular telephone company to terminate service to non-paying subscribers without gaining access to the non-paying subscribers' mobile telephones. Since the "breakup" of AT&T, there are many different corporate suppliers of mobile telephone services. After a non-paying subscriber runs up an unpaid bill with one supplier, he can subscribe to another for a while, and then another, and get away without paying.

More than a dozen years ago, the Electronic Industry Associates (EIA) defined a "standard" message format for programming of feature switches for cellular mobile telephones. However, the various telephone companies have been unable to agree on message formats for programming of feature switches, and it has been impractical to adapt mobile telephone switching offices (MTSO's) to accommodate various formats for feature switch programming messages.

It would be highly desirable to provide a system which enables suppliers of cellular telephone service to connect or disable certain mobile cellular telephone units and to set feature switches thereof without having to modify MTSO's.

SUMMARY OF THE INVENTION

It is an object of the invention to provide a system for programming feature switches of mobile cellular telephone units without requiring modification of equipment of a mobile telephone switching office.

It is another object of the invention to provide a cellular telephone system in which a security code is programmed.

It is another object of the invention to provide a cellular telephone system in which service to non-paying subscribers can be cut off without access to the mobile telephones.

It is another object of the invention to provide a cellular telephone system in which calls placed on a mobile telephone by a non-paying subscriber can be automatically forwarded to a billing office.

Briefly described, and in accordance with one embodiment thereof, the invention provides a system for programming software feature switches in a mobile telephone, wherein a host computer initiates a first call to the mobile telephone, thereby causing a cell site facility to broadcast an initiate signal via a paging channel which is a digital channel. A processor in the mobile telephone monitors the paging channel. An alert signal is generated in the mobile telephone in response to the initiate signal, and an answer signal is generated in the mobile telephone if the subscriber answers the first call. The first processor causes first acknowledge signal to be broadcast via the digital channel in response to the answer signal, to thereby cause the cell site facility to complete a voice channel connection between the mobile telephone and a modem of the host computer. A tone generator associated with the host computer generates a distinct tone on the voice channel, which is detected by the mobile telephone, the processor of which then establishes a programming mode and sends a second acknowledge signal to the host computer. The host computer then broadcasts feature switch data via the voice channel. The processor of the mobile telephone monitors and/or writes feature switch data received from the voice channel into a plurality of the software feature switches in the mobile telephone. The mobile telephone includes timer circuitry that automatically self-initiates a call from the mobile telephone to the host computer when the timer circuitry times out. This enables the host computer to stop service to a mobile telephone, the owner of which has not paid for the service. In one embodiment, the feature switch data includes data which, if set, automatically forwards any call placed by the mobile unit to a programmable telephone number, such as the telephone number of a billing office.

BRIEF DESCRIPTION OF THE DRAWINGS

FIG. 4 is a flowchart useful in explaining part of the operation of the programming adapter and the programming interface system.

FIG. 5 is another flowchart useful in explaining the operation of the programming adapter and the programming interface system.

FIGS. 6 and 7 are flowcharts useful in describing methods by which a target mobile cellular telephone unit self-initiates a call.

DETAILED DESCRIPTION OF THE PREFERRED EMBODIMENT

Figure 1:
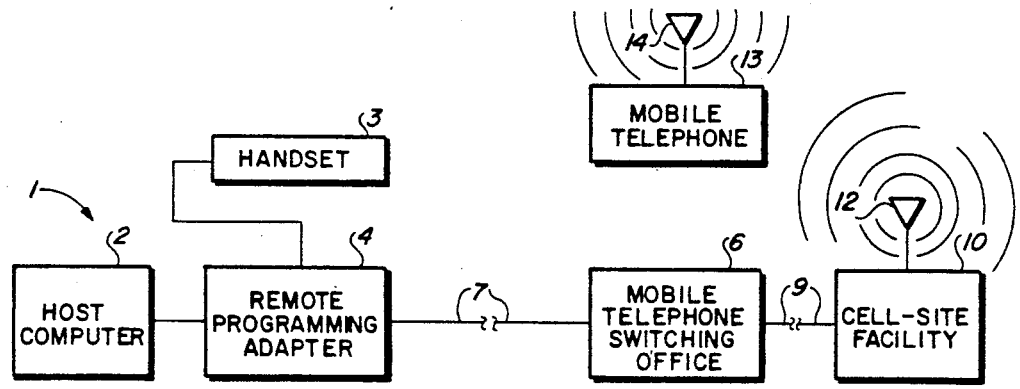
FIG. 1 is a schematic diagram of a cellular telephone system utilizing the programming interface system of the present invention.

In FIG. 1, a cellular telephone system 1 includes a host computer 2 (which can be a typical personal computer, such as an IBM PC-AT), and a handset or telephone 3 connected to the programming adapter 4 of the present invention. Programming adapter 4 includes a modem coupled to host computer 2. Programming adapter 4 is connected by a telephone line 7 to a Mobile Telephone Switching Office (MTSO) 6. MTSO 6 maintains a database of subscribers, and routes communications between mobile subscribers, fixed (i.e., "land side") subscribers. MTSO 6 also terminates communications to subscribers contained in the database. MTSO 6 is connected by telephone line 9 to a cellular telephone facility 10 that is referred to as a cell-site facility. Cell-site facility 10 includes an antenna 12 for transmitting and receiving voice and digital information via various voice channels and various digital channels to antenna 14 of mobile telephone 13.

Figure 2:
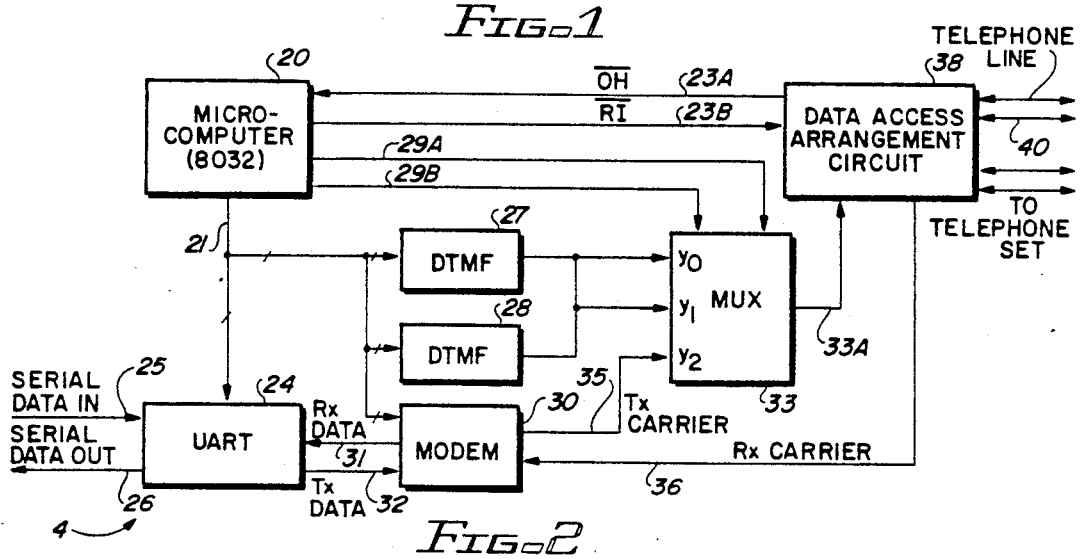
FIG. 2 is a simplified block diagram of the programming adapter included in FIG. 1.

FIG. 2 shows a simplified block diagram of programming adapter 4 of FIG. 1, which includes a microcomputer 20. Microcomputer 20 preferably is an Intel 8032 integrated circuit. Microcomputer 20 is connected by an address/data bus 21 to a universal asynchronous receiver transmitter unit (UART) 24, a modem 30 (which can be a Bell 103 model), and two dual tone multiple frequency (DTMF) units 27 and 28 (each of which can be a Model PCD3311 DTMF unit, commercially available from Signetics). DTMF unit 27 produces a distinct tone of 1760 hertz, and DTMF unit 28 produces a tone of 2479 hertz when enabled by microcomputer 20. UART 24 receives serial input data from host computer 2 via conductor 25 and produces serial output data to host computer 2 on conductor 26. Modem 30 produces serial audio Rx (receive) data on conductor 31 and receives serial audio Tx (transmit) data on conductor 32 from UART 24. Modem 30 produces a Tx carrier signal on conductor 35, which is applied to the y2 input of analog multiplexer chip 33 (which can be a Model SD5001, commercially available from Silconix). The $y_0$ and $y_1$ inputs of multiplexer 33 are connected to the tone outputs of DTMF circuits 27 and 28.

Microcomputer 20 generates channel select signals on conductors 29A and 29B, which are connected to the select inputs of multiplexer 33. The output 33A of multiplexer 33 is applied to a data access arrangement (DAA) circuit 38. DAA circuit 38 produces the $\overline{OH}$ (Off Hook) and an $\overline{RI}$ (Ring Indicator) signals on conductors 23A and 23B, respectively, which are connected to input ports of microcomputer 20. Data access arrangement circuit 38, shown in detail in FIG. 2A, performs the function of a telephone line interface. It monitors the ring signal and supplies an $\overline{RI}$ signal to the microcomputer. It also monitors call progress tones for station ring, station busy, trunks busy, and other functions, and provides a status to the microcomputer.

Figure 2A:
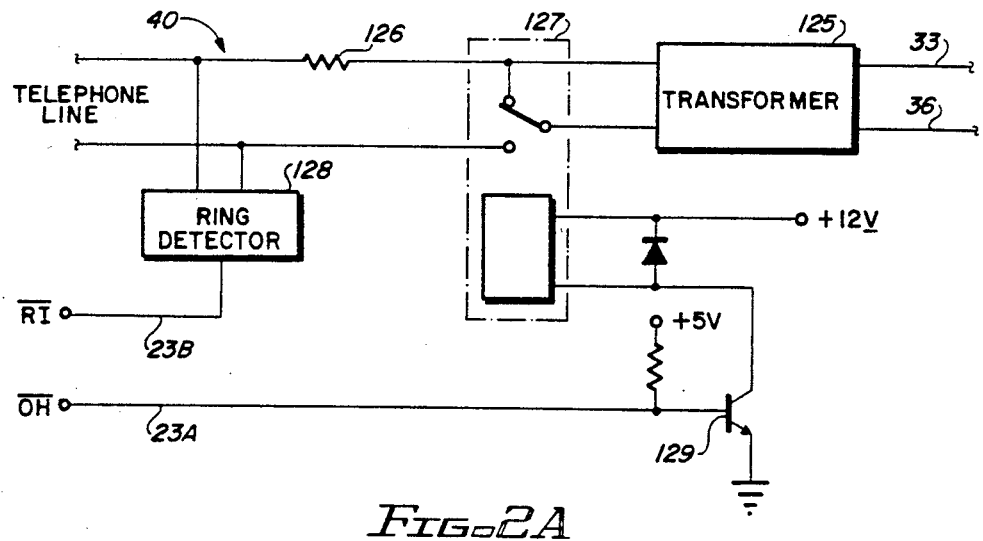
FIG. 2A is a simplified block diagram of the data access arrangement circuit 38 of FIG. 2.

Referring to FIG. 2A, the DAA circuit 38 includes a transformer 125, a relay 127, a conventional ring detector circuit 128, and a relay driver transistor 129. Ring detector circuit 128 produces the $\overline{RI}$ signal on conductor 23B in response to the presence of a ring signal frequency on telephone line 40.

Transistor 129 controls relay 127 in response to an $\overline{OH}$ (Off Hook) signal produced by microcomputer 20.

Figure 3:
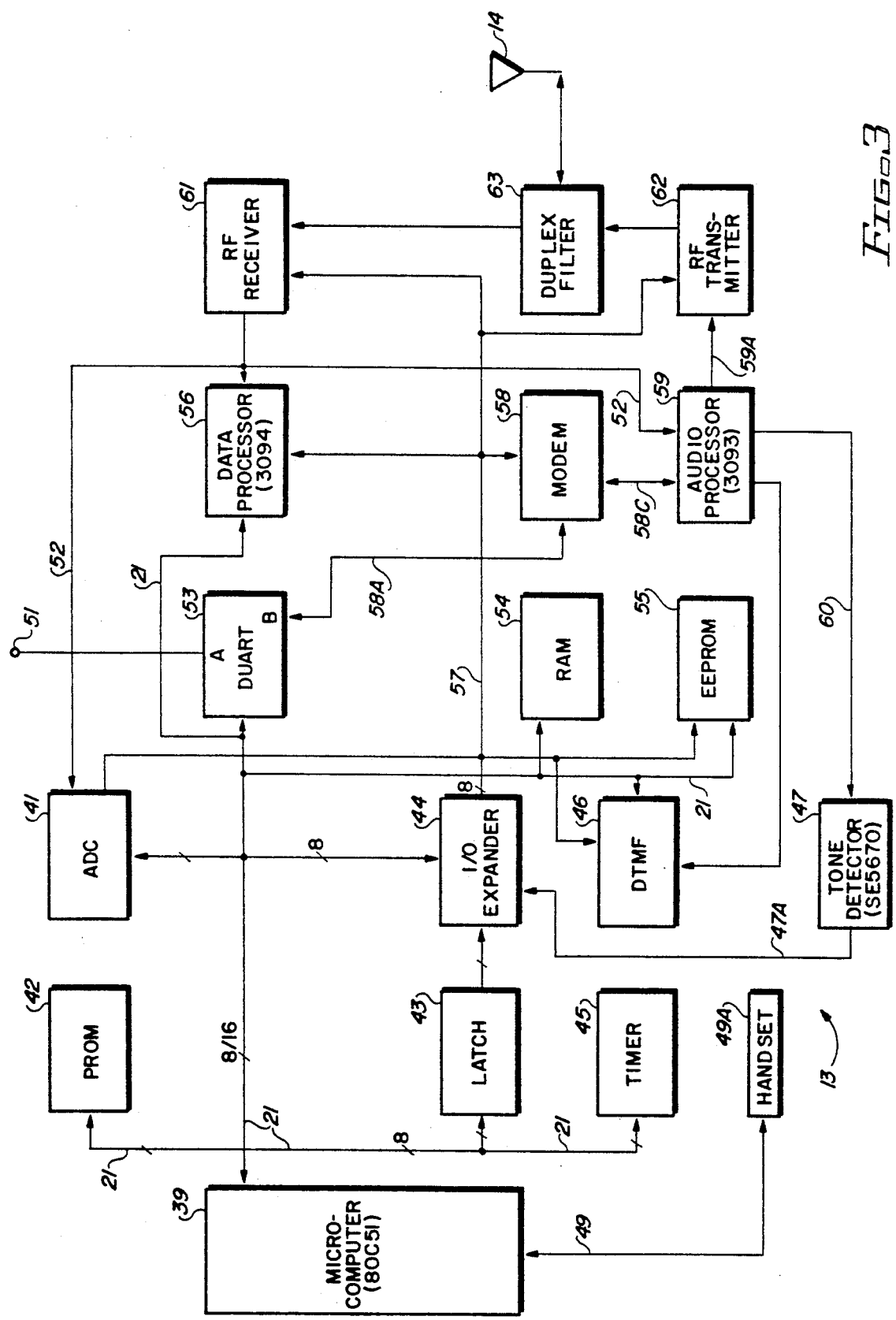
FIG. 3 is a detailed block diagram of a mobile cellular telephone unit.

FIG. 3 shows a detailed block diagram of mobile telephone 13 of FIG. 1. Microcomputer 39, which can be an Intel 80C51, has a cable 49 connecting an input-output port to a telephone handset 49A. Address/data bus 21 is connected to appropriate terminals of microcomputer 39 and to appropriate address and data terminals of a 64 kilobyte PROM (programmable ROM) 42, an address latch 43, a VLSI I/O expander 44, a dual tone multiple frequency circuit 46 (which can be a PCD3311 available from Signetics), an 8 kilobyte E²PROM 55, 8 kilobytes of external scratchpad RAM 54, and a DUART (dual UART) 53. Address/data bus 21 also is connected to a conventional time-of-day/date counter 45, which is utilized by mobile unit 13 to self-initiate calls to the host computer 2. Address/data bus 21 also is connected to input/output terminals of data processor chip 56.

I/O expander 44 includes two two-line-to-four-line decoders and a three-line-to-eight-line decoder which decode various address lines from bus 21 to produce various chip select signals to the other blocks shown in FIG. 3. I/O expander 44 also includes 24 D-type flip-flops and several buffers which store data loaded from microcomputer 39 and monitor various leads, such as the power on switch, etc. This circuit can be easily implemented by one skilled in the art, so the details are not shown.

A group of conductors collectively designated by numeral 57 are connected to DTMF chip 46, E²PROM 55, RAM 54, DUART 53, an analog-to-digital converter (ADC) 41, data processor 56 (which can be an Aptek 3094 data processor), modem 58, a conventional rf receiver circuit 61, and a conventional rf transmitter circuit 62, respectively.

An analog signal produced on conductor 52 by rf receiver circuit 61 is applied to the input of ADC 41. Conductor 52 also is connected to inputs of data processor 56 and to an input of an Aptek 3093 audio processing chip 59.

The Aptek 3094 data processor 56 recovers the 10 kilohertz Manchester encoded data transmitted by cell site facility 10. The message bits include word sync information, information bits, and parity bits. Data processor 56 includes a frequency counter for use in determining the correct supervisory audio tones (SATs).

The Aptek 3093 audio processing chip 59 provides signal conditioning such as filtering of received audio signals by attenuating out-of-band noise, and outputs audio signals of 3 to 3000 hertz, SAT tones, 10 kilohertz data, provides volume control for received audio signals, and filters audio inputs before transmission to cell site 10.

Modem 58 is connected by conductor 58A to the "B" terminal of DUART 53. A computer test set can be plugged directly into the "A" terminal of DUART 53 to allow local programming of the software feature switches; numeral 51 designates a plug-in port to the A terminal. Modem 58 also is connected by conductor 58C to audio processor 59.

A modulator output 59A of audio processor 59 is connected to an input of rf transmitter circuit 62. A conventional duplex filter 63 is connected to the input of rf receiver 61 and the output of rf transmitter 62. An antenna terminal of duplex filter 63 is connected to antenna 14.

Block 47 of FIG. 3 contains two tone detector circuits, which can be Signetics SE567D integrated circuits that receive two distinct tones of 1760 hertz and 2479 hertz, respectively. (These two tones cannot be produced by a conventional handset or by single dual tone multiple frequency (DTMF) circuit 46.)

Tone detect circuit 47 has an input connected to the audio output (3 to 3000 hertz) of the Aptek 3093 data processor 56. Detection of the two distinct tones generated by DTMF units 27 and 28 of FIG. 2 RPI tone results in a digital signal being produced on conductor 47A and applied to I/O expander 44. Microcomputer 39 senses this condition by reading a signal produced on bus 21 in response to the signal on conductor 47A to determine if a programming session is to be initiated.

A number assignment module (NAM) and software feature switches to control 24 programmable features of mobile cellular telephone unit 13 are stored in E$^2$PROM 55 of FIG. 3. The number assignment module contains cellular system operating parameters, including for example, the directory number, the home system identifier, the cellular unit's class mark (i.e., mobile, transportable, or portable), and identification of installed options of the mobile telephone 13.

I/O expander circuit 44 receives the 8 lower address bits and the 8 data bits carried on address/data bus 21 and decodes them to generate the various control and select signals collectively designated by reference numeral 57 to select and/or control the various blocks of circuitry, including analog-to-digital converter 41, DUART 53, a scratch pad RAM 54, E$^2$PROM 55, modem 58, data processor 56, audio processing circuit 59, receiver circuit 61, and transmitter circuit 62.

As it relates to the programming of software feature switches, if the rf representation of the 1760 hertz and 2479 hertz dual tones produced by DTMFs 27 and 28 and received in modulated rf form by antenna 14 are present and are demodulated by receiver circuitry 61, the demodulated information representing the dual tones is carried by conductor 52 to an input of audio processing circuit 59, which regenerates the two audio 1760 hertz and 2479 hertz tones on conductor 60 and applies them to the inputs of the two tone detect circuits in block 47. If both distinct tones are present, a signal is produced on conductor 47A to I/O expander 44, which then sets up DUART 53 and modem 58 to establish the desired voice channel signaling and allow communication of digital data over the voice channel via antenna 14, rf receiver circuit 61 and rf transmitter circuit 62. Digital information then can be received by modem 58 and DUART 53, produced on address/data bus 21, and then read and processed by microcomputer 39.

Microcomputer 39 also reads the present status of the software feature switches stored in E$^2$PROM 55 and transmits that data back to cell site facility 10 via DUART 53, modem 58, audio processing chip 59, rf transmitter circuit 62, and antenna 14. Digital feature switch data received in rf form from cell site facility 10 via antenna 14 is passed through modem 58 to address-/data bus 21, and is read by microcomputer 39. Digital data produced by microcomputer 39 can be transmitted via address/data bus 21, DUART 53, modem 58, audio processing chip 59, and rf modulator transmitter 62 to antenna 14, and then through cell site facility 10 to host computer 2.

The flowchart of FIG. 4 shows the basic operations in programming of the cellular telephone system of FIG. 1. Mobile telephone 13 can "self-initiate" a call for the purpose of enabling host computer 2 to monitor and/or modify the status of the feature switches of mobile unit 13.

The feature switches are software switches stored in E$^2$PROM 55 of unit 13, and are set and reset by microcomputer 39 in response to feature switch data received from the host computer 2. Software feature switches are simply stored bits that enable a software feature routine or algorithm to be executed. All of the 24 selectable features are implemented by execution of corresponding software routines/algorithms.

In FIG. 4, a host computer initiates a call to the target, as indicated in block 110, in order to read and/or update the status of the feature switches in mobile telephone 13. To accomplish this, host computer 2 initiates a call, and MTSO 6 directs the mobile telephone 13 to tune to the frequency of an available voice channel. Mobile unit 13 then automatically tunes to the frequency of the voice channel and transmits the supervisory audio tones (SAT's) of 5970, 6000, or 6030 hertz to cell site 10. Cell site facility 10 then directs mobile telephone 13 to alert the subscriber by causing it to ring, and also turns on a 10 kilohertz alerting signal that goes back to cell site 10. The subscriber, if present, hears a corresponding synthesized audio tone (ring), picks up the handset of mobile telephone 13 and answers the call, as indicated in block 111 of FIG. 4. In response to a signal produced by the answering, mobile telephone 13 turns off the alerting signal. Cell site 10 then couples the receiver and transmitter carrier signals of the cell site to those of programming adapter 14. At this point, the system operation is at node 111A of the flowchart of FIG. 4.

Alternatively, in accordance with the present invention, mobile telephone 13 self-initiates a call to host computer 2, as indicated in block 112. It should be understand that if host computer 2 initiates a call, a voice channel link to mobile telephone 13 cannot be completed unless the subscriber is present and answers the alerting tone. However, host computer 2 may have a need to monitor and/or update the status of the software feature switches even though the user of mobile telephone 13 is not present to answer the call. To effectuate a self-initiated call from mobile telephone 13, microcomputer 39 interrogates time-of-day/date timer 45, which can automatically initiate a call to host computer 2 in accordance with subsequently described flowcharts shown in FIG. 6 or FIG. 7. Host computer 2 can stand by and respond to such a self-initiated call to establish a voice channel link with mobile telephone 13, and then interrogate and/or update the status of the software feature switches therein.

To self-initiate a call from mobile telephone 13, a telephone number of host computer 2 is automatically dialed by mobile telephone 13. This causes MTSO facility 6 to assign mobile telephone 13 to an available voice channel through the cell site facility 10, just as in the case of a host initiated call. Mobile telephone 13 then tunes to the frequency of the assigned voice channel and transmits a supervisory audio tone, just as in the case of a host initiated call. MTSO facility 6 then directs data access arrangement (DAA) circuit 38 of programming adapter 4 to connect the receive and transmit channels of the telephone line 7 to cell site facility 10.

Host computer 2 then answers, as indicated in block 113 of FIG. 4. The process then is at the node of the flowcharts indicated by numeral 111A in FIG. 4 and FIG. 5.

Host computer 2 then initiates a LOGIN procedure, as indicated in block 114. The flowchart of FIG. 5 indicates part of the operation of block 114 of FIG. 4.

Referring to FIG. 5, during the LOGIN procedure, a voice channel has been established from mobile telephone 13 through cell site facility 10, through MTSO 6 onto host computer 2. At this point, a voice channel link or connection between the mobile telephone 13 and host computer 2 exists. Host computer 2 turns on a dual tone software timer. This software timer is executed by microprocessor 39 of the mobile telephone 13, and monitors the voice channel for ten seconds. If a feature switch programming session is to be performed, host computer 2 instructs microcomputer 20 of programming adapter 4 to cause dual tone multiple frequency units 27 and 28 to simultaneously generate the above-mentioned distinct audio tones of 1760 hertz and 2479 hertz.

If tone detector circuit 47 of mobile telephone 13 detects the presence of these two distinct tones, as indicated in block 95 of FIG. 5, then microcomputer 39 causes a tone detect signal on conductor 47A to cause I/O expander 44 to set modem 58 to an answer mode, as indicated in block 99. Otherwise, the program being executed by microcomputer 39 goes to decision block 96 and determines if the 10 second dial tone timer duration has expired. If it has not expired, the program loops back to the entry point of decision block 95, but otherwise advances to block 98 and determines that the present call is an ordinary call, not a programming call. The program being executed by microcomputer 39 then causes mobile telephone 13 to enter its talk mode, as indicated in block 98.

If the dual tones are detected, this indicates that a feature switch programming session is desired and modem 58 is set to an answer mode. Then when modem 58 of FIG. 3 is activated, modem 30 of FIG. 2 detects a modem carrier signal 36. If this occurs within a ten second interval established by a software carrier detect timer referred to in block 100 of FIG. 5, the program being executed by microcomputer 39 goes to block 101 and sets a 30 second LOGIN timer, as indicated in block 103. If no carrier is detected in decision block 101, the program goes to decision block 102 and determines if the 10 second carrier detect timer has expired. If it has, the program goes to the entry point of block 98 and assumes that the present call is a normal call, but otherwise returns to the entry point of decision block 101.

If a carrier then is detected in block 101, the program being executed by microprocessor 39 goes to block 103 and sets the 30 second LOGIN timer, and then goes to decision block 104, which determines if the proper password has been entered by means of host computer 2 and received by mobile telephone 13. If the determination of decision block 104 is negative, and if the determination of decision block 106 is negative, mobile telephone 13 ends the call, as indicated in block 107. If the determination of decision block 106 is affirmative, the program being executed by microcomputer 39 returns to the entry point of decision block 104.

If the correct password has been received, microcomputer 39 sends an acknowledge signal to host computer 2 via the voice channel, and the program goes to block 115 of FIG. 4.

In block 115, mobile telephone 13 responds to completion of the LOGIN procedure by broadcasting a "version number" of the present programming subroutine being executed by microcomputer 39. It should be appreciated that the programming subroutine stored in PROM 42 may be updated from time to time. The version number identifies the memory map of $E^2PROM$ 55 to host computer 2, which is executing the software of Appendix 1. Host computer 2 then can use the memory map to read and write to the target unit.

Upon receiving the above-mentioned acknowledge signal, which confirms keyboard entry of a password to host computer 2 by an operator, host computer 2 enters a "command stage" and is ready to send commands to mobile telephone 13. The host computer commands include READ, WRITE, EXECUTE, and END commands. Host computer 2 can send one command at a time, and waits for an acknowledge (ACK) command in order to issue the next command. If the response of mobile telephone 13 is a "no acknowledge" command (NACK), host computer 2 retransmits the previous command.

A stored security code or password is one of the programmable features setable by one of the software feature switches stored in mobile telephone 13. The subscriber never knows the password. The password can be changed regularly so prior employees or servicemen who previous knew the password now no longer know it.

Once mobile telephone 13 has acknowledged with the version number, host computer 2 transmits feature switch parameter data back to mobile telephone 13, as indicated in block 116. Next, the mobile telephone 13 accepts the parameter change data, as indicated in block 117.

Then, host computer 2 requests mobile telephone 13 to transmit its present parameter status data, as indicated in block 118. Mobile telephone 13 then transmits its feature switch status data back to host computer 2, as indicated by block 119. Host computer 2 then transmits a DONE command to the mobile telephone 13, as indicated in block 120. Mobile telephone 13 then releases the call, by turning the signaling tone on for 1.8 seconds (to signal cell site 10 to clear the voice channel), and then turning off its transmit function and returning to its idle mode.

FIG. 6 shows a program executed by microcomputer 39 when the user of the mobile telephone 13 turns on the ignition switch of a vehicle in which mobile telephone 13 is installed. This powers up of mobile telephone 13. As indicated in block 76 of FIG. 6, a power up initializing sequence is automatically performed for the entire system of FIG. 3. The time-of-day/date counter 45 then is interrogated to determine if the present date is later than the date of most recent report of feature switch status of mobile telephone 13. This interrogation is to make sure there is no more than one report per day (or other selected interval). If the determination of block 77 is negative, microcomputer 39 goes back to its operating idle loop. Otherwise, microcomputer 39 initiates a programming call to host computer 2, as indicated in block 78. The program then goes to block 79 and updates the time-of-day/date report and ends the programming session, as indicated in block 80 and returns to the microprocessor idle loop.

FIG. 7 shows a sequence for self-initiating programming calls by the mobile telephone 13 if no time-of-day/date counter 45 is available. In this case, the power up sequence in block 69 is essentially the same as in block 76 of FIG. 6. In block 70, a "next timer report" variable is tested to see if it is less than a "call timer" variable. The "call timer" is simply a measure of the length of the last telephone call(s) made by the subscriber on the mobile telephone 13. If the determination of decision block 70 is negative, the program returns to the idle loop of microprocessor 39, as indicated in block 74. Otherwise, microcomputer 39 initiates a programming call to host computer 2, then goes to block 72 and updates the "next report timer", ends the programming session, as indicated in block 73, and returns to the idle loop.

Appendix "1", attached hereto, is a source code printout of a program executed by the host processor to effectuate the programming function of the present invention.

Appendix "2" is a printout of a program executed by microprocessor 20 of FIG. 2.

Appendix "3" is a printout of a program executed by microprocessor 39 of FIG. 3.

While the invention has been described with reference to several particular embodiments thereof, those skilled in the art will be able to make the various modifications to the described embodiments of the invention without departing from the true spirit and scope of the invention. It is intended that all elements and steps which perform substantially the same function in substantially the same way to achieve the same result are within the scope of the invention.

APPENDIX "1"

```
/*********************************************************************
        Help.C
        This file contains NO code. Only the help screen definitions.
        In this way only this file needs to be recompiled if the help
        screens are changed.
        11/7/88   DJB
*********************************************************************/ include <STDIO.H>

/*********************************************************************
        Main Menu Help Screens
*********************************************************************/ char *MMHelp [] = {
                        "\n\n        GOLDSTAR CELLULAR PRODUCTS DIVISION"
                        "\n\n                SIMULATION PROGRAM"
                        "\n\n\nThis program is a combination of three"
                        "\nseparate functions. Two functions are for"
                        "\nTRU - Handset Communications and the third"
                        "is for remote programming of the TRU."
                        "\n\n\n                            ( )", "\n                MAIN MENU\n\n"
                        "This Menu allows selection of the three\n"
                        "functions provided by this program, as\n"
                        "well exitting to DOS. The ESC key will\n"
                        "exit to DOS from this menu.\n\n"
                        "The three functions are as follows:\n"
                        "       1) TRU Simulation\n"
                        "       2) Handset Interactive Mode\n"
                        "       3) Remote Programming Mode\n\n"
                        "                    ()", "\n              TRU SIMULATION\n\n"
                        "By pressing the '1' key, TRU Simulation\n"
                        "is invoked. This function will return the\n"
                        "appropriate responses to the handset as\n"
                        "keys are pressed on the handset, thereby\n"
                        "simulating the TRU. The bulk of the TRU\n"
                        "functionality is not included, only those\n"
                        "aspects which directly relate to the\n"
                        "handset and its display. All of the\n"
                        "communications are displayed in hex.\n\n"
                        "                    ()", "\n         HANDSET INTERACTIVE MODE\n\n"
                        "By pressing the '2' key, the Handset\n"
                        "Interactive Mode is invoked. This function"
                        "allows you to send messages to the handset"
```

```
                  "directly from the PC keyboard. A display\n"
                  "on the PC shows what the handset display\n"
                  "should look like as each command is sent.\n"
                  "Data sent by the handset is displayed only"
                  "- no attempt is made to decode it.\n\n\n"
                  "                         ()", "\n           REMOTE PROGRAMMING MODE\n\n"
                  "By pressing the '3' key, the Remote\n"
                  "Programming Mode is invoked. This mode is\n"
                  "used to simulate a Remote Host programming"
                  "interface. The function will read in the\n"
                  "EEPROM memory and then allow you to log in"
                  "to the remote programming interface in the"
                  "TRU. Several functions are allowed which\n"
                  "are described in the Help screens for this"
                  "function.\n\n"
                  "                         ( )",

NULL
              );

/************************************************************************
         Interactive Mode Help Screens
 ************************************************************************/ char *IHelp [] = (
                  "\n              INTERACTIVE MODE\n\n"
                  "This function allows you to send messages\n"
                  "directly to the Handset. The alphabetic\n"
                  "and numeric keys are sent directly to be\n"
                  "displayed and are shown on the Handset\n"
                  "Display in the corner of this screen. The\n"
                  "area on the bottom of the screen is used\n"
                  "to display any messages received from the\n"
                  "Handset. No decoding is done on this data,"
                  "it is displayed only in hex.\n\n"
                  "                         ( )", "The available functions are as follows:\n\n"
                  "   1) Clear Position - This function will "
                  "                       remove the last\n"
                  "                       character displayed\n"
                  "   2) Clear Display  - This function will "
                  "                       clear the entire\n"
                  "                       display\n\n"
                  "   3) Toggle Flashing - This function will"
                  "                       toggle flashing on\n"
                  "                       and off.\n"
                  "                         ()", "   4) Toggle Backlight - This function\n"
                  "                       will turn the light"
                  "                       on the handset on\n"
                  "                       and off. Its status"
                  "                       is displayed on\n"
                  "                       this screen below\n"
                  "                       the Keypad Display\n\n"
                  "   5) Locate Cursor  - This function will\n"
                  "                       allow you to set\n"
                  "                       the cursor position"
                  "                       manually. Locations"
                  "                       are numbered 1-30.\n"
                  "                         ()", "   6) Clear Received Data - This function "
                  "                       allows you to clear"
                  "                       the received data\n"
                  "                       display on the\n"
                  "                       bottom of this\n"
                  "                       display. It will\n"
                  "                       not affect the\n"
                  "                       handset.\n\n"
                  "The keystrokes which will invoke these\n"
                  "functions are shown in the menu on the\n"
```

```
                "left side of the display.\n\n"
                "                       ( )",

NULL
        );

/************************************************************************
        Simulation Mode Help Screens
************************************************************************/ char *SHelp [] = {
                "\n              TRU SIMULATION\n\n"
                "This function has no active keys except\n"
                "the ESC key which will return to the Main\n"
                "Menu.  The Display here shows the\n"
                "communications in both directions as they\n"
                "occur. Messages sent by the simulator are\n"
                "displayed in the normal attribute while\n"
                "messages received from the Handset are\n"
                "displayed in reverse video.\n\n\n"
                "                       ( )",

NULL
        );

/************************************************************************
        Remote Programming Help Screens
************************************************************************/ char *NFHelp [] = {

"\n              REMOTE PROGRAMMING\n\n"
                "This function allows you to access the\n"
                "memory inside the TRU, as well as to\n"
                "execute some predefined functions. The\n"
                "display is interactive, with each command "
                "having its own Help screens. Since no\n"
                "entry has yet been made on this line Help "
                "is given on the general structure. The up "
                "and down arrow keys can be used to recall "
                "any of the last 24 commands that were\n\n"
                "                       ( )", "entered. The commands are invoked by the\n"
                "first letter. Each command has its own\n"
                "entry structure. The available commands\n"
                "are as follows:\n\n"
                "   1) Login - This command is used to\n"
                "           initiate the remote programming\n"
                "           mode. A password is required.\n\n"
                "   2) Read Data - This command will read\n"
                "           the given number of bytes from\n"
                "           the current address.\n\n"
                "                       ()", "   3) Write Data - The data entered is\n"
                "           written to the current address.\n\n"
                "   4) Set Address - The current address is"
                "           set to the value given.\n\n"
                "   5) Compare Data - The number of bytes\n"
                "           specified are read from the TRU\n"
                "           and compared to what the program\n"
                "           thinks is there.\n\n"
                "   6) Execute Function - The function\n"
                "           number given is performed.\n"
                "                       ( )",

NULL
        );

char *LHelp [] = {
                "\n                      LOGIN\n\n"
                "This function expects you to enter a\n"
                "password. The password can be of any\n"
```

```
                "length and can contain any alphanumeric\n"
                "characters.\n\n\n\n\n"
                "                    (   )",

NULL
        );

char *RHelp [] = {
                "\n              READ DATA\n\n"
                "This function expects you to enter a hex\n"
                "value for the number of bytes to read. The"
                "maximum value for this length is FF.\n"
                "\n\n\n\n\n\n"
                "                    (   )",

NULL
        );

char *WHelp [] = {
                "\n              WRITE DATA\n\n"
                "This Function expects you to enter the hex"
                "values that you want written. A maximum of"
                "255 bytes are allowed and must be entered\n"
                "as pairs, so the value 10 decimal would be"
                "entered as 0A.\n\n\n\n\n"
                "                    (   )",

NULL
        );

char *AHelp [] = {
                "\n              SET ADDRESS\n\n"
                "This Function expects you to enter the hex"
                "address that you want to use with any\n"
                "commands that follow.\n\n\n\n\n\n\n"
                "                    (   )",

NULL
        );

char *CHelp [] = {
                "\n              COMPARE MEMORY\n\n"
                "This Function expects you to enter the hex"
                "value for the number of bytes to compare. "
                "\n\n\n\n\n\n\n"
                "                    (   )",

NULL
        );

char *FHelp [] = {
                "\n              EXECUTE FUNCTION\n\n"
                "This Function expects you to enter the hex"
                "value of the function to execute.\n"
                "Currently, there are eight functions\n"
                "defined.\n\n"
                "The eight functions are:\n"
                "  Stop Calls; Resume Calls; Copy Memory;\n"
                "  Generate Checksum; Test RAM; Test ROM;\n"
                "  Test EEPROM; and Display Message.\n\n"
                "                    ( )  ", "\n            Function Definitions\n\n"
                "  1) Stop Calls - Stop accepting both\n"
                "     incomming and outgoing calls\n\n"
                "  2) Resume Calls - Resume normal call\n"
                "     operation.\n\n"
                "  3) Copy Memory - Copy RPI_W3 bytes from "
                "     the address RPI_W1 to the address\n"
                "     RPI_W2\n\n"
                "                    ()", "\n"
                "  4) Generate Checksum - Sum all the bytes"
```

```
                "       from the address RPI_W1 to the\n"
                "       address RPI_W2 and store the result\n"
                "       in RPI_W3\n\n"
                " 5) Test RAM - Run a diagnostic check on "
                "       the volatile memory and place a\n"
                "       result code in RPI_B1.\n\n"
                " 6) Test ROM - Run a diagnostic check on "
                "       the Read-Only Memory and place a\n\n"
                "                          ()", "\n"
                "       result code in RPI_B1.\n\n"
                " 7) Test EEPROM - Run a diagnostic check "
                "       on the non-volatile memory and place "
                "       a result code in RPI_B1\n\n"
                " 8) Display Message - Take RPI_B1\n"
                "       characters from RPI_BUF and place\n"
                "       them on the display starting at the\n"
                "       location RPI_B2.\n\n\n"
                "                          ()", "\n"
                "The data for these functions should be\n"
                "placed in the appropriate memory locations"
                "from the Database Map for your version of "
                "the Database, using the Write Memory\n"
                "command, before the Execute Function\n"
                "command is given.\n\n\n\n\n\n\n"
                "                          ( )",

NULL
        );

char *EHelp [] = (
                "\n            DONE PROGRAMMING\n\n"
                "This function expects NO data, it is only "
                "a signal to the TRU to complete the remote"
                "programming.\n\n\n\n\n\n\n"
                "                          ( )",

NULL
        );

/************************************************************************
        TRUSim.C
        Main module for TRU Simulation Program
        10/25/88   DJB
************************************************************************/ include <STDLIB.H>
include <STDIO.H>
include <CONIO.H> include "comm.h"
include "trusim.h"

char Done = 0;
Display_Type Current_Display;
int Rev_Clr, Nrm_Clr;

static Display_Type Help_Display;
static struct text_info Window_Save;
static char Text_Save [1700];

extern void Interactive_Mode (char ch);
extern void Interactive_Help (char ch);
extern void Display_Inter_Screen ();

extern void Simulation_Mode (char ch);
extern void Simulation_Help (char ch);
extern void Display_Simul_Screen ();

extern void Remote_Programming (char ch);
extern void Remote_Help        (char ch);
extern void Display_Remote_Screen ();
```

```c
extern char *MMHelp [];

/*********************************************************************
 *********************************************************************/ static void Main_Menu_Help (char ch)
{
  static int PageDisplayed = 0;

switch (ch)
  {
    case CrUp : if (PageDisplayed)
                   --PageDisplayed;
                break;

case CrDn : if (MMHelp [++PageDisplayed] == NULL)
                   -- PageDisplayed;
  } gotoxy (1,1); clrscr ();
  cputs (MMHelp [PageDisplayed]);

} /* Main_Menu_Help */

/*********************************************************************
 *********************************************************************/ static void Display_Help ()
{
  Help_Display    = Current_Display;
  Current_Display = OnLine_Help;

gettextinfo (&Window_Save);
  gettext (16,5,65,21, Text_Save);

window (16,6,63,21); textattr (Nrm_Clr); clrscr ();
  window (18,5,65,20);. textattr (Rev_Clr); clrscr ();

cputs (" ēēēēēēēēēēēēēēē HELP TEXT ēēēēēēēēēēēēēēēē£ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" ¤                                          ¤ ");
  cputs (" āēēēēēēēēēēēēēēēēēēēēēēēēēēēēēēēēēēēēēēē¥");

window (21,6,62,19);

} /* Display_Help */

/*********************************************************************
 *********************************************************************/ static void Help_Handler (char ch)
{
  if (ch == ESC)
  {
    puttext (16,5,65,21, Text_Save);
    window (Window_Save.winleft, Window_Save.wintop,
            Window_Save.winright, Window_Save.winbottom);
    textattr (Window_Save.attribute);
    gotoxy (Window_Save.curx,Window_Save.cury);
    Current_Display = Help_Display;
  }
  else if (ch != NUL)
    switch (Help_Display)
```

```
      {
        case Initial_Display     : Main_Menu_Help   (ch); break;
        case Interactive_Display : Interactive_Help (ch); break;
        case Simulation_Display  : Simulation_Help  (ch); break;
        case Remote_Display      : Remote_Help      (ch); break;
      }
} /* Help_Handler */

/********************************************************************************
 ********************************************************************************/ void Display_Initial_Screen ()
{
  Current_Display = Initial_Display;

window (1,1,80,25);
  textattr (Nrm_Clr);
  clrscr ();

window (20,5,60,17);
  textattr (Rev_Clr);
  clrscr ();

gotoxy (8, 2); cputs ("GOLDSTAR CELLULAR PRODUCTS");
  gotoxy (3, 3); cputs ("Asynchronous Communications Simulator");

gotoxy (8, 5); cputs ("1) Run TRU Simulation Mode");
  gotoxy (8, 7); cputs ("2) Run Interactive Mode");
  gotoxy (8, 9); cputs ("3) Run Remote Programming");

gotoxy (8,11); cputs ("Enter Choice: ");

} /* Display_Open_Screen */

/********************************************************************************
 ********************************************************************************/ void Main_Menu (char ch)
{
  switch (ch)
  {
    case NUL : break;
    case ESC : Done = 1; break;
    case '1' :
    case '2' :
    case '3' : cprintf ("%c", ch);
               window (1,1,80,25);
               if (ch == '1')
                 Display_Simul_Screen ();
               else if (ch == '2')
                 Display_Inter_Screen ();
               else
                 Display_Remote_Screen ();
               break;
    default  : putch ('\a');
  }

} /* Main_Menu */

/********************************************************************************
 ********************************************************************************/ void Perform_Task ()
{
  char ch = 0;

if (kbhit ())
    if ((ch = getch ()) == 0)
      switch (ch = getch ())
      {
        case 30 : ch = A_A;  break;
        case 48 : ch = A_B;  break;
        case 46 : ch = A_C;  break;
        case 32 : ch = A_D;  break;
        case 33 : ch = A_F;  break;
```

```
            case 38 : ch = A_L;   break;
            case 25 : ch = A_P;   break;
            case 19 : ch = A_R;   break;
            case 31 : ch = A_S;   break;
            case 45 : ch = A_X;   break;
            case 72 : ch = CrUp;  break;
            case 80 : ch = CrDn;  break;
            case 59 : if (Current_Display != OnLine_Help)
                       { Display_Help(); break; }
            default : /*cprintf ("%d", ch);*/
                      ch = 0;
                      putch ('\a');
        } switch (Current_Display)
    {
      case Initial_Display     : Main_Menu          (ch); break;
      case Interactive_Display : Interactive_Mode   (ch); break;
      case Simulation_Display  : Simulation_Mode    (ch); break;
      case Remote_Display      : Remote_Programming (ch); break;
      case OnLine_Help         : Help_Handler       (ch); break;
    }
} /* Perform_Task */

/**************************************************************************
 **************************************************************************/ void Initialize ()
{
  struct text_info ti;
  gettextinfo (&ti);

Rev_Clr = (((ti.currmode == 7) || (ti.currmode == 2)) ? 0x70 : 0x1F);
  Nrm_Clr = 0x0F;

Init_Comm (COMMPORT,BAUD,8,1,PARITY);
  Display_Initial_Screen ();

} /* Initialize */

/**************************************************************************
 **************************************************************************/ void CleanUp ()
{
  Comm_Fix ();
  textattr (Nrm_Clr);
  clrscr ();
  gotoxy (1,1);

} /* CleanUp */

/**************************************************************************
 **************************************************************************/ void main ()
{
  Initialize ();

while (!Done)
    Perform_Task ();

CleanUp ();

} /* main */

/* TRUSim.C */
```

```
/********************************************************************
        Remote.C
        Routines for the Remote Programming Simulator
        10/26/88    DJB
********************************************************************/ include <STDIO.H>
include <STDLIB.H>
#include <CTYPE.H>
#include <ALLOC.H>
include <TIME.H> include "TRUSIM.H"
include "COMM.H"

#define LOGIN           1
#define READ_DATA       2
#define WRITE_DATA      3
#define EXECUTE_FUNC    4
define END_PROGRAM     5 define ACK             1
define NACK            2 define LOW_RAM         0x8000
define LOW_EEPROM      0xA000
define LOW_IO          0xE000 define RAM_SIZE        (LOW_EEPROM - LOW_RAM)
define EEPROM_SIZE     2048
define IO_SIZE         8192 typedef enum (
            No_Function,
            Login,
            Read_Data,
            Write_Data,
            Set_Address,
            Compare_Data,
            Execute_Function,
            Done_Programming ) Function_Type;

static char     *RamMemory;
static char     *EEMemory;
static unsigned MemPtr;

static char Key_Save [25][514];
static int  Line_Ptr    = 0;
static int  Char_Ptr    = 0;
static int  Restore_Ptr = 0;
static int  In_Restore  = 0;
static int  Display     = 1;
static int  COMM_ERROR  = 0;

Function_Type Current_Function = No_Function;

extern Display_Type Current_Display;
extern void Display_Initial_Screen ();
extern int Nrm_Clr, Rev_Clr;

extern char *NFHelp [];
extern char *LHelp [];
extern char *RHelp [];
extern char *WHelp [];
extern char *AHelp [];
extern char *CHelp [];
extern char *FHelp [];
extern char *EHelp [];

void Remote_Programming (char ch);

/********************************************************************
********************************************************************/
```

```
static void Store_Keystroke (char ch)
{
  if (ch == NUL)
    return;

if (ch == '\r')
  {
    if (++Line_Ptr == 25) Line_Ptr = 0;
    Char_Ptr = 0;
    Key_Save [Line_Ptr][0] = 0;
    In_Restore = 0;
  }
  else if (ch == '\b')
  {
    if (Char_Ptr) --Char_Ptr;
    Key_Save [Line_Ptr][Char_Ptr] = 0;
  }
  else
  {
    Key_Save [Line_Ptr][Char_Ptr++] = ch;
    Key_Save [Line_Ptr][Char_Ptr]   = 0;
  }

} /* Store_Keystroke */
/****************************************************************
 ***************************************************************/ static void Bad_Key ()
{
  if (Char_Ptr)
    Key_Save [Line_Ptr][--Char_Ptr] = 0;
  else if (Current_Function != No_Function)
  {
    if (--Line_Ptr < 0) Line_Ptr = 24;
    Char_Ptr = strlen (Key_Save [Line_Ptr]);
  } putch ('\a');

} /* Bad_Key */
/****************************************************************
 ***************************************************************/ static void Clear_Line ()
{
  Key_Save [Line_Ptr][0] = 0;
  Char_Ptr = 0;
  putch ('\r');
  clreol ();
  Current_Function = No_Function;

} /* Clear_Line */
/****************************************************************
 ***************************************************************/ static void Restore_Line (char ch)
{
  char *Ptr = "";
  int   count = 0;

if (!In_Restore)
    Restore_Ptr = Line_Ptr;
  In_Restore = 1;

while ((*Ptr == 0) && (count < 25))
  {
    Restore_Ptr += ((ch == CrUp) ? -1 : 1);
    if (Restore_Ptr < 0)  Restore_Ptr = 24; else
    if (Restore_Ptr > 24) Restore_Ptr = 0;
    Ptr = Key_Save [Restore_Ptr];
    ++count;
  } if (*Ptr)
  {
    if (Current_Function != No_Function)
```

```c
      Remote_Programming (ESC);

while (*Ptr)
      Remote_Programming (*Ptr++);
   }
} /* Restore_Line */

/*****************************************************************************
 *****************************************************************************/ static void Display_Address ()
{
  int ox = wherex (), oy = wherey ();
  window (1,1,80,25); gotoxy (30,3);
  textattr (Rev_Clr);
  cprintf ("Current Address: %04X", MemPtr);
  textattr (Nrm_Clr);
  window (4,4,77,24); gotoxy (ox,oy);

} /* Display_Address */

/*****************************************************************************
 *****************************************************************************/
static void LRC_Val (unsigned char *LRC, unsigned char ch)
{
  unsigned tmp = *LRC + ch;
  *LRC = (unsigned char)((tmp << 1) | ((tmp >> 7) & 0x01));

} /* LRC_Val */

/*****************************************************************************
 *****************************************************************************/ static void Xmit (unsigned char ch)
{
  Xmt_Char (COMMPORT, ch);
/*cprintf ("[%02X]", ch);   /* DEBUG */*/

} /* Xmit */

/*****************************************************************************
 *****************************************************************************/ static unsigned char Recv ()
{
  unsigned char ch = Rcv_Char (COMMPORT);
/*textattr (Rev_Clr);       /* DEBUG */
  cprintf ("[%02X]", ch);   /* DEBUG */
  textattr (Nrm_Clr);       /* DEBUG */*/
  return (ch);

} /* Recv */

/*****************************************************************************
 *****************************************************************************/ static int Receive_Message (char Command, unsigned char Count)
{
  unsigned char LRC = 0;
  char Temp [256];
  char ch;
  int  Cnt;
  time_t t1,t2;

t2 = time (&t1) + 2;
  LRC_Val (&LRC, ACK);

while ((Rcv_Count (COMMPORT) < (int)Count + 1) && (t1 <= t2))
     time (&t1);

if (Rcv_Count (COMMPORT) < (int)Count + 1)
  {
     while (Rcv_Count (COMMPORT)) Recv ();
/*   cputs ("\n");    /* DEBUG */*/
     cputs ("  COMM ERROR: Incomplete Message Received!\n");
     COMM_ERROR = 1;
     return (0);
  }
```

```c
    if (Count)
    {
      Cnt = 0;
      if (Display)
        cputs ("  RECEIVED: ");
      while (Cnt < Count)
      {
        ch = Recv ();
        LRC_Val (&LRC, ch);
        if (Command == READ_DATA)
          Temp [Cnt++] = ch;
        if (Display)
          cprintf ("%02X ", (unsigned char)ch);
      }
      if (Display)
        putch('\n');
    } if ((ch = Recv ()) != LRC)
    {
      cprintf ("  COMM ERROR: LRC Error! Rcvd: %02X Calc: %02X\n", ch, LRC);
      COMM_ERROR = 1;
      return (0);
    }
    else if (Command == READ_DATA)
      for (Cnt = 0; Cnt < Count; Cnt++,MemPtr++)
        if ((MemPtr >= LOW_RAM) && (MemPtr < LOW_EEPROM))
          RamMemory [MemPtr-LOW_RAM] = Temp [Cnt];
        else if ((MemPtr >= LOW_EEPROM) && (MemPtr < LOW_EEPROM + EEPROM_SIZE))
          EEMemory [MemPtr-LOW_EEPROM] = Temp [Cnt];

return (1);

} /* Receive_Message */
/******************************************************************************
 ******************************************************************************/
static void Send_Message (char Command, unsigned char len, char *Mess)
{
  unsigned char LRC;
  unsigned char Len;
  unsigned char ch;
  long t1,t2;
  char *Str, Done = 0;
  int Retry_Count = 0;

COMM_ERROR = 0;

while (!Done)
  {
    Str = Mess;
    Len = len;
    LRC = 0;
    Xmit (Command);
    LRC_Val  (&LRC, Command);

if ((Command == LOGIN) || (Command == READ_DATA) || (Command == WRITE_DATA))
    {
      Xmit (Len);
      LRC_Val  (&LRC, Len);
    } if ((Command == READ_DATA) || (Command == WRITE_DATA))
    {
      ch = (unsigned char)MemPtr;
      Xmit (ch);
      LRC_Val  (&LRC, ch);

ch = (unsigned char)(MemPtr >> 8);
      Xmit (ch);
      LRC_Val  (&LRC, ch);
    } if ((Command == WRITE_DATA) || (Command == LOGIN) || (Command == EXECUTE_FUNC))
    {
      ++Len;
      while (--Len)
      {
        Xmit (*Str);
```

```
            LRC_Val  (&LRC, *Str++);
        }
      }
      Xmit (LRC);
/*    putch ('\n'); /* DEBUG */*/ while (Xmt_Free (COMMPORT) < BUFFER_LEN);
      t1 = time (&t2) + 2;
      while ((Rcv_Count (COMMPORT) < 2) && (t2 <= t1))
        time (&t2);

if (Rcv_Count (COMMPORT))
      {
        if (Recv () != ACK)
        {
          while (Rcv_Count (COMMPORT)) Recv ();
/*        cputs ("\n"); /* DEBUG */*/
          if (++Retry_Count == 5)
          {
            Done = 1;
            cputs ("  COMM ERROR: Unit NACKed!\n");
            COMM_ERROR = 1;
          }
        }
        else
        {
          if (Receive_Message (Command, Len))
          {
/*          cputs ("\n"); /* DEBUG */*/
            Done = 1;
            if (Display)
              cputs ("  Command Acknowledged.\n");
            if (Command == WRITE_DATA) MemPtr += len;
            Display_Address ();
          }
          else if (++Retry_Count == 5)
          {
/*          cputs ("\n"); /* DEBUG */*/
            Done = 1;
            cputs ("  COMM ERROR: Max Retry Count Exceeded!\n");
            COMM_ERROR = 1;
          }
        }
      }
      else
      {
        cputs ("  COMM ERROR: No Reponse!\n");
        COMM_ERROR = 1;
        Done = 1;
      }
  }
} /* Send_Message */

/**********************************************************************
 **********************************************************************/ static void Write_Memory (char *Str)
{
  char Byt;
  char Temp [255];
  int  i,Count = 0;
  unsigned MPtr = MemPtr;

while (*Str)
  {
    Byt = *Str - (isdigit (*Str) ? '0' : 'A' - 10 );
    ++Str;
    if (*Str)
    {
      Byt = (Byt << 4) + (*Str - (isdigit (*Str) ? '0' : 'A' - 10));
      ++Str;
    }

Temp [Count++] = Byt;
  }
```

```c
    for (i = 0; i < Count; ++i, ++MPtr)
      if ((MPtr >= LOW_RAM) && (MPtr < LOW_EEPROM))
        RamMemory [MPtr - LOW_RAM] = Temp [i];
      else if ((MPtr >= LOW_EEPROM) && (MPtr < LOW_EEPROM + EEPROM_SIZE))

EEMemory [MPtr - LOW_EEPROM] = Temp [i];

Send_Message (WRITE_DATA, Count, Temp);

} /* Write_Memory */

/*************************************************************************
 *************************************************************************/ static void Compare_Memory (unsigned Len)
{
  unsigned L2;
  char *OldMem, *P1,*P2;

if ((MemPtr >= LOW_RAM) && (MemPtr < LOW_EEPROM))
  {
    OldMem = farmalloc (RAM_SIZE);
    memcpy (OldMem, RamMemory, RAM_SIZE);
    P1 = OldMem    + (MemPtr - LOW_RAM);
    P2 = RamMemory + (MemPtr - LOW_RAM);

if (MemPtr + Len > LOW_EEPROM)
      Len = LOW_EEPROM - MemPtr;
  }
  else
  {
    OldMem = farmalloc (EEPROM_SIZE);
    memcpy (OldMem, EEMemory, EEPROM_SIZE);
    P1 = OldMem    + (MemPtr - LOW_EEPROM);
    P2 = EEMemory + (MemPtr - LOW_EEPROM);

if (MemPtr + Len > LOW_EEPROM + EEPROM_SIZE)
      Len = LOW_EEPROM + EEPROM_SIZE - MemPtr;
  }

L2 = Len;
  while (L2 >= 0xFE)
  {
    Send_Message (READ_DATA, 0xFE, "");
    if (COMM_ERROR)
      L2 = 0;
    else
      L2 -= 0xFE;
  }
  if (L2)
    Send_Message (READ_DATA, L2, "");

cputs ("  Memory Comparison: ");
  if (COMM_ERROR || memcmp (P1, P2, Len))
    cputs ("Failed!\n");
  else
    cputs ("O.K.\n");

farfree (OldMem);

} /* Compare_Memory */

/*************************************************************************
 *************************************************************************/ static void Perform_Function ()
{
  char *Str;
  unsigned tmp;
  int Func_Ptr = Line_Ptr;
  if (--Func_Ptr < 0) Func_Ptr = 24;
  Str = Key_Save [Func_Ptr];

putch ('\n');
  Current_Function = No_Function;
```

```c
   switch (*Str++)
   {
     case 'L' : Send_Message (LOGIN, strlen (Str), Str);
                break;
     case 'R' : sscanf (Str, "%X", &tmp);
                Send_Message (READ_DATA, tmp, "");
                break;
     case 'W' : Write_Memory (Str);
                break;
     case 'S' : sscanf (Str, "%X", &tmp);
                MemPtr = tmp;
                Display_Address ();
                break;
     case 'C' : sscanf (Str, "%X", &tmp);
                Compare_Memory (tmp);
                break;
     case 'E' : sscanf (Str, "%X", &tmp);
                Send_Message (EXECUTE_FUNC, 1, (char *)&tmp);
                break;
     case 'D' : Send_Message (END_PROGRAM, 0, "");
   }

} /* Perform_Function */

/*************************************************************************
 *************************************************************************/ static void No_Function_Menu (char ch)
{
  switch (ch)
  {
    case 'L' :
    case 'l' : cputs ("Login ");
               Current_Function = Login;
               break;
    case 'W' :
    case 'w' : cputs ("Write ");
               Current_Function = Write_Data;
               break;
    case 'R' :
    case 'r' : cputs ("Read ");
               Current_Function = Read_Data;
               break;
    case 'S' :
    case 's' : cputs ("Set Address ");
               Current_Function = Set_Address;
               break;
    case 'C' :
    case 'c' : cputs ("Compare ");
               Current_Function = Compare_Data;
               break;
    case 'E' :
    case 'e' : cputs ("Execute Function ");
               Current_Function = Execute_Function;
               break;
    case 'D' :
    case 'd' : cputs ("Done Programming ");
               Current_Function = Done_Programming;
    case NUL : break;
    case ESC : farfree (RamMemory);
               farfree (EEMemory);
               Display_Initial_Screen ();
               break;
    default  : Bad_Key ();
  }
} /* No_Function_Menu */

/*************************************************************************
 *************************************************************************/ static int Command_Len ()
{
  int Ptr = Line_Ptr;
```

```c
    if (--Ptr < 0) Ptr = 24;
    return (strlen (Key_Save [Ptr]));
} /* Command_Len */

/*****************************************************************
*****************************************************************/ static void Login_Password (char ch)
{
  switch (ch)
  {
    case NUL : break;
    case '\b': if (Char_Ptr)
                 {
                   if (wherex () == 1)
                   {
                     gotoxy (74,wherey ()-1);
                     putch (' ');
                     gotoxy (74,wherey ()-1);
                   }
                   else
                   {
                     gotoxy (wherex()-1,wherey());
                     putch (' ');
                     gotoxy (wherex()-1,wherey());
                   }
                 }
               else
                 Clear_Line ();
               break;
    case '\r': if (Command_Len () == 1)
                  Bad_Key ();
               else
                  Perform_Function ();
               break;
    case ESC : Clear_Line ();
               break;
    default  : if (isalnum (ch))
                 {
                   if (Char_Ptr < 514)
                     cprintf ("%c", ch);
                   else
                     Bad_Key ();
                 }
               else
                 Bad_Key ();
  }
} /* Login_Password */

/*****************************************************************
*****************************************************************/ static void Read_Length (char ch)
{
  switch (ch)
  {
    case NUL : break;
    case 'A' :
    case 'B' :
    case 'C' :
    case 'D' :
    case 'E' :
    case 'F' :
    case '0' :
    case '1' :
    case '2' :
    case '3' :
    case '4' :
    case '5' :
    case '6' :
    case '7' :
    case '8' :
    case '9' : if (Char_Ptr < 4)
                  cprintf ("%c", ch);
               else
                  Bad_Key ();
               break;
```

```
           case '\b': if (Char_Ptr)
                     {
                       gotoxy (wherex()-1,wherey());
                       putch (' ');
                       gotoxy (wherex()-1,wherey());
                     }
                     else
                       Clear_Line ();
                     break;
           case '\r': if (Command_Len () == 1)
                       Bad_Key ();
                     else
                       Perform_Function ();
                     break;
           case ESC : Clear_Line ();
                     break;
           default  : Bad_Key ();
    }
} /* Read_Length */

/***********************************************************************
 ***********************************************************************/ static void Write_Bytes (char ch)
{
  int Clen;

switch (ch)
  {
    case NUL : break;
    case 'A' :
    case 'B' :
    case 'C' :
    case 'D' :
    case 'E' :
    case 'F' :
    case '0' :
    case '1' :
    case '2' :
    case '3' :
    case '4' :
    case '5' :
    case '6' :
    case '7' :
    case '8' :
    case '9' : if (Char_Ptr < 514)
               {
                 cprintf ("%c", ch);
                 if ((Char_Ptr % 2) == 1)
                   putch (' ');
               }
               else
                 Bad_Key ();
               break;
    case '\b': if (Char_Ptr)
               {
                 if ((Char_Ptr % 2) == 0)
                   if (wherex () == 1)
                     gotoxy (74, wherey ()-1);
                   else
                     gotoxy (wherex()-1,wherey());

if (wherex () == 1)
                 {
                   gotoxy (74,wherey ()-1);
                   putch (' ');
                   gotoxy (74,wherey ()-1);
                 }
                 else
                 {
                   gotoxy (wherex()-1,wherey());
                   putch (' ');
                   gotoxy (wherex()-1,wherey());
                 }
```

```
                              )
                              else
                                Clear_Line ();
                              break;
          case '\r': Clen = Command_Len ();
                    if ((Clen == 1) || ((Clen % 2) == 0))
                      Bad_Key ();
                    else
                      Perform_Function ();
                    break;
          case ESC : Clear_Line ();
                     break;
          default  : Bad_Key ();
        }
      } /* Write_Bytes */

/****************************************************************************
 ****************************************************************************/ static void Address_Bytes (char ch)
      {
        switch (ch)
        {
          case NUL : break;
          case 'A' :
          case 'B' :
          case 'C' :
          case 'D' :
          case 'E' :
          case 'F' :
          case '0' :
          case '1' :
          case '2' :
          case '3' :
          case '4' :
          case '5' :
          case '6' :
          case '7' :
          case '8' :
          case '9' : if (Char_Ptr < 6)
                       cprintf ("%c", ch);
                     else
                       Bad_Key ();
                     break;
          case '\b': if (Char_Ptr)
                     {
                       gotoxy (wherex()-1,wherey());
                       putch (' ');
                       gotoxy (wherex()-1,wherey());
                     }
                     else
                       Clear_Line ();
                     break;
          case '\r': if (Command_Len () == 1)
                       Bad_Key ();
                     else
                       Perform_Function ();
                     break;
          case ESC : Clear_Line ();
                     break;
          default  : Bad_Key ();
        }
      } /* Address_Bytes */

/****************************************************************************
 ****************************************************************************/ static void Compare_Length (char ch)
      {
        switch (ch)
        {
          case NUL : break;
          case 'A' :
          case 'B' :
          case 'C' :
```

```c
         case 'D' :
         case 'E' :
         case 'F' :
         case '0' :
         case '1' :
         case '2' :
         case '3' :
         case '4' :
         case '5' :
         case '6' :
         case '7' :
         case '8' :
         case '9' : if (Char_Ptr < 5)
                       cprintf ("%c", ch);
                    else
                       Bad_Key ();
                    break;
         case '\b': if (Char_Ptr)
                       {
                          gotoxy (wherex()-1,wherey());
                          putch (' ');
                          gotoxy (wherex()-1,wherey());
                       }
                    else
                       Clear_Line ();
                    break;
         case '\r': if (Command_Len () == 1)
                       Bad_Key ();
                    else
                       Perform_Function ();
                    break;
         case ESC : Clear_Line ();
                    break;
         default  : Bad_Key ();
      }
} /* Compare_Length */

/****************************************************************************
 ****************************************************************************/ static void Function_Number (char ch)
{
   switch (ch)
   {
      case NUL : break;
      case 'A' :
      case 'B' :
      case 'C' :
      case 'D' :
      case 'E' :
      case 'F' :
      case '0' :
      case '1' :
      case '2' :
      case '3' :
      case '4' :
      case '5' :
      case '6' :
      case '7' :
      case '8' :
      case '9' : if (Char_Ptr < 4)
                    cprintf ("%c", ch);
                 else
                    Bad_Key ();
                 break;
      case '\b': if (Char_Ptr)
                    {
                       gotoxy (wherex()-1,wherey());
                       putch (' ');
                       gotoxy (wherex()-1,wherey());
                    }
                 else
                    Clear_Line ();
                 break;
```

```c
    case '\r': if (Command_Len () == 1)
                 Bad_Key ();
               else
                 Perform_Function ();
               break;
    case ESC : Clear_Line ();
               break;
    default  : Bad_Key ();
  }
} /* Function_Number */

/****************************************************************************
 ****************************************************************************/ static void Verify_End (char ch)
{
  switch (ch)
  {
    case NUL : break;
    case '\b': Clear_Line ();
               break;
    case '\r': Perform_Function ();
               break;
    case ESC : Clear_Line ();
               break;
    default  : Bad_Key ();
  }
} /* Function_Number */

/****************************************************************************
 ****************************************************************************/ static void NoFunction_Help (char ch)
{
  static int PageDisplayed = 0;

switch (ch)
  {
    case CrUp : if (PageDisplayed)
                   --PageDisplayed;
                break;

case CrDn : if (NFHelp [++PageDisplayed] == NULL)
                   -- PageDisplayed;
  } gotoxy (1,1); clrscr ();
  cputs (NFHelp [PageDisplayed]);

} /* NoFunction_Help */

/****************************************************************************
 ****************************************************************************/ static void Login_Help (char ch)
{
  static int PageDisplayed = 0;

switch (ch)
  {
    case CrUp : if (PageDisplayed)
                   --PageDisplayed;
                break;

case CrDn : if (LHelp [++PageDisplayed] == NULL)
                   -- PageDisplayed;
  } gotoxy (1,1); clrscr ();
  cputs (LHelp [PageDisplayed]);

} /* Login_Help */

/****************************************************************************
 ****************************************************************************/
```

```c
static void Read_Help (char ch)
{
  static int PageDisplayed = 0;

switch (ch)
  {
    case CrUp : if (PageDisplayed)
                  --PageDisplayed;
                break;

case CrDn : if (RHelp [++PageDisplayed] == NULL)
                  -- PageDisplayed;
  } gotoxy (1,1); clrscr ();
  cputs (RHelp [PageDisplayed]);

} /* Read_Help */

/*********************************************************************
 *********************************************************************/ static void Write_Help (char ch)
{
  static int PageDisplayed = 0;

switch (ch)
  {
    case CrUp : if (PageDisplayed)
                  --PageDisplayed;
                break;

case CrDn : if (WHelp [++PageDisplayed] == NULL)
                  -- PageDisplayed;
  } gotoxy (1,1); clrscr ();
  cputs (WHelp [PageDisplayed]);

} /* Write_Help */

/*********************************************************************
 *********************************************************************/ static void Address_Help (char ch)
{
  static int PageDisplayed = 0;

switch (ch)
  {
    case CrUp : if (PageDisplayed)
                  --PageDisplayed;
                break;

case CrDn : if (AHelp [++PageDisplayed] == NULL)
                  -- PageDisplayed;
  } gotoxy (1,1); clrscr ();
  cputs (AHelp [PageDisplayed]);

} /* Address_Help */

/*********************************************************************
 *********************************************************************/ static void Compare_Help (char ch)
{
  static int PageDisplayed = 0;

switch (ch)
  {
    case CrUp : if (PageDisplayed)
                  --PageDisplayed;
                break;
```

```
      case CrDn : if (CHelp [++PageDisplayed] == NULL)
                     -- PageDisplayed;
  } gotoxy (1,1); clrscr ();
  cputs (CHelp [PageDisplayed]);

} /* Compare_Help */

/****************************************************************************
 ****************************************************************************/ static void Function_Help (char ch)
{
  static int PageDisplayed = 0;

switch (ch)
  {
    case CrUp : if (PageDisplayed)
                   --PageDisplayed;
                break;

case CrDn : if (FHelp [++PageDisplayed] == NULL)
                   -- PageDisplayed;
  } gotoxy (1,1); clrscr ();
  cputs (FHelp [PageDisplayed]);

} /* Function_Help */

/****************************************************************************
 ****************************************************************************/ static void End_Help (char ch)
{
  static int PageDisplayed = 0;

switch (ch)
  {
    case CrUp : if (PageDisplayed)
                   --PageDisplayed;
                break;
    case CrDn : if (EHelp [++PageDisplayed] == NULL)
                   -- PageDisplayed;
  } gotoxy (1,1); clrscr ();
  cputs (EHelp [PageDisplayed]);

} /* End_Help */

/****************************************************************************
 ****************************************************************************/ void Remote_Help (char ch)
{
  switch (Current_Function)
  {
    case No_Function      : NoFunction_Help (ch);
                            break;
    case Login            : Login_Help (ch);
                            break;
    case Read_Data        : Read_Help (ch);
                            break;
    case Write_Data       : Write_Help (ch);
                            break;
    case Set_Address      : Address_Help (ch);
                            break;
    case Compare_Data     : Compare_Help (ch);
                            break;
    case Execute_Function : Function_Help (ch);
                            break;
    case Done_Programming : End_Help (ch);
  }
```

} /* Remote_Help */

/***************************************************************************
 ***************************************************************************/

```
void Remote_Programming (char ch)
{
  if ((ch == CrUp) || (ch == CrDn))
    Restore_Line (ch);
  else
  {
    if (islower (ch)) ch += 'A' - 'a';

Store_Keystroke (ch);

switch (Current_Function)
    {
      case No_Function      : No_Function_Menu (ch);
                              break;
      case Login            : Login_Password (ch);
                              break;
      case Read_Data        : Read_Length (ch);
                              break;
      case Write_Data       : Write_Bytes (ch);
                              break;
      case Set_Address      : Address_Bytes (ch);
                              break;
      case Compare_Data     : Compare_Length (ch);
                              break;
      case Execute_Function : Function_Number (ch);
                              break;
      case Done_Programming : Verify_End (ch);
    }
  }
} /* Remote_Programming */
```

/***************************************************************************
 ***************************************************************************/

```
void Display_Remote_Screen ()
{
  int i;

window (1,1,80,25);
  textattr (Rev_Clr);
  clrscr ();

RamMemory = farmalloc (RAM_SIZE);

EEMemory = farmalloc (EEPROM_SIZE);
  Clear_Line ();

gotoxy (32,2); cputs ("REMOTE PROGRAMMING");
  gotoxy (30,3); cprintf ("Current Address: %04X", MemPtr);

window (3,4,78,24);
  textattr (Nrm_Clr);
  clrscr ();
  window (4,4,77,24);

Current_Display = Remote_Display;

/*
  Display = 0;
  MemPtr = LOW_RAM;                         /* Load RAM into Memory */
  for (i = RAM_SIZE; i >= 0xFE; i -= 0xFE)
  {
    Send_Message (READ_DATA, 0xFE, "");
    if (COMM_ERROR)
      i = 0xFE;
  }
  if (i) Send_Message (READ_DATA, i, "");

MemPtr = LOW_EEPROM;                      /* Load EEPROM into Memory */
  for (i = EEPROM_SIZE; i >= 0xFE; i -= 0xFE)
```

```
{
  Send_Message (READ_DATA, OxFE, "");
  if (COMM_ERROR)
    i = OxFE;
}
if (i) Send_Message (READ_DATA, i, "");
Display = 1;
*/

MemPtr = LOW_EEPROM;
  Display_Address ();

} /* Display_Remote_Screen */

/* Remote.C */
```

APPENDIX "2"
(Adapter)

```
##########################################################################
#                                                                        #
#    Archimedes 8051 Assembler V1.80/MD2         22/Feb/90  14:26:37     #
#                                                                        #
#       Source  =  rpimain.s03                                           #
#       List    =  ..\lst\rpimain.lst                                    #
#       Object  =  ..\obj\rpimain.r03                                    #
#       Options =  f                                                     #
#                                                                        #
(c) Copyright Archimedes Software 1985 #
##########################################################################

1  0000                  extern  init_parts, chk_h_cmd, chk_tp_char, dial_mcp,lamp_tst
  2  0000                  extern  ring_int_isr, duart_int_isr,b_rx_ser,srb,dis_clk
  3  0000                  extern  capt_dial_digit, full_dux, off_hook, A_chr_rcv
  4  0000                  extern  T_chr_rcv, b_rx_event, cmd_compl, init_cmd, crb
  5  0000                  extern  dial_cmd, tp_char, connect_error, hang_cmd,cmd_ident
  6  0000                  extern  cleanup,ring_event,in_call
  7
  8  0000                  RSEG    CSTART
  9
 10  0000       startup:
 11  0000 020000            Ljmp    init_rpi
 12
 13  0003                   ORG     startup+03H
 14
 15  0003 020000            Ljmp    ring_int_isr
 16
 17  000B                   ORG     startup+0BH
 18
 19  000B 32                reti
 20
 21  0013                   org     startup+13h
 22
 23  0013 020000            ljmp    duart_int_isr
 24
 25  001B                   org     startup+1bh
 26
 27  001B 32                reti
 28
 29  0023                   org     startup+23h
 30
 31  0023 32                reti
 32
 33  002B                   org     startup+2bh
 34
 35  002B 32                reti
 36
 37
 38  002C       table_1:
 39  002C 0B                db      0bh
 40  002D 08                db      08h
 41  002E 08                db      08h
```

```
42  002F 08                db      08h
43  0030 09                db      09h
44  0031 09                db      09h
45  0032 09                db      09h
46  0033 0A                db      0ah
47  0034 0A                db      0ah
48  0035 0A                db      0ah
49  0036         table_2:
50  0036 0D                db      0dh
51  0037 0C                db      0ch
52  0038 0D                db      0dh
53  0039 0E                db      0eh
54  003A 0C                db      0ch
55  003B 0D                db      0dh
56  003C 0E                db      0eh
57  003D 0C                db      0ch
58  003E 0D                db      0dh
59  003F 0E                db      0eh
60  0040         table_3:
61  0040 01                db      01h
62  0041 06                db      06h
63  0042 31                db      31h
64  0043 38                db      38h
65  0044 31                db      31h
66  0045 36                db      36h
67  0046 30                db      30h
68  0047 39                db      39h
69  0048 4F                db      4fh
70
71
72  0000                   RSEG    CODE
73  0000                   public  init_rpi, table_1, table_2, table_3
74
75  0000         init_rpi:
76                         ;--
77                         ;-- initialize PSW to select register bank 0
78                         ;--
79  0000 E4                clr     a
80  0001 F5D0              mov     psw,a
81                         ;--
82                         ;-- initialize stack pointer
83                         ;--
84  0003 75812F            mov     sp,#2fh
85                         ;--
86                         ;-- initialize interrupt enables
87                         ;--
88  0006 75A801            mov     ie,#01h       ; interrupts disabled
89
90                         ;--
91                         ;-- initialize memory addressable circuit partions
92                         ;--
93  0009 120000            call    init_parts
94                         ;--
95                         ;-- clear b channel receive event flag
96                         ;--
97  000C C200              clr     b_rx_event
98                         ;--
99                         ;-- perform lamp test
100                        ;--
101 000E 120000            call    lamp_tst
102
103                        ;--
104                        ;--    write `aa' (hex) to display
105                        ;--
106 0011 74AA              mov     a,#0aah
107 0013 900000            mov     dptr,#dis_clk
108 0016 F0                movx    @dptr,a
109
110                        ;-- wait for initialization command from host
111                        ;--
112                        ;-- clear hayes command decoding flags
113                        ;--
114 0017         label_1b:
115 0017 C200              clr     A_chr_rcv
116 0019 C200              clr     T_chr_rcv
```

```
117  001B C200              clr    cmd_ident
118  001D C200              clr    cmd_compl
119  001F C200              clr    init_cmd
120  0021 C200              clr    dial_cmd
121  0023 C200              clr    hang_cmd
122
123                      ;--
124                      ;--   check for character received on b channel
125                      ;--
126                      ;--   check if "Rx Ready" bit of b channel staus register is set
127                      ;--
128  0025         label_1a:
129  0025 900000           mov    dptr,#srb      ; read b ch. status register
130  0028 E0               movx   a,@dptr
131  0029 5401             anl    a,#01h         ; mask off Rx Ready bit
132  002B 7003             jnz    label_1h
133  002D 2094F5           jb     p1.4,label_1a ; keep looking
134
135  0030         label_1h:
136                      ;--
137                      ;--   call routine to read character
138                      ;--
139  0030 120000           call   b_rx_ser
140                      ;--
141                      ;--   check if hayes initialize command
142                      ;--
143  0033 120000           call   chk_h_cmd
144
145  0036 3000EC           jnb    cmd_compl,label_1a ; command not complete
146                                                  ; keep looking
147  0039 3000DB           jnb    init_cmd,label_1b ; not initialization command
148                                                  ; keep looking
149                      ;--
150                      ;--   wait for dial command from host
151                      ;--
152                      ;--   clear hayes command decode flags
153                      ;--
154  003C         label_1c:
155  003C C200             clr    A_chr_rcv
156  003E C200             clr    T_chr_rcv
157  0040 C200             clr    cmd_ident
158  0042 C200             clr    cmd_compl
159  0044 C200             clr    init_cmd
160  0046 C200             clr    dial_cmd
161  0048 C200             clr    hang_cmd
162                      ;--
163                      ;--   write 'c3' to display
164                      ;--
165  004A 74C3             mov    a,#0c3h
166  004C 900000           mov    dptr,#dis_clk
167  004F F0               movx   @dptr,a
168
169                      ;--
170                      ;--   enable ring interrupt
171                      ;--
172  0050 75A881           mov    ie,#81h
173                      ;--
174                      ;--   check for character received on b channel
175                      ;--
176                      ;--   check if "Rx Ready" bit of b channel status register is set
177                      ;--
178  0053         label_1d:
179  0053 900000           mov    dptr,#srb      ; read b channel status register
180  0056 E0               movx   a,@dptr
181  0057 5401             anl    a,#01h         ; mask off Rx Ready bit
182
183  0059 7009             jnz    label_1k       ; keep looking
184
185                      ;--
186                      ;--   check for ring interrupt
187                      ;--
188  005B 3000F5           jnb    ring_event,label_1d
189                      ;--
190                      ;--   call subroutine for incoming rpi call
191                      ;--
```

```
192  005E 120000              call    in_call
193  0061 02008A              jmp     label_1l
194                           ;--
195                           ;--  call routine to read character
196                           ;--
197  0064            label_1k:
198  0064 120000              call    b_rx_ser
199
200                           ;--
201                           ;--  check if hayes dial command
202                           ;--
203  0067 120000              call    chk_h_cmd
204  006A 3000E6              jnb     cmd_compl,label_1d ; command not complete
205                                                      ; keep looking
206  006D 3000CC              jnb     dial_cmd,label_1c ; not dial command
207                                                      ; keep looking
208                           ;--
209                           ;--  check tone/pulse dial character
210                           ;--
211                           ;--  check for character received on b channel
212                           ;--
213  0070            label_1e:
214  0070 900000              mov     dptr,#srb      ; read b channel status register
215  0073 E0                  movx    a,@dptr
216  0074 5401               anl     a,#01h         ; mask off Rx Ready bit
217
218  0076 60F8                jz      label_1e       ; keep looking
219                           ; --
220                           ;--  call routine to read character
221                           ;--
222  0078 120000              call    b_rx_ser
223                           ;--
224                           ;--  call routine to check for tone/pulse dial character
225                           ;--
226  007B 120000              call    chk_tp_char
227  007E 300088              jnb     tp_char, label_1c ; wrong character, keep looking
228                           ;--
229                           ;--  capture digits to be dialed
230                           ;--
231
232  0081 120000              call    capt_dial_digit
233
234                           ;--
235                           ;--  dial mcp and set-up RPI session
236                           ;--
237  0084 120000              call    dial_mcp
238                           ;--
239                           ;--  check if connection made
240                           ;--
241  0087 200003              jb      connect_error, label_1f
242                           ;--
243                           ;--  start full-duplex pipeline from host to mcp
244                           ;--
245  008A            label_1l:
246  008A 120000              call    full_dux
247                           ;--
248                           ;--  terminate call and set-up for reinitialization
249                           ;--
250  008D            label_1f:
251  008D 120000              call    cleanup
252  0090 80AA                jmp     label_1c
253
254  0092                     end Errors:  None       ###########
Bytes:   188        # rpimain #
CRC:     FAC2       ###########
```

```
###########################################################################
#                                                                         #
#   Archimedes 8051 Assembler V1.80/MD2         22/Feb/90  14:27:10       #
#                                                                         #
#       Source   =  rpi_equ.s03                                           #
#       List     =  ..\lst\rpi_equ.lst                                    #
#       Object   =  ..\obj\rpi_equ.r03                                    #
#       Options  =  f                                                     #
#                                                                         #
(c) Copyright Archimedes Software 1985 #
###########################################################################

1  0000                  public   duart,mr1a,mr2a,csra,cra,acr,duart_imr,mr1b
  2  0000                  public   mr2b,csrb,crb,opcr,dtmf1,dtmf2,off_hook
  3  0000                  public   cpd_d_vld,digit_cnt_loc,cpd,clear_cpd,c_detect
  4  0000                  public   dial_digit_base,duart_isr,rhra,rhrb,thra,thrb
  5  0000                  public   a_byte_rx,b_byte_rx,dtmf_sel,b_rx_event
  6  0000                  public   A_chr_rcv,T_chr_rcv,init_cmd,dial_cmd,hang_cmd,cmd_compl
  7  0000                  public   connect_error,tone_dial,pulse_dial,tp_char,cmd_ident
  8  0000                  public   a_rx_event,sra,srb,reset_dopb,set_dopb
  9  0000                  public   ex_prt,dis_clk,ring_event, queue_data, front_q, end_q
 10
 11  8010     duart     equ   08010h
 12  8010     mr1a      equ   08010h
 13  8010     mr2a      equ   08010h
 14  8011     csra      equ   08011h
 15  8012     cra       equ   08012h
 16  8014     acr       equ   08014h
 17  8015     duart_imr equ   08015h
 18  8018     mr1b      equ   08018h
 19  8018     mr2b      equ   08018h
 20  8019     csrb      equ   08019h
 21  801A     crb       equ   0801ah
 22  801D     opcr      equ   0801dh
 23  8011     sra       equ   08011h
 24  8019     srb       equ   08019h
 25
 26  801F     reset_dopb equ  0801fh
 27  801E     set_dopb   equ  0801eh
 28
 29  8020     dtmf1     equ   08020h
 30  8040     dtmf2     equ   08040h
 31
 32  0091     off_hook  equ   p1.1
 33  0092     cpd_d_vld equ   p1.2
 34  0042     digit_cnt_loc equ 042h
 35  8080     cpd       equ   08080h
 36  0093     clear_cpd equ   p1.3
 37  0090     c_detect  equ   p1.0
 38  0044     dial_digit_base equ 44h
 39
 40  8015     duart_isr equ   08015h
 41
 42  8013     rhra      equ   08013h
 43  801B     rhrb      equ   0801bh
 44  8013     thra      equ   08013h
 45  801B     thrb      equ   0801bh
 46  0041     a_byte_rx equ   41h
 47  0040     b_byte_rx equ   40h
 48  005E     front_q   equ   5eh
 49  005F     end_q     equ   5fh
 50
 51  0044              org    044h
 52  0044     dial_digits ds  20h
 53
 54               ;modem_orig     db      80h
 55
 56  0064              aseg
 57  0020              org    20h
 58  0020     flag1s:   ds     1
 59
 60  0000     dtmf_sel:   equ   flag1s.0
 61  0001     b_rx_event: equ   flag1s.1
 62  0002     A_chr_rcv:  equ   flag1s.2
```

```
63  0003                T_chr_rcv:    equ    flag1s.3
64  0004                init_cmd:     equ    flag1s.4
65  0005                dial_cmd:     equ    flag1s.5
66  0006                hang_cmd:     equ    flag1s.6
67  0007                connect_error: equ   flag1s.7
68
69  0021                flag2s:       ds     1
70
71  0008                tone_dial:    equ    flag2s.0
72  0009                pulse_dial:   equ    flag2s.1
73  000A                tp_char:      equ    flag2s.2
74  000B                cmd_ident:    equ    flag2s.3
75  000C                a_rx_event:   equ    flag2s.4
76  000D                cmd_compl:    equ    flag2s.5
77  000E                ring_event:   equ    flag2s.6
78  000F                queue_data:   equ    flag2s.7
79
80  8030                ex_prt        equ    8030h
81  8060                dis_clk       equ    8060h
82
83  0022                              end Errors:  None           ##########
Bytes:   0              # rpi_equ #
CRC:     EB60           ##########
```

```
##############################################################################
#                                                                            #
#    Archimedes 8051 Assembler V1.80/MD2          22/Feb/90  14:27:31        #
#                                                                            #
#    Source  =   init_prt.s03                                                #
#    List    =   ..\lst\init_prt.lst                                         #
#    Object  =   ..\obj\init_prt.r03                                         #
#    Options =   f                                                           #
#                                                                            #
(c) Copyright Archimedes Software 1985    #
##############################################################################
```

```
 1
 2  0000                       RSEG    INITP
 3
 4  0000                       extern  init_duart, init_dtmf,ex_prt,dis_clk
 5  0000                       extern  ring_event, queue_data
 6
 7  0000                       public  init_parts
 8
 9                             ;------------------------------------------------
10                             ;--
11                             ;--  subroutine init_parts
12                             ;--
13                             ;--  initialize memory adddressable circuit partitions
14                             ;--
15                             ;--  This subroutine will initialize the three addressable circuit
16                             ;--  partitions :
17                             ;--
18                             ;--     1) expansion port
19                             ;--     2) duart
20                             ;--     3) dtmfs
21                             ;--     4) ring interrupt latch
22                             ;--
23                             ;------------------------------------------------
24
25  0000               init_parts:
26
27                             ;--
28                             ;--     initialize expansion port
29                             ;--
30
31  0000 7415                  mov     a,#15h
32  0002 FF                    mov     r7,a
33  0003 900000                mov     dptr,#ex_prt
34  0006 F0                    movx    @dptr,a
35
```

```
36                          ;--
37                          ;--   initialize duart
38                          ;--
39
40  0007  120000            call    init_duart
41
42                          ;--
43                          ;--   initialize dtmfs
44                          ;--
45
46  000A  120000            call    init_dtmf
47
48                          ;--
49                          ;--   initialize ring interrupt latch
50                          ;--
51  000D  D295              setb    p1.5
52  000F  C295              clr     p1.5
53
54                          ;--
55                          ;--   initialize flags
56                          ;--
57  0011  C200              clr     ring_event
58  0013  C200              clr     queue_data
59
60  0015  22                ret
61
62  0016                    end Errors:  None           ############
    Bytes:   22             # init_prt #
    CRC:     8EA3           ############
```

```
########################################################################
#                                                                      #
#    Archimedes 8051 Assembler V1.80/MD2       22/Feb/90  14:27:43     #
#                                                                      #
#       Source  =  init_drt.s03                                        #
#       List    =  ..\lst\init_drt.lst                                 #
#       Object  =  ..\obj\init_drt.r03                                 #
#       Options =  f                                                   #
#                                                                      #
#                           (c) Copyright Archimedes Software 1985     #
########################################################################

1  0000                    RSEG    INIT
 2
 3  0000                    extern  dis_clk,ex_prt,mr1a,cra,csra,sra,mr1b,crb,csrb,srb
 4  0000                    extern  duart_imr
 5
 6  0000                    public  init_duart
 7
 8  0000          init_duart:
 9
10                          ;-----------------------------------------------------
11                          ;--                                                 --
12                          ;--      duart initialization routine              ##
13                          ;##                                                ##
14                          ;###################################################
15                          ;**
16                          ;**     reset MRxA register pointer
17                          ;**
18  0000          ser_a_setup:
19  0000  900000            mov     dptr,#cra
20  0003  7410              mov     a,#10h
21  0005  F0                movx    @dptr,a
22                          ;**
23                          ;**     reset receiver
24                          ;**
25  0006  7420              mov     a,#20h
26  0008  F0                movx    @dptr,a
27                          ;**
28                          ;**     reset transmitter
29                          ;**
30  0009  7430              mov     a,#30h
```

```
31  000B F0                    movx    @dptr,a
32                         ;**
33                         ;**    reset error status
34                         ;**
35  000C 7440               mov    a,#40h
36  000E F0                 movx   @dptr,a
37                         ;**
38                         ;**    program mode register 1
39                         ;**
40  000F 7417               mov    a,#17h
41  0011 900000             mov    dptr,#mr1a
42  0014 F0                 movx   @dptr,a
43                         ;**
44                         ;**    program mode register 2
45                         ;**
46  0015 7407               mov    a,#07h
47  0017 F0                 movx   @dptr,a
48                         ;**
49                         ;**    program clock select register
50                         ;**
51  0018 7444               mov    a,#44h
52  001A 900000             mov    dptr,#csra
53  001D F0                 movx   @dptr,a
54
55  001E         ser_b_setup:
56                         ;**
57                         ;**    reset MRxB pointer and diable tx and rx
58                         ;**
59  001E 7410               mov    a,#10h
60  0020 900000             mov    dptr,#crb
61  0023 F0                 movx   @dptr,a
62                         ;**
63                         ;**    reset receiver
64                         ;**
65  0024 7420               mov    a,#20h
66  0026 F0                 movx   @dptr,a
67                         ;**
68                         ;**    reset transmitter
69                         ;**
70  0027 7430               mov    a,#30h
71  0029 F0                 movx   @dptr,a
72                         ;**
73                         ;**    reset error status
74                         ;**
75  002A 7440               mov    a,#40h
76  002C F0                 movx   @dptr,a
77
78                         ;**
79                         ;**    program mode register 1
80                         ;**
81  002D 7417               mov    a,#17h
82  002F 900000             mov    dptr,#mr1b
83  0032 F0                 movx   @dptr,a
84                         ;**
85                         ;**    program mode register 2
86                         ;**
87  0033 7407               mov    a,#07h
88  0035 F0                 movx   @dptr,a
89
90                         ;**
91                         ;**    program clock select register
92                         ;**
93  0036 7499               mov    a,#99h
94  0038 900000             mov    dptr,#csrb
95  003B F0                 movx   @dptr,a
96
97                         ;**
98                         ;**    enable a channel tx and rx
99                         ;**
100 003C 7405               mov    a,#05h
101 003E 900000             mov    dptr,#cra
102 0041 F0                 movx   @dptr,a
103
104                        ;**
105                        ;**    enable b channel tx and rx
```

```
106                             ;**
107  0042 900000                mov     dptr,#crb
108  0045 F0                    movx    @dptr,a
109
110                             ;**
111                             ;**    enable b channel receive ready interrupt
112                             ;**
113  0046 7420                  mov     a,#20h
114  0048 900000                mov     dptr,#duart_imr
115  004B F0                    movx    @dptr,a
116
117  004C 22                    ret
118
119  004D                       end Errors:  None         ############
Bytes:   77           # init_drt #
CRC:     89EE         ############
```

```
##################################################################
#                                                                #
#    Archimedes 8051 Assembler V1.80/MD2      22/Feb/90 14:28:04  #
#                                                                #
#    Source  =  init_dtm.s03                                     #
#    List    =  ..\lst\init_dtm.lst                              #
#    Object  =  ..\obj\init_dtm.r03                              #
#    Options =  f                                                #
#                                                                #
(c) Copyright Archimedes Software 1985 #
##################################################################

1   0000                       RSEG    INIT2
 2
 3   0000                       extern  dtmf1, dtmf2
 4
 5                              ;----------------------------------------------------
 6                              ;--
 7                              ;--  Subroutine : init_dtmf
 8                              ;--
 9                              ;--  DTMF initialization routine
10                              ;--
11                              ;--  This routine will simply ensure that the tone
12                              ;--  generators in the dtmf devices are turned off - no
13                              ;--  output
14                              ;--
15                              ;--  The address for DTMF #1 is 8020H
16                              ;--  The address for DTMF #2 is 8040H
17                              ;--
18                              ;----------------------------------------------------
19
20   0000                       public  init_dtmf
21
22   0000          init_dtmf:
23                              ;--
24                              ;--  load acc with command which will ensure that osc are off
25                              ;--
26   0000 7401                  mov     a,#01h
27   0002 900000                mov     dptr,#dtmf1     ; address of dtmf #1
28   0005 F0                    movx    @dptr,a
29   0006 900000                mov     dptr,#dtmf2     ; address of dtmf #2
30   0009 F0                    movx    @dptr,a
31   000A 22                    ret
32   000B                       end Errors:  None         ############
Bytes:   11           # init_dtm #
CRC:     985C         ############
```

```
##############################################################################
#                                                                            #
#     Archimedes 8051 Assembler V1.80/MD2              22/Feb/90  14:28:09   #
#                                                                            #
#        Source  =  b_rx_ser.s03                                             #
#        List    =  ..\lst\b_rx_ser.lst                                      #
#        Object  =  ..\obj\b_rx_ser.r03                                      #
#        Options =  f                                                        #
#                                                                            #
(c) Copyright Archimedes Software 1985 #
##############################################################################
```

```
  1  0000                       RSEG    B_SERV
  2  0000                       extern  b_rx_event, srb, dis_clk, b_byte_rx, rhrb
  3  0000                       public  b_rx_ser
  4
  5  0000            b_rx_ser:
  6
  7  0000 D200                  setb    b_rx_event
  8
  9  0002 900000                mov     dptr,#srb
 10  0005 E0                    movx    a,@dptr
 11
 12  0006 54F0                  anl     a,#0f0h
 13  0008 7006                  jnz     label_61
 14
 15  000A 900000                mov     dptr,#rhrb
 16  000D E0                    movx    a,@dptr
 17  000E F500                  mov     b_byte_rx,a
 18
 19  0010            label_61:
 20
 21  0010 22                    ret
 22
 23  0011                       end Errors:  None           ############
 Bytes:   17             # b_rx_ser #
 CRC:     57ED           ############
```

```
##############################################################################
#                                                                            #
#     Archimedes 8051 Assembler V1.80/MD2              22/Feb/90  14:28:18   #
#                                                                            #
#        Source  =  chkhcmd2.s03                                             #
#        List    =  ..\lst\chkhcmd2.lst                                      #
#        Object  =  ..\obj\chkhcmd2.r03                                      #
#        Options =  f                                                        #
#                                                                            #
(c) Copyright Archimedes Software 1985 #
##############################################################################
```

```
  1  0000                       RSEG    H_CMD
  2
  3  0000                       extern  b_rx_event
  4  0000                       extern  b_byte_rx
  5  0000                       extern  dis_clk
  6  0000                       extern  A_chr_rcv, T_chr_rcv, cmd_ident, cmd_compl
  7  0000                       extern  init_cmd, dial_cmd, hang_cmd
  8
  9  0000                       public  chk_h_cmd
 10
 11                              ;----------------------------------------------
 12                              ;--
 13                              ;--  subroutine : chk_h_cmd
 14                              ;--
 15                              ;--  check_for_hayes_command routine
 16                              ;--
 17                              ;--  This subroutine will examine the data stream from the host
 18                              ;--  for the presence of the three hayes-compatible commands
 19                              ;--  used to control the RPIA. These commands are the initializa-
 20                              ;--  tion command, the dial command and the hang-up command.
 21                              ;--
```

```
22                      ;-- The formats for the three commands are:
23                      ;--
24                      ;--    initialization command :
25                      ;--
26                      ;--    ATE1 XXXXX XXXXX XX XX XXXX^M  (X = dont't care)
27                      ;--
28                      ;--    dial command :
29                      ;--
30                      ;--    ATDT ###############^M  (# = digits to be dialed)
31                      ;--
32                      ;--    hangup command :
33                      ;--
34                      ;--    +++---ATH0^M
35                      ;--
36                      ;--------------------------------------------------------------
37
38  0000        chk_h_cmd:
39
40                      ;--
41                      ;-- load acc with received byte (byte to be examined)
42                      ;--
43  0000 E500            mov     a,b_byte_rx
44                      ;--
45                      ;-- reset B channel byte received event flag
46                      ;--
47  0002 C200            clr     b_rx_event
48
49  0004 200006          jb      A_chr_rcv,label_1
50  0007 B44102          cjne    a,#41h,label_2
51  000A D200            setb    A_chr_rcv
52  000C        label_2:
53
54  000C 22              ret
55
56  000D        label_1:
57
58  000D 200006          jb      T_chr_rcv,label_3
59
60  0010 B45426          cjne    a,#54h,label_4
61  0013 D200            setb    T_chr_rcv
62
63  0015 22              ret
64
65  0016        label_3:
66
67  0016 20001A          jb      cmd_ident,label_5
68
69  0019 B44505          cjne    a,#45h,label_6
70  001C D200            setb    cmd_ident
71  001E D200            setb    init_cmd
72
73  0020 22              ret
74
75  0021        label_6:
76  0021 B44407          cjne    a,#44h,label_7
77  0024 D200            setb    cmd_ident
78  0026 D200            setb    dial_cmd
79  0028 D200            setb    cmd_compl
80  002A 22              ret
81
82  002B        label_7:
83  002B B4480E          cjne    a,#48h,label_8
84  002E D200            setb    cmd_ident
85  0030 D200            setb    hang_cmd
86
87  0032 22              ret
88
89  0033        label_5:
90  0033 B40D02          cjne    a,#0dh,label_9
91  0036 D200            setb    cmd_compl
92  0038        label_9:
93  0038 22              ret
94
95  0039        label_4:
96  0039 C200            clr     A_chr_rcv
97
```

```
 98  003B 22                       ret
 99
100  003C              label_8:
101  003C C200                     clr    A_chr_rcv
102  003E C200                     clr    T_chr_rcv
103
104  0040 22                       ret
105  0041                          end Errors:  None           ############
     Bytes:   65             # chkhcmd2 #
     CRC:     7BB0           ############
```

```
#######################################################################
#                                                                     #
#     Archimedes 8051 Assembler V1.80/MD2         22/Feb/90  14:28:37 #
#                                                                     #
#     Source  =  dialmcp.s03                                          #
#     List    =  ..\lst\dialmcp.lst                                   #
#     Object  =  ..\obj\dialmcp.r03                                   #
#     Options =  f                                                    #
#
(c) Copyright Archimedes Software 1985 #
#######################################################################
```

```
  1
  2   0000                         RSEG    DIAL
  3
  4   0000                         extern  dis_clk,ex_prt, login, tp_char, tone_dial
  5   0000                         extern  pulse_dial, tdial, pdial
  6   0000                         extern  dtmf1, dtmf2, connect_error
  7
  8   0000                         public  dial_mcp
  9
 10                                ;------------------------------------------------
 11                                ;--
 12                                ;--  subroutine : dial_mcp
 13                                ;--
 14                                ;--  outgoing mcp call set-up routine
 15                                ;--
 16                                ;--  This subroutine will perform the task necessary to establish
 17                                ;--  RPIA originated communication with an MCP.
 18                                ;--
 19                                ;--  This subroutine will :
 20                                ;--
 21                                ;--    set modem to originate
 22                                ;--    connect RPIA to phone line
 23                                ;--    verify dial-tone
 24                                ;--    dial MCP
 25                                ;--    verify ring signal
 26                                ;--    verify answer
 27                                ;--    enable RPI dual tones
 28                                ;--    disable RPI dual tones
 29                                ;--    verify carrier detect
 30                                ;--
 31                                ;------------------------------------------------
 32
 33   0000             dial_mcp:
 34                                ;--
 35                                ;--  write 'b6' to display
 36                                ;--
 37   0000 74B6                    mov     a,#0b6h
 38   0002 900000                  mov     dptr,#dis_clk
 39   0005 F0                      movx    @dptr,a
 40
 41                                ;--
 42                                ;--  set expansion port
 43                                ;--
 44
 45   0006 7415                    mov     a,#15h
 46   0008 FF                      mov     r7,a
 47   0009 900000                  mov     dptr,#ex_prt
 48   000C F0                      movx    @dptr,a
 49
```

```
50                        ;--
51                        ;-- connect RPIA to phone line (enable hookswitch)
52                        ;-- and enable speaker
53                        ;--
54
55  000D EF               mov     a,r7
56  000E 44A0             orl     a,#0a0h
57  0010 900000           mov     dptr,#ex_prt
58  0013 F0               movx    @dptr,a
59  0014 FF               mov     r7,a
60
61                        ;--
62                        ;-- wait 2 seconds
63                        ;--
64
65  0015 7C0A             mov     r4,#0ah
66  0017        label_4s:
67  0017 7BFF             mov     r3,#0ffh
68  0019        label_4t:
69  0019 7AFF             mov     r2,#0ffh
70  001B        label_4u:
71  001B DAFE             djnz    r2,label_4u
72  001D DBFA             djnz    r3,label_4t
73  001F DCF6             djnz    r4,label_4s
74
75  0021        label_4n:
76                        ;--
77                        ;-- begin dialing loop
78                        ;--
79                        ;-- determine if pulse or tone dialing was specified
80                        ;--
81  0021 30006C           jnb     tp_char,label_44
82  0024 300005           jnb     pulse_dial,label_46
83                        ;--
84                        ;-- call subroutine for pulse dialing
85                        ;--
86  0027 120000           call    pdial
87  002A 8003             sjmp    label_45
88                        ;--
89                        ;-- call subroutine for tone (dtmf) dialing
90                        ;--
91  002C         label_46:
92  002C 120000           call    tdial
93  002F         label_45:
94                        ;--
95                        ;-- wait 1 sec
96                        ;--
97  002F         label_4a:
98  002F 746B             mov     a,#6bh
99  0031 900000           mov     dptr,#dis_clk
100 0034 F0               movx    @dptr,a
101
102 0035 7C0A             mov     r4,#0ah
103 0037         label_4p:
104 0037 7BFF             mov     r3,#0ffh
105 0039         label_4q:
106 0039 7AFF             mov     r2,#0ffh
107 003B         label_4r:
108 003B DAFE             djnz    r2,label_4r
109 003D DBFA             djnz    r3,label_4q
110 003F DCF6             djnz    r4,label_4p
111
112                       ;##
113 0041 7477             mov     a,#77h
114 0043 900000           mov     dptr,#dis_clk
115 0046 F0               movx    @dptr,a
116                       ;#
117 0047 7E00             mov     r6,#00h
118
119                       ;--
120                       ;-- enable RPI dual tones
121 0049         label_4c:
122 0049 EF               mov     a,r7
123 004A 54BF             anl     a,#0bfh
124 004C FF               mov     r7,a
```

```
125  004D 900000                mov     dptr,#ex_prt
126  0050 F0                    movx    @dptr,a
127
128  0051 743F                  mov     a,#3fh
129  0053 900000                mov     dptr,#dtmf1
130  0056 F0                    movx    @dptr,a
131
132  0057 7407                  mov     a,#07h
133  0059 900000                mov     dptr,#dtmf2
134  005C F0                    movx    @dptr,a
135                        ;--
136                        ;--  wait 0.5 seconds
137                        ;--
138  005D 7C02                  mov     r4,#02h
139  005F         label_4d:
140  005F 7BFF                  mov     r3,#0ffh
141  0061         label_4e:
142  0061 7AFF                  mov     r2,#0ffh
143  0063         label_4f:
144  0063 DAFE                  djnz    r2,label_4f
145  0065 DBFA                  djnz    r3,label_4e
146  0067 DCF6                  djnz    r4,label_4d
147
148                        ;--
149                        ;--  disable RPI dual tones
150                        ;--
151  0069 7401                  mov     a,#01h
152  006B 900000                mov     dptr,#dtmf1
153  006E F0                    movx    @dptr,a
154
155  006F 900000                mov     dptr,#dtmf2
156  0072 F0                    movx    @dptr,a
157
158                        ;--
159                        ;--  enable modem connection
160                        ;--
161  0073 EF                    mov     a,r7
162  0074 4440                  orl     a,#40h
163  0076 54FE                  anl     a,#0feh
164  0078 FF                    mov     r7,a
165  0079 900000                mov     dptr,#ex_prt
166  007C F0                    movx    @dptr,a
167
168                        ;--
169                        ;--  wait 800 msec
170                        ;--
171  007D 7C08                  mov     r4,#08h
172  007F         label_4l:
173  007F 7BFF                  mov     r3,#0ffh
174  0081         label_4i:
175  0081 7AFF                  mov     r2,#0ffh
176  0083         label_4j:
177  0083 DAFE                  djnz    r2,label_4j
178  0085 DBFA                  djnz    r3,label_4i
179  0087 DCF6                  djnz    r4,label_4l
180
181  0089         label_4g:
182                        ;--
183                        ;--  check for carrier detect
184                        ;--
185  0089 309000               jnb     p1.0,label_4h
186  008C 0E                    inc     r6
187  008D BE0FB9               cjne    r6,#0fh,label_4c
188
189                        ;--
190                        ;--  set connect error flag
191                        ;--
192  0090         label_44:
193  0090 7466                  mov     a,#66h
194  0092 900000                mov     dptr,#dis_clk
195  0095 F0                    movx    @dptr,a
196
197  0096 D200                  setb    connect_error
198  0098 22                    ret
199  0099         label_4h:
```

```
200                          ;##
201  0099 120000              call    login
202                          ;#
203  009C 22                  ret
204
205  009D                     end Errors:  None         ##########
Bytes:   157          # dialmcp #
CRC:     6767         ##########
```

```
########################################################################
#                                                                      #
#   Archimedes 8051 Assembler V1.80/MD2         22/Feb/90  14:29:10    #
#                                                                      #
#   Source  =  captdial.s03                                            #
#   List    =  ..\lst\captdial.lst                                     #
#   Object  =  ..\obj\captdial.r03                                     #
#   Options =  f                                                       #
#                                                                      #
(c) Copyright Archimedes Software 1985 #
########################################################################
```

```
 1
 2  0000                     RSEG    DDGT
 3
 4  0000                     extern  digit_cnt_loc, dial_digit_base
 5  0000                     extern  b_rx_event, b_byte_rx,srb,b_rx_ser
 6  0000                     extern  dis_clk
 7
 8
 9  0000                     public  capt_dial_digit
10
11                          ;-------------------------------------------------
12                          ;--
13                          ;--  subroutine capt_dial_digit
14                          ;--
15                          ;--  capture dial digits routine
16                          ;--
17                          ;--  This routine will capture the digits to be dialed from the
18                          ;--  hayes dial command
19                          ;--
20                          ;-------------------------------------------------
21
22  0000       capt_dial_digit:
23
24                          ;--
25                          ;--  clear count of digits to be dialed
26                          ;--
27  0000 E4                  clr     a
28  0001 7900                mov     R1,#digit_cnt_loc
29  0003 F7                  mov     @R1,a
30                          ;--
31                          ;--  load R0 with base of memory space to store digits
32                          ;--
33  0004 7800                mov     R0,#dial_digit_base
34                          ;--
35                          ;--  wait for digit to be sent from host
36                          ;--
37  0006       label_31:
38
39  0006 900000              mov     dptr,#srb
40  0009 E0                  movx    a,@dptr
41  000A 5401                anl     a,#01h
42
43  000C 60F8                jz      label_31
44
45  000E 120000              call    b_rx_ser
46                          ;--
47                          ;--  clear B channel byte received event flag and load acc
48                          ;--  with received byte
49                          ;--
50  0011 C200                clr     b_rx_event
51  0013 E500                mov     a,b_byte_rx
```

```
52                      ;--
53                      ;-- check for carriage return (^M) indicating end of digits
54                      ;--
55  0015 B40D02         cjne    a,#0dh,label_32
56  0018 8007           sjmp    label_33
57                      ;--
58                      ;-- store value for digit needed for DTMF generator and
59                      ;-- increment number of digits to be dialed
60                      ;--
61  001A       label_32:
62  001A 9430           subb    a,#30h
63  001C 07             inc     @R1
64  001D 08             inc     R0
65  001E F6             mov     @r0,a
66                      ;--
67                      ;-- wait for next digit
68                      ;--
69  001F 80E5           sjmp    label_31
70  0021      label_33:
71  0021 22             ret
72
73  0022                end Errors: None           ############
Bytes:  34             # captdial #
CRC:    50C7           ############
```

```
##########################################################################
#                                                                        #
#   Archimedes 8051 Assembler V1.80/MD2          22/Feb/90  14:29:21     #
#                                                                        #
#   Source  =  fulldux.s03                                               #
#   List    =  ..\lst\fulldux.lst                                        #
#   Object  =  ..\obj\fulldux.r03                                        #
#   Options =  f                                                         #
#
(c) Copyright Archimedes Software 1985    #
##########################################################################

1
 2  0000                RSEG    FULLD
 3
 4  0000                extern  duart_imr, duart_isr, rhra, thra,sra,srb,cra
 5  0000                extern  rhrb, thrb, hang_cmd, chk_h_cmd, dis_clk,crb
 6  0000                extern  A_chr_rcv, T_chr_rcv, cmd_ident, cmd_compl
 7  0000                extern  init_cmd, dial_cmd, b_byte_rx, ex_prt
 8  0000                extern  queue_data, add_2_q, get_frm_q
 9
10  0000                public  full_dux
11
12                      ;-------------------------------------------------
13                      ;--
14                      ;-- subroutine : full_dux
15                      ;--
16                      ;-- full duplex data pipelining routine
17                      ;--
18                      ;-- This subroutine will pass data received from the MCP to the
19                      ;-- host and data received from the host to the MCP. It will
20                      ;-- also monitor the data stream from the host for the hayes
21                      ;-- hang-up command
22                      ;--
23                      ;-------------------------------------------------
24
25  0000       full_dux:
26                      ;--
27                      ;-- disable speaker
28                      ;--
29  0000 EF             mov     a,r7
30  0001 54CF           anl     a,#0cfh
31  0003 FF             mov     r7,a
32  0004 900000         mov     dptr,#ex_prt
33  0007 F0             movx    @dptr,a
34
35                      ;--
```

```
 36                            ;-- clear hayes command decoding flags
 37                            ;--
 38   0008 C200         clr   A_chr_rcv
 39   000A C200         clr   T_chr_rcv
 40   000C C200         clr   cmd_ident
 41   000E C200         clr   cmd_compl
 42   0010 C200         clr   init_cmd
 43   0012 C200         clr   dial_cmd
 44   0014 C200         clr   hang_cmd
 45                            ;--
 46                            ;-- disable duart interrupts
 47                            ;--
 48   0016 E4           clr   a
 49   0017 900000       mov   dptr,#duart_imr
 50   001A F0           movx  @dptr,a
 51                            ;--
 52                            ;-- enable a and b channel transmitters
 53                            ;--
 54   001B 7403         mov   a,#03h
 55   001D 900000       mov   dptr,#cra
 56   0020 F0           movx  @dptr,a
 57   0021 900000       mov   dptr,#crb
 58   0024 F0           movx  @dptr,a
 59
 60                            ;--
 61                            ;-- read duart input status register to see if a byte
 62                            ;-- has been received on either channel
 63                            ;--
 64   0025         label_52:
 65   0025 900000       mov   dptr,#sra
 66   0028 E0           movx  a,@dptr
 67   0029 5401         anl   a,#01h
 68   002B 701C         jnz   label_53
 69                            ;--
 70                            ;-- check channel B receive status bit
 71                            ;--
 72   002D 900000       mov   dptr,#srb
 73   0030 E0           movx  a,@dptr
 74   0031 5401         anl   a,#01h
 75   0033 701E         jnz   label_51
 76   0035 3000ED       jnb   queue_data,label_52
 77   0038 900000       mov   dptr,#sra
 78   003B E0           movx  a,@dptr
 79   003C 5404         anl   a,#04h
 80   003E 60E5         jz    label_52
 81   0040 120000       call  get_frm_q
 82   0043 900000       mov   dptr,#thra
 83   0046 F0           movx  @dptr,a
 84
 85   0047 80DC         jmp   label_52
 86                            ;--
 87                            ;-- move byte received from MCP (channel A) to channel B
 88                            ;-- transmit (host)
 89                            ;--
 90   0049         label_53:
 91   0049 900000       mov   dptr,#rhra
 92   004C E0           movx  a,@dptr
 93   004D 900000       mov   dptr,#thrb
 94   0050 F0           movx  @dptr,a
 95   0051 80D2         sjmp  label_52
 96                            ;--
 97                            ;-- move byte received from host (channel B) to channel A
 98                            ;-- transmit (MCP)
 99                            ;--
100   0053         label_51:
101   0053 900000       mov   dptr,#sra
102   0056 E0           movx  a,@dptr
103   0057 5404         anl   a,#04h
104   0059 600B         jz    label_54
105   005B 900000       mov   dptr,#rhrb
106   005E E0           movx  a,@dptr
107   005F 900000       mov   dptr,#thra
108   0062 F0           movx  @dptr,a
109   0063 020069       jmp   label_55
110   0066         label_54:
```

```
111  0066 120000              call    add_2_q
112
113                           ;--
114                           ;-- check if hayes hang-up command has been received
115                           ;--
116  0069           label_55:
117  0069 F500              mov     b_byte_rx,a
118  006B 120000            call    chk_h_cmd
119  006E 3000B4            jnb     hang_cmd, label_52
120
121  0071 22                ret
122
123  0072                   end Errors: None           ##########
    Bytes:  114            # fulldux #
    CRC:    A0AD           ##########
```

```
###########################################################################
#                                                                         #
#    Archimedes 8051 Assembler V1.80/MD2         22/Feb/90  14:29:40      #
#                                                                         #
#    Source  =  d_int_sr.s03                                              #
#    List    =  ..\lst\d_int_sr.lst                                       #
#    Object  =  ..\obj\d_int_sr.r03                                       #
#    Options =  f                                                         #
#
(c) Copyright Archimedes Software 1985  #
###########################################################################

1
2   0000                    RSEG    D_INTR
3
4   0000                    extern  a_rx_event, b_rx_event, sra, srb
5   0000                    extern  a_byte_rx, b_byte_rx,rhra, rhrb,duart_isr
6
7   0000                    public  duart_int_isr
8
9                           ;-----------------------------------------------------
10                          ;--
11                          ;-- duart interrupt service routine
12                          ;--
13                          ;-- This interrupt service routine will read the status registers
14                          ;-- for the a and b channels of the duart to determine which re-
15                          ;-- ceive channel generated the interrupt. The appropriate flag
16                          ;-- will be set and the received byte will be moved from the re-
17                          ;-- ceive holding register to RAM
18                          ;--
19                          ;-----------------------------------------------------
20
21  0000           duart_int_isr:
22                          ;--
23                          ;-- disable interrupts
24                          ;--
25  0000 75A804             mov     ie,#04h
26                          ;--
27                          ;-- clear a channel receive event flag and
28                          ;--         b channel receive event flag
29                          ;--
30  0003 C200               clr     a_rx_event
31  0005 C200               clr     b_rx_event
32                          ;--
33                          ;-- read a channel status register to check for a channel
34                          ;-- receive event
35                          ;--
36  0007 900000             mov     dptr,#duart_isr
37  000A E0                 movx    a,@dptr
38                          ;--
39                          ;-- check for receive flag
40                          ;--
41  000B 20E500             jb      acc.5,b_event
42  000E 30E117             jnb     acc.1,int_exit
43                          ;--
44                          ;-- set a channel event flag and move data to RAM
```

```
45                              ;--
46   0011 D200                  setb    a_rx_event
47   0013 900000                mov     dptr,#rhra
48   0016 E0                    movx    a,@dptr
49   0017 F500                  mov     a_byte_rx,a
50
51   0019 800D                  sjmp    int_exit
52                              ;--
53                              ;-- read b channel status register to check for b channel
54                              ;-- receive event
55                              ;--
56   001B           b_event:
57                              ;--
58                              ;-- set b channel event flag and move data to RAM
59                              ;--
60   001B D200                  setb    b_rx_event
61   001D 900000                mov     dptr,#srb
62   0020 E0                    movx    a,@dptr
63   0021 900000                mov     dptr,#rhrb
64   0024 E0                    movx    a,@dptr
65   0025 E0                    movx    a,@dptr
66   0026 F500                  mov     b_byte_rx,a
67
68   0028           int_exit:
69   0028 75A884                mov     ie,#84h
70   002B 32                    reti
71
72   002C                       end Errors:  None         ############
Bytes:   44           # d_int_sr #
CRC:     2E67         ############

####################################################################
#                                                                  #
#   Archimedes 8051 Assembler V1.80/MD2      22/Feb/90  14:29:54   #
#                                                                  #
#       Source  =  r_int_sr.s03                                    #
#       List    =  ..\lst\r_int_sr.lst                             #
#       Object  =  ..\obj\r_int_sr.r03                             #
#       Options =  f                                               #
#
(c) Copyright Archimedes Software 1985  #
####################################################################

1
 2   0000                       RSEG    R_INTR
 3
 4   0000                       extern  ring_event, dis_clk
 5
 6   0000                       public  ring_int_isr
 7
 8   0000           ring_int_isr:
 9
10   0000 75A801                mov     ie,#01h
11
12   0003 D200                  setb    ring_event
13   0005 D295                  setb    p1.5
14
15   0007 32                    reti
16
17   0008                       end Errors:  None         ############
Bytes:   8            # r_int_sr #
CRC:     D5AE         ############
```

```
##########################################################################
#                                                                        #
#     Archimedes 8051 Assembler V1.80/MD2          22/Feb/90  14:29:59   #
#                                                                        #
#        Source  =  lamp_tst.s03                                         #
#        List    =  ..\lst\lamp_tst.lst                                  #
#        Object  =  ..\obj\lamp_tst.r03                                  #
#        Options =  f                                                    #
#
(c) Copyright Archimedes Software 1985 #
##########################################################################

1
   2  0000                          RSEG    LAMP
   3
   4  0000                          extern  dis_clk
   5
   6  0000                          public  lamp_tst
   7
   8  0000             lamp_tst:
   9  0000 7E08                     mov     r6,#08h
  10  0002 900000                   mov     dptr,#dis_clk
  11  0005 7401                     mov     a,#01h
  12  0007             label_a3:
  13  0007 F0                       movx    @dptr,a
  14  0008 7B77                     mov     r3,#077h
  15  000A             label_a1:
  16  000A 7AFF                     mov     r2,#0ffh
  17  000C             label_a2:
  18  000C DAFE                     djnz    r2,label_a2
  19  000E DBFA                     djnz    r3,label_a1
  20
  21  0010 23                       rl      a
  22  0011 DEF4                     djnz    r6,label_a3
  23
  24  0013 7E08                     mov     r6,#08h
  25  0015 747F                     mov     a,#7fh
  26  0017             label_a4:
  27  0017 F0                       movx    @dptr,a
  28  0018 7B77                     mov     r3,#77h
  29  001A             label_a5:
  30  001A 7AFF                     mov     r2,#0ffh
  31  001C             label_a6:
  32  001C DAFE                     djnz    r2,label_a6
  33  001E DBFA                     djnz    r3,label_a5
  34
  35  0020 03                       rr      a
  36  0021 DEF4                     djnz    r6,label_a4
  37
  38  0023 22                       ret
  39
  40  0024                          end Errors: None           ############
   Bytes:  36             # lamp_tst #
   CRC:    D19E           ############

##########################################################################
#                                                                        #
#     Archimedes 8051 Assembler V1.80/MD2          22/Feb/90  14:30:10   #
#                                                                        #
#        Source  =  login.s03                                            #
#        List    =  ..\lst\login.lst                                     #
#        Object  =  ..\obj\login.r03                                     #
#        Options =  f                                                    #
#
(c) Copyright Archimedes Software 1985 #
##########################################################################

1
   2  0000                          RSEG    LOGIN
   3
   4  0000                          extern  thra, cra, sra, table_3, dis_clk, connect_error
```

```
  5
  6
  7  0000                              public  login
  8
  9  0000              login:
 10  0000 7499                         mov     a,#99h
 11  0002 900000                       mov     dptr,#dis_clk
 12  0005 F0                           movx    @dptr,a
 13  0006 7403                         mov     a,#03h
 14  0008 900000                       mov     dptr,#cra
 15  000B F0                           movx    @dptr,a
 16  000C C200                         clr     connect_error
 17  000E E4                           clr     a
 18  000F FE                           mov     r6,a
 19
 20  0010              label_b1:
 21  0010 900000                       mov     dptr,#sra
 22  0013 E0                           movx    a,@dptr
 23  0014 5404                         anl     a,#04h
 24
 25  0016 60F8                         jz      label_b1
 26
 27  0018 900000                       mov     dptr,#table_3
 28  001B EE                           mov     a,r6
 29  001C 93                           movc    a,@a+dptr
 30
 31  001D 900000                       mov     dptr,#thra
 32  0020 F0                           movx    @dptr,a
 33
 34  0021 0E                           inc     r6
 35  0022 BE0AEB                       cjne    r6,#0ah,label_b1
 36
 37  0025 22                           ret
 38
 39  0026                              end Errors:  None            #########
   Bytes:   38              # login #
   CRC:     FA6F            #########
```

```
##################################################################
#                                                                #
#   Archimedes 8051 Assembler V1.80/MD2    22/Feb/90  14:30:17   #
#                                                                #
#     Source  =  cleanup.s03                                     #
#     List    =  ..\lst\cleanup.lst                              #
#     Object  =  ..\obj\cleanup.r03                              #
#     Options =  f                                               #
#
#                          (c) Copyright Archimedes Software 1985#
##################################################################

1
  2  0000                              RSEG    CLEAN
  3
  4  0000                              extern  A_chr_rcv, T_chr_rcv, cmd_ident, cmd_compl
  5  0000                              extern  init_cmd, dial_cmd, hang_cmd, srb, cra, crb
  6  0000                              extern  b_rx_ser, chk_h_cmd, ex_prt
  7  0000                              extern  ring_event, connect_error, queue_data
  8
  9  0000                              public  cleanup
 10
 11  0000              cleanup:
 12  0000 200022                       jb      hang_cmd,label_c1
 13
 14  0003              label_c3:
 15  0003 C200                         clr     A_chr_rcv
 16  0005 C200                         clr     T_chr_rcv
 17  0007 C200                         clr     cmd_ident
 18  0009 C200                         clr     cmd_compl
 19  000B C200                         clr     init_cmd
 20  000D C200                         clr     dial_cmd
 21  000F C200                         clr     hang_cmd
 22
```

```
23  0011                     label_c2:
24  0011 900000                       mov     dptr,#srb
25  0014 E0                           movx    a,@dptr
26  0015 5401                         anl     a,#01h
27
28  0017 60F8                         jz      label_c2
29
30  0019 120000                       call    b_rx_ser
31
32  001C 120000                       call    chk_h_cmd
33
34  001F 3000EF                       jnb     cmd_compl,label_c2
35  0022 3000DE                       jnb     hang_cmd,label_c3
36
37  0025                     label_c1:
38  0025 7415                         mov     a,#15h
39  0027 FF                           mov     r7,a
40  0028 900000                       mov     dptr,#ex_prt
41  002B F0                           movx    @dptr,a
42
43  002C 7401                         mov     a,#01h
44  002E 900000                       mov     dptr,#cra
45  0031 F0                           movx    @dptr,a
46  0032 900000                       mov     dptr,#crb
47  0035 F0                           movx    @dptr,a
48
49  0036 C200                         clr     ring_event
50  0038 C200                         clr     connect_error
51  003A C200                         clr     queue_data
52
53  003C 22                           ret
54
55  003D                              end Errors:  None             ##########
Bytes:   61               # cleanup #
CRC:     1B82             ##########

##########################################################################
#                                                                        #
#   Archimedes 8051 Assembler V1.80/MD2        22/Feb/90  14:30:24        #
#                                                                        #
#   Source  =  in_call.s03                                                #
#   List    =  ..\lst\in_call.lst                                         #
#   Object  =  ..\obj\in_call.r03                                         #
#   Options =  f                                                         #
#
(c) Copyright Archimedes Software 1985    #
##########################################################################

1
2   0000                            RSEG    INCLL
3
4   0000                            extern  ex_prt, dtmf1, dtmf2, connect_error, login, ring_event
5   0000                            extern  dis_clk
6
7   0000                            public  in_call
8
9   0000                    in_call:
10                                  ;--
11                                  ;-- set expansion port
12                                  ;--
13  0000 7411                       mov     a,#11h
14  0002 FF                         mov     r7,a
15  0003 900000                     mov     dptr,#ex_prt
16  0006 F0                         movx    @dptr,a
17                                  ;--
18                                  ;-- connect RPIA to phone line (enable hookswitch)
19                                  ;--
20  0007 EF                         mov     a,r7
21  0008 44A0                       orl     a,#0a0h
22  000A 900000                     mov     dptr,#ex_prt
23  000D F0                         movx    @dptr,a
24  000E FF                         mov     r7,a
```

```
25              ;--
26              ;-- wait 2 seconds for billing delay
27              ;--
28  000F 7C08           mov     r4,#08h
29  0011         label_8a:
30  0011 7BFF           mov     r3,#0ffh
31  0013         label_8b:
32  0013 7AFF           mov     r2,#0ffh
33  0015         label_8c:
34  0015 DAFE           djnz    r2,label_8c
35  0017 DBFA           djnz    r3,label_8b
36  0019 DCF6           djnz    r4,label_8a
37
38  001B C295           clr     p1.5
39  001D C200           clr     ring_event
40  001F 7E00           mov     r6,#00h
41
42              ;--
43              ;-- enable RPI dual tones
44              ;--
45  0021         label_8k:
46  0021 EF             mov     a,r7
47  0022 54BF           anl     a,#0bfh
48  0024 FF             mov     r7,a
49  0025 900000         mov     dptr,#ex_prt
50  0028 F0             movx    @dptr,a
51
52  0029 743F           mov     a,#3fh
53  002B 900000         mov     dptr,#dtmf1
54  002E F0             movx    @dptr,a
55
56  002F 7407           mov     a,#07h
57  0031 900000         mov     dptr,#dtmf2
58  0034 F0             movx    @dptr,a
59              ;--
60              ;-- wait 0.5 seconds
61              ;--
62  0035 7C02           mov     r4,#02h
63  0037         label_8d:
64  0037 7BFF           mov     r3,#0ffh
65  0039         label_8e:
66  0039 7AFF           mov     r2,#0ffh
67  003B         label_8f:
68  003B DAFE           djnz    r2,label_8f
69  003D DBFA           djnz    r3,label_8e
70  003F DCF6           djnz    r4,label_8d
71              ;--
72              ;-- disable RPI dial tones
73              ;--
74  0041 7401           mov     a,#01h
75  0043 900000         mov     dptr,#dtmf1
76  0046 F0             movx    @dptr,a
77  0047 900000         mov     dptr,#dtmf2
78  004A F0             movx    @dptr,a
79              ;--
80              ;-- enable modem connection
81              ;--
82  004B EF             mov     a,r7
83  004C 4440           orl     a,#40h
84  004E 54FE           anl     a,#0feh
85  0050 FF             mov     r7,a
86  0051 900000         mov     dptr,#ex_prt
87  0054 F0             movx    @dptr,a
88              ;--
89              ;-- wait 1 second
90              ;--
91  0055 7C04           mov     r4,#04h
92  0057         label_8g:
93  0057 7BFF           mov     r3,#0ffh
94  0059         label_8h:
95  0059 7AFF           mov     r2,#0ffh
96  005B         label_8i:
97  005B DAFE           djnz    r2,label_8i
98  005D DBFA           djnz    r3,label_8h
99  005F DCF6           djnz    r4,label_8g
```

```
100                          ;--
101                          ;-- check for carrier detect
102                          ;--
103  0061 309007             jnb     p1.0,label_8j
104  0064 0E                 inc     r6
105  0065 BE0FB9             cjne    r6,#0fh,label_8k
106                          ;--
107                          ;-- set connect error flag
108                          ;--
109  0068 D200               setb    connect_error
110  006A 22                 ret
111  006B             label_8j:
112                          ;##
113  006B 120000             call    login
114                          ;#
115  006E 22                 ret
116
117  006F                    end Errors: None            ##########
Bytes:  111             # in_call #
CRC:    CF97            ##########
```

```
############################################################################
#                                                                          #
#      Archimedes 8051 Assembler V1.80/MD2         22/Feb/90  14:30:42     #
#                                                                          #
#      Source  = getfrmq.s03                                               #
#      List    = ..\lst\getfrmq.lst                                        #
#      Object  = ..\obj\getfrmq.r03                                        #
#      Options = f                                                         #
#                                                                          #
(c) Copyright Archimedes Software 1985 #
############################################################################
```

```
 1
 2
 3  0000                    RSEG    GETQ
 4
 5  0000                    extern  front_q, end_q, queue_data, thra
 6
 7  0000                    public  get_frm_q
 8
 9  0000            get_frm_q:
10  0000 900000             mov     dptr,#thra
11  0003 A900               mov     r1,front_q
12  0005 E7                 mov     a,@r1
13  0006 F0                 movx    @dptr,a
14
15  0007 0500               inc     front_q
16
17  0009 E500               mov     a,front_q
18  000B B48004             cjne    a,#80h,label_a1
19
20  000E 7460               mov     a,#60h
21  0010 F500               mov     front_q,a
22
23  0012            label_a1:
24  0012 E500               mov     a,end_q
25  0014 B50002             cjne    a,front_q,label_a2
26  0017 C200               clr     queue_data
27
28  0019            label_a2:
29
30  0019 22                 ret
31
32  001A                    end Errors: None            ##########
Bytes:  26              # getfrmq #
CRC:    3CF5            ##########
```

```
##############################################################################
#                                                                            #
#     Archimedes 8051 Assembler V1.80/MD2            22/Feb/90  14:30:51     #
#                                                                            #
#        Source   =   add_2_q.s03                                            #
#        List     =   ..\lst\add_2_q.lst                                     #
#        Object   =   ..\obj\add_2_q.r03                                     #
#        Options  =   f                                                      #
#                                                                            #
(c) Copyright Archimedes Software 1985 #
##############################################################################

1
  2   0000                          RSEG    ADDQ
  3
  4   0000                          extern  queue_data, front_q, end_q, rhrb
  5
  6   0000                          public  add_2_q
  7
  8   0000          add_2_q:
  9   0000 300008                   jnb     queue_data,label_9a
 10
 11   0003 D200                     setb    queue_data
 12   0005 7460                     mov     a,#60h
 13   0007 F500                     mov     front_q,a
 14   0009 F500                     mov     end_q,a
 15
 16   000B          label_9a:
 17   000B 900000                   mov     dptr,#rhrb
 18   000E E0                       movx    a,@dptr
 19   000F A800                     mov     r0,end_q
 20   0011 F6                       mov     @r0,a
 21   0012 0500                     inc     end_q
 22   0014 E500                     mov     a,end_q
 23   0016 B48004                   cjne    a,#80h,label_9b
 24
 25   0019 7460                     mov     a,#60h
 26   001B F500                     mov     end_q,a
 27
 28   001D          label_9b:
 29
 30   001D 22                       ret
 31
 32   001E                          end Errors:  None           ###########
  Bytes:   30             # add_2_q #
  CRC:     3902           ###########

##############################################################################
#                                                                            #
#     Archimedes 8051 Assembler V1.80/MD2            22/Feb/90  14:30:57     #
#                                                                            #
#        Source   =   tdial.s03                                              #
#        List     =   ..\lst\tdial.lst                                       #
#        Object   =   ..\obj\tdial.r03                                       #
#        Options  =   f                                                      #
#                                                                            #
(c) Copyright Archimedes Software 1985 #
##############################################################################

1
  2   0000                          RSEG    TDIAL
  3
  4   0000                          extern  digit_cnt_loc, dial_digit_base, ex_prt, dis_clk
  5   0000                          extern  table_1, table_2, dtmf1, dtmf2
  6
  7   0000                          public  tdial
  8
  9                                 ;------------------------------------------------
 10                                 ;--
 11                                 ;--    subroutine : tdial
 12                                 ;--
```

```
13                        ;--     tone dialing subroutine
14                        ;--
15                        ;--     This subroutine contains the loop for dialing the
16                        ;--     specified MCP phone number using tone (dtmf) dialing
17                        ;--
18                        ;--------------------------------------------------------------
19   0000        tdial:
20                        ;--
21                        ;--     load r2 with number of digits to be dialed
22                        ;--
23   0000 AA00             mov     r2,digit_cnt_loc
24                    ;    inc     r2
25                        ;--
26                        ;--     load r0 with base address of digit store
27                        ;--
28   0002 7800             mov     r0,#dial_digit_base
29   0004 08               inc     r0
30                        ;--
31                        ;--     enable modem connection to phone line
32                        ;--
33                    ;    mov     a,r7
34                    ;    orl     a,#40h
35                    ;    mov     r7,a
36                    ;    mov     dptr,#ex_prt
37                    ;    movx    @dptr,a
38                        ;--
39                        ;--     begin dialing loop
40                        ;--
41                        ;--     load acc with digit to be dialed
42                        ;--
43   0005 7433             mov     a,#33h
44   0007 900000           mov     dptr,#dis_clk
45   000A F0               movx    @dptr,a
46
47   000B         label_7b:
48   000B E6               mov     a,@r0
49   000C F9               mov     r1,a
50                        ;--
51                        ;--     get low group code from table
52                        ;--
53   000D 900000           mov     dptr,#table_1
54   0010 93               movc    a,@a+dptr
55                        ;--
56                        ;--     output to dtmf generator #1
57                        ;--
58   0011 900000           mov     dptr,#dtmf1
59   0014 F0               movx    @dptr,a
60                        ;--
61                        ;--     get high group code from table
62                        ;--
63   0015 E6               mov     a,@r0
64   0016 900000           mov     dptr,#table_2
65   0019 93               movc    a,@a+dptr
66                        ;--
67                        ;--     output to dtmf generator #2
68                        ;--
69   001A 900000           mov     dptr,#dtmf2
70   001D F0               movx    @dptr,a
71                        ;--
72                        ;--     wait 90 msec
73                        ;--
74   001E 7CB4             mov     r4,#0b4h
75   0020         label_76:
76   0020 7DFF             mov     r5,#0ffh
77   0022         label_75:
78   0022 DDFE             djnz    r5,label_75
79   0024 DCFA             djnz    r4,label_76
80                        ;--
81                        ;--     disable dialed dtmf tone
82                        ;--
83   0026 7401             mov     a,#01h
84   0028 900000           mov     dptr,#dtmf1
85   002B F0               movx    @dptr,a
86   002C 900000           mov     dptr,#dtmf2
87   002F F0               movx    @dptr,a
```

```
 88                          ;--
 89                          ;-- wait 60 msec
 90                          ;--
 91  0030 7C78                mov    r4,#78h
 92  0032          label_77:
 93  0032 7DFF                mov    r5,#0ffh
 94  0034          label_78:
 95  0034 DDFE                djnz   r5,label_78
 96  0036 DCFA                djnz   r4,label_77
 97                          ;--
 98                          ;-- decrement digit count and see if any
 99                          ;-- more digits to be dialed
100                          ;--
101  0038 DA02                djnz   r2,label_79
102  003A 8003                sjmp   label_7a
103                          ;--
104                          ;-- increment pointer to next digit to be dialed
105                          ;--
106  003C          label_79:
107  003C 08                  inc    r0
108  003D 80CC                sjmp   label_7b
109
110  003F          label_7a:
111
112  003F 22                  ret
113
114  0040                     end Errors:  None       ########
   Bytes:   64         # tdial #
   CRC:     45A0       ########
```

```
################################################################
#                                                              #
#   Archimedes 8051 Assembler V1.80/MD2    22/Feb/90  14:31:08 #
#                                                              #
#   Source  =  pdial.s03                                       #
#   List    =  ..\lst\pdial.lst                                #
#   Object  =  ..\obj\pdial.r03                                #
#   Options =  f                                               #
#
(c) Copyright Archimedes Software 1985 #
################################################################
```

```
 1
 2  0000                     RSEG   PDIAL
 3
 4  0000                     public pdial
 5
 6  0000          pdial:
 7
 8  0000 22                  ret
 9
10  0001                     end Errors:  None       ########
   Bytes:   1          # pdial #
   CRC:     23DE       ########
```

```
###########################################################################
#                                                                         #
#       Archimedes Linker    V4.00/MD2              22/Feb/90  14:31:15   #
#                                                                         #
#          Target cpu     =  8051                                         #
#          List file      =  f:\dept\sw\dave\lst\link.lst                 #
#          Output file 1  =  f:\dept\sw\dave\obj\rpia_t4.hex              #
#          Output format  =  intel-standard                               #
#          Command line   =  -f comlnkh3.xcl (-c8051 -o                   #
#                            f:\dept\sw\dave\obj\rpia_t4.hex -l           #
#                            f:\dept\sw\dave\lst\link.lst -x -Fintel-standard #
#                            -Z(CODE)CSTART,CODE,INITP,INIT,INIT2,H_CMD,  #
#                            DIAL,TP_CHK,DDGT,FULLD,D_INTR,R_INTR,B_SERV, #
#                            LAMP,LOGIN,CLEAN,INCLL,GETQ,ADDQ,TDIAL,PDIAL=0 #
#                            rpimain.r03 rpi_equ.r03 init_prt.r03 init_drt.r03 #
#                            init_dtm.r03 b_rx_ser.r03 chkhcmd2.r03       #
#                            dialmcp.r03 chktpchr.r03 captdial.r03 fulldux.r03 #
#                            d_int_sr.r03 r_int_sr.r03 lamp_tst.r03 login.r03 #
#                            cleanup.r03 in_call.r03 getfrmq.r03 add_2_q.r03 #
#                            tdial.r03 pdial.r03)                         #
#                                                                         #
#                            (c) Copyright Archimedes Software Inc. 1988  #
###########################################################################

*****************************************
            *                                       *
            *            CROSS REFERENCE            *
            *                                       *
            *****************************************

There are no program entries.

*****************************************
            *                                       *
            *              MODULE MAP               *
            *                                       *
            *****************************************

FILE NAME : rpimain.r03
 PROGRAM MODULE, NAME : rpimain

SEGMENTS IN THE MODULE
 ======================
CSTART
   Relative segment, address : 0000 - 0048
          ENTRIES              ADDRESS          REF BY MODULE
          table_3              0040             login
          table_2              0036             tdial
          table_1              002C             tdial
   ----------------------------------------------------------------
CODE
   Relative segment, address : 0049 - 00A
          ENTRIES              ADDRESS          REF BY MODULE
          init_rpi             0049             Not referred to

****************************************************************************

FILE NAME : rpi_equ.r03
 PROGRAM MODULE, NAME : rpi_equ
          ABSOLUTE ENTRIES     ADDRESS          REF BY MODULE
          ================     =======          =============
          end_q                005F             add_2_q
                                                getfrmq
          front_q              005E             add_2_q
                                                getfrmq
          queue_data           000F             add_2_q
                                                getfrmq
                                                cleanup
                                                fulldux
                                                init_prt
          ring_event           000E             in_call
                                                cleanup
```

| | | |
|---|---|---|
| | | r_int_sr |
| | | init_prt |
| | | rpimain |
| dis_clk | 8060 | tdial |
| | | in_call |
| | | login |
| | | lamp_tst |
| | | r_int_sr |
| | | fulldux |
| | | captdial |
| | | dialmcp |
| | | chkhcmd2 |
| | | b_rx_ser |
| | | init_drt |
| | | init_prt |
| | | rpimain |
| ex_prt | 8030 | tdial |
| | | in_call |
| | | cleanup |
| | | fulldux |
| | | dialmcp |
| | | init_drt |
| | | init_prt |
| set_dopb | 801E | Not referred to |
| reset_dopb | 801F | Not referred to |
| srb | 8019 | cleanup |
| | | d_int_sr |
| | | fulldux |
| | | captdial |
| | | b_rx_ser |
| | | init_drt |
| | | rpimain |
| sra | 8011 | login |
| | | d_int_sr |
| | | fulldux |
| | | init_drt |
| a_rx_event | 000C | d_int_sr |
| cmd_ident | 000B | cleanup |
| | | fulldux |
| | | chkhcmd2 |
| | | rpimain |
| tp_char | 000A | chktpchr |
| | | dialmcp |
| | | rpimain |
| pulse_dial | 0009 | chktpchr |
| | | dialmcp |
| tone_dial | 0008 | chktpchr |
| | | dialmcp |
| connect_error | 0007 | in_call |
| | | cleanup |
| | | login |
| | | dialmcp |
| | | rpimain |
| cmd_compl | 000D | cleanup |
| | | fulldux |
| | | chkhcmd2 |
| | | rpimain |
| hang_cmd | 0006 | cleanup |
| | | fulldux |
| | | chkhcmd2 |
| | | rpimain |
| dial_cmd | 0005 | cleanup |
| | | fulldux |
| | | chkhcmd2 |
| | | rpimain |
| init_cmd | 0004 | cleanup |
| | | fulldux |
| | | chkhcmd2 |
| | | rpimain |
| T_chr_rcv | 0003 | cleanup |
| | | fulldux |
| | | chkhcmd2 |
| | | rpimain |
| A_chr_rcv | 0002 | cleanup |
| | | fulldux |

| | | |
|---|---|---|
| b_rx_event | 0001 | chkhcmd2<br>rpimain<br>d_int_sr<br>captdial<br>chktpchr<br>chkhcmd2<br>b_rx_ser<br>rpimain |
| dtmf_sel | 0000 | Not referred to |
| b_byte_rx | 0040 | d_int_sr<br>fulldux<br>captdial<br>chktpchr<br>chkhcmd2<br>b_rx_ser |
| a_byte_rx | 0041 | d_int_sr |
| thrb | 801B | fulldux |
| thra | 8013 | getfrmq<br>login<br>fulldux |
| rhrb | 801B | add_2_q<br>d_int_sr<br>fulldux<br>b_rx_ser |
| rhra | 8013 | d_int_sr<br>fulldux |
| duart_isr | 8015 | d_int_sr<br>fulldux |
| dial_digit_base | 0044 | tdial<br>captdial |
| c_detect | 0090 | Not referred to |
| clear_cpd | 0093 | Not referred to |
| cpd | 8080 | Not referred to |
| digit_cnt_loc | 0042 | tdial<br>captdial |
| cpd_d_vld | 0092 | Not referred to |
| off_hook | 0091 | rpimain |
| dtmf2 | 8040 | tdial<br>in_call<br>dialmcp<br>init_dtm |
| dtmf1 | 8020 | tdial<br>in_call<br>dialmcp<br>init_dtm |
| opcr | 801D | Not referred to |
| crb | 801A | cleanup<br>fulldux<br>init_drt<br>rpimain |
| csrb | 8019 | init_drt |
| mr2b | 8018 | Not referred to |
| mr1b | 8018 | init_drt |
| duart_imr | 8015 | fulldux<br>init_drt |
| acr | 8014 | Not referred to |
| cra | 8012 | cleanup<br>login<br>fulldux<br>init_drt |
| csra | 8011 | init_drt |
| mr2a | 8010 | Not referred to |
| mr1a | 8010 | init_drt |
| duart | 8010 | Not referred to |

****************************************************************

FILE NAME : init_prt.r03
PROGRAM MODULE, NAME : init_prt

SEGMENTS IN THE MODULE
======================
INITP
  Relative segment, address : 00DB - 00F0

| ENTRIES | ADDRESS | REF BY MODULE |
|---|---|---|
| init_parts | 00DB | rpimain |

****************************************************************

```
FILE NAME : init_drt.r03
PROGRAM MODULE, NAME : init_drt

SEGMENTS IN THE MODULE
======================
INIT
  Relative segment, address : 00F1 - 013D
        ENTRIES             ADDRESS         REF BY MODULE
        init_duart          00F1            init_prt

************************************************************************

FILE NAME : init_dtm.r03
PROGRAM MODULE, NAME : init_dtm

SEGMENTS IN THE MODULE
======================
INIT2
  Relative segment, address : 013E - 0148
        ENTRIES             ADDRESS         REF BY MODULE
        init_dtmf           013E            init_prt

************************************************************************

FILE NAME : b_rx_ser.r03
PROGRAM MODULE, NAME : b_rx_ser

SEGMENTS IN THE MODULE
======================
B_SERV
  Relative segment, address : 030A - 031A
        ENTRIES             ADDRESS         REF BY MODULE
        b_rx_ser            030A            cleanup
                                            captdial
                                            rpimain

************************************************************************

FILE NAME : chkhcmd2.r03
PROGRAM MODULE, NAME : chkhcmd2

SEGMENTS IN THE MODULE
======================
H_CMD
  Relative segment, address : 0149 - 0189
        ENTRIES             ADDRESS         REF BY MODULE
        chk_h_cmd           0149            cleanup
                                            fulldux
                                            rpimain

************************************************************************

FILE NAME : dialmcp.r03
PROGRAM MODULE, NAME : dialmcp

SEGMENTS IN THE MODULE
======================
DIAL
  Relative segment, address : 018A - 0226
        ENTRIES             ADDRESS         REF BY MODULE
        dial_mcp            018A            rpimain

************************************************************************

FILE NAME : chktpchr.r03
PROGRAM MODULE, NAME : chktpchr

SEGMENTS IN THE MODULE
======================
TP_CHK
  Relative segment, address : 0227 - 0241
        ENTRIES             ADDRESS         REF BY MODULE
        chk_tp_char         0227            rpimain

************************************************************************
```

```
FILE NAME : captdial.r03
PROGRAM MODULE, NAME : captdial

SEGMENTS IN THE MODULE
======================
DDGT
  Relative segment, address : 0242 - 0263
        ENTRIES              ADDRESS           REF BY MODULE
        capt_dial_digit      0242              rpimain

****************************************************************

FILE NAME : fulldux.r03
  PROGRAM MODULE, NAME : fulldux

SEGMENTS IN THE MODULE
  ======================
FULLD
  Relative segment, address : 0264 - 02D5
        ENTRIES              ADDRESS           REF BY MODULE
        full_dux             0264              rpimain

****************************************************************

FILE NAME : d_int_sr.r03
  PROGRAM MODULE, NAME : d_int_sr

SEGMENTS IN THE MODULE
  ======================
D_INTR
  Relative segment, address : 02D6 - 0301
        ENTRIES              ADDRESS           REF BY MODULE
        duart_int_isr        02D6              rpimain

****************************************************************

FILE NAME : r_int_sr.r03
  PROGRAM MODULE, NAME : r_int_sr

SEGMENTS IN THE MODULE
  ======================
R_INTR
  Relative segment, address : 0302 - 0309
        ENTRIES              ADDRESS           REF BY MODULE
        ring_int_isr         0302              rpimain

****************************************************************

FILE NAME : lamp_tst.r03
  PROGRAM MODULE, NAME : lamp_tst

SEGMENTS IN THE MODULE
  ======================
LAMP
  Relative segment, address : 031B - 033E
        ENTRIES              ADDRESS           REF BY MODULE
        lamp_tst             031B              rpimain

****************************************************************

FILE NAME : login.r03
  PROGRAM MODULE, NAME : login

SEGMENTS IN THE MODULE
  ======================
LOGIN
  Relative segment, address : 033F - 0364
        ENTRIES              ADDRESS           REF BY MODULE
        login                033F              in_call
                                               dialmcp

****************************************************************
```

```
FILE NAME : cleanup.r03
PROGRAM MODULE, NAME : cleanup

SEGMENTS IN THE MODULE
======================
CLEAN
  Relative segment, address : 0365 - 03A1
          ENTRIES            ADDRESS          REF BY MODULE
          cleanup            0365             rpimain

***********************************************************************

FILE NAME : in_call.r03
PROGRAM MODULE, NAME : in_call

SEGMENTS IN THE MODULE
======================
INCLL
  Relative segment, address : 03A2 - 0410
          ENTRIES            ADDRESS          REF BY MODULE
          in_call            03A2             rpimain

***********************************************************************

FILE NAME : getfrmq.r03
PROGRAM MODULE, NAME : getfrmq

SEGMENTS IN THE MODULE
======================
GETQ
  Relative segment, address : 0411 - 042A
          ENTRIES            ADDRESS          REF BY MODULE
          get_frm_q          0411             fulldux

***********************************************************************

FILE NAME : add_2_q.r03
PROGRAM MODULE, NAME : add_2_q

SEGMENTS IN THE MODULE
======================
ADDQ
  Relative segment, address : 042B - 0448
          ENTRIES            ADDRESS          REF BY MODULE
          add_2_q            042B             fulldux

***********************************************************************

FILE NAME : tdial.r03
PROGRAM MODULE, NAME : tdial

SEGMENTS IN THE MODULE
======================
TDIAL
  Relative segment, address : 0449 - 0488
          ENTRIES            ADDRESS          REF BY MODULE
          tdial              0449             dialmcp

***********************************************************************

FILE NAME : pdial.r03
PROGRAM MODULE, NAME : pdial

SEGMENTS IN THE MODULE
======================
PDIAL
  Relative segment, address : 0489 - 0489
          ENTRIES            ADDRESS          REF BY MODULE
          pdial              0489             dialmcp
```

```
************************************************
*                                              *
*           SEGMENTS IN DUMP ORDER              *
*                                              *
************************************************
```

| SEGMENT | START ADDRESS | | END ADDRESS | TYPE | ORG | P/N | ALIGN |
|---------|---------------|---|-------------|------|-----|-----|-------|
| CSTART  | 0000          | - | 0048        | rel  | stc | pos | 0 |
| CODE    | 0049          | - | 00DA        | rel  | flt | pos | 0 |
| INITP   | 00DB          | - | 00F0        | rel  | flt | pos | 0 |
| INIT    | 00F1          | - | 013D        | rel  | flt | pos | 0 |
| INIT2   | 013E          | - | 0148        | rel  | flt | pos | 0 |
| H_CMD   | 0149          | - | 0189        | rel  | flt | pos | 0 |
| DIAL    | 018A          | - | 0226        | rel  | flt | pos | 0 |
| TP_CHK  | 0227          | - | 0241        | rel  | flt | pos | 0 |
| DDGT    | 0242          | - | 0263        | rel  | flt | pos | 0 |
| FULLD   | 0264          | - | 02D5        | rel  | flt | pos | 0 |
| D_INTR  | 02D6          | - | 0301        | rel  | flt | pos | 0 |
| R_INTR  | 0302          | - | 0309        | rel  | flt | pos | 0 |
| B_SERV  | 030A          | - | 031A        | rel  | flt | pos | 0 |
| LAMP    | 031B          | - | 033E        | rel  | flt | pos | 0 |
| LOGIN   | 033F          | - | 0364        | rel  | flt | pos | 0 |
| CLEAN   | 0365          | - | 03A1        | rel  | flt | pos | 0 |
| INCLL   | 03A2          | - | 0410        | rel  | flt | pos | 0 |
| GETQ    | 0411          | - | 042A        | rel  | flt | pos | 0 |
| ADDQ    | 042B          | - | 0448        | rel  | flt | pos | 0 |
| TDIAL   | 0449          | - | 0488        | rel  | flt | pos | 0 |
| PDIAL   | 0489          | - | 0489        | rel  | flt | pos | 0 |

```
************************************************
*                                              *
*           END OF CROSS REFERENCE             *
*                                              *
************************************************
```

Errors: none
Warnings: none

APPENDIX "3"

```
;----------------------------------------------------------------;
; Eng: Rony Ophir                          Rev. Date : 6-13-89  ;
;----------------------------------------------------------------;
;           << Gold Star Products Co., Ltd. >>                  ;
;                  170 Mount Airy Road                          ;
;                  Basking Ridge, NJ 07920                      ;
;                     (201) 953-9001                            ;
;                                                                ;
;        Copyright (C) 1989 Gold Star Products Co., Ltd         ;
;----------------------------------------------------------------;
; .FILENAME: RPI_sub1.s03                   .SYS: 8031
; Assembly routines used for RPI MODULE  rpi_sub1

LSTOUT-
$include\tru.equ
$include\bios.equ
$include\feat_grp.equ
        LSTOUT+

;------------------------- Publics ------------------------------
;
PUBLIC rpi_ee_range_ck, rpi_ram_range_ck, rpi_wr_ee_byte, read_rpi_switch
PUBLIC update_rpi_report_time, set_rpi_switch, reset_rpi_switch
PUBLIC select_rpi_group, turn_rpi_off, rpi_unit_busy_msg, initiate_rpi_call ;------------------------- Externals ----------------------------
;
EXTERN nvm_wr, misc_out, rpi_nvm_wr_count, rpi_rx_buf
EXTERN nvm_rpi_report_tmr_ovf, nvm_rpi_report_tmr, nvm_nreset_tmr
EXTERN uf_nreset_tmr, nvm_rpi_report_intrvl EXTERN RPI_w1, RPI_w2, RPI_w3, RPI_b1, RPI_b2, nam_rpi_onoff
EXTERN nam_rep_size, nam_fgroup, fg_test, rpi_auto_tel EXTERN ram_rpi_onoff, ram_rep_size, ram_fgroup, nvm_nam_mode
EXTERN set_handset_path ;--------------------------- Code -------------------------------
;
        RSEG CODE rpi_unit_busy_msg       db      'UNIT BUSY'     ; unit busy message rpi_feature_switches_tbl:                       ; 32 RPI Feature switches
                db      00h,80h         ; Feature Switch 00
                db      00h,40h         ; Feature Switch 01
                db      00h,20h         ; Feature Switch 02
                db      00h,10h         ; Feature Switch 03
                db      00h,08h         ; Feature Switch 04
                db      00h,04h         ; Feature Switch 05
                db      00h,02h         ; Feature Switch 06
                db      00h,01h         ; Feature Switch 07 db      01h,80h         ; Feature Switch 08
                db      01h,40h         ; Feature Switch 09
                db      01h,20h         ; Feature Switch 10
                db      01h,10h         ; Feature Switch 11
                db      01h,08h         ; Feature Switch 12
                db      01h,04h         ; Feature Switch 13
                db      01h,02h         ; Feature Switch 14
                db      01h,01h         ; Feature Switch 15 db      02h,80h         ; Feature Switch 16
                db      02h,40h         ; Feature Switch 17
                db      02h,20h         ; Feature Switch 18
                db      02h,10h         ; Feature Switch 19
```

```
                db      02h,08h         ; Feature Switch 20
                db      02h,04h         ; Feature Switch 21
                db      02h,02h         ; Feature Switch 22
                db      02h,01h         ; Feature Switch 23 db      03h,80h         ; Feature Switch 24
                db      03h,40h         ; Feature Switch 25
                db      03h,20h         ; Feature Switch 26
                db      03h,10h         ; Feature Switch 27
                db      03h,08h         ; Feature Switch 28
                db      03h,04h         ; Feature Switch 29
                db      03h,02h         ; Feature Switch 30
                db      03h,01h         ; Feature Switch 31 rpi_feature_groups_tbl:                         ; 8 RPI Feature Groups
        db      00000000b, 00000000b, 00000000b ; Feature group 0
        db      11000011b, 00111111b, 10011110b ; Feature group 1
        db      01000000b, 00000000b, 00000000b ; Feature group 2
        db      11100011b, 00111111b, 11111110b ; Feature group 3
        db      01001111b, 00000001b, 10000000b ; Feature group 4
        db      11111011b, 11111111b, 11111110b ; Feature group 5
        db      11000000b, 00110001b, 11001000b ; Feature group 6
        db      11111011b, 11111011b, 11110100b ; Feature group 7  (3/9/90)

rpi_REP_available_tbl:  ; Repertory memory locations available to the user
                db      0               ; Feature Group 0 -  0 LOCs
                db      10              ; Feature Group 1 - 10 LOCs
                db      30              ; Feature Group 2 - 30 LOCs
                db      30              ; Feature Group 3 - 30 LOCs
                db      50              ; Feature Group 4 - 50 LOCs
                db      50              ; Feature Group 5 - 50 LOCs
                db      99              ; Feature Group 6 - 99 LOCs
                db      99              ; Feature Group 7 - 99 LOCs ;-----------------------------------------------------------------------
; RPI_WR_EE_BYTE:
; ---------------
; Calls nvm_wr routine which returns 1 if the write was performed or 0 if
; not. RPI_NVM_WR_COUNT is updated to indicate how many NVM writes took place.
;
; Input:
; R5      = char
; R2 $ R3 = NVM addr
;
rpi_wr_ee_byte:
        lcall   nvm_wr                  ; Write byte into NVM.
        mov     dptr,#rpi_nvm_wr_count  ; update rpi_nvm_wr_count
        movx    a,@dptr                 ; Get rpi_nvm_wr_count.
        add     a,r3                    ; Add 1 or 0 to the counter.
        movx    @dptr,a                 ; Update rpi_nvm_wr_count.
        ret ;-----------------------------------------------------------------------
; RPI_EE_RANGE_CK:
; ----------------
; This routine gets an address and checks if the address is in the EE memory
; range (2k = A000 - A7FF) or (4k = A000 - AFFFF).
;
; Input:
; R2 & R3 = Address to check.
;
; Returns:
; Acc = 1 if address is in-range.
; Acc = 0 if address is out-of-range.
;
rpi_ee_range_ck:
        mov     a,r2                    ; Move high byte of address to acc.
        clr     c                       ; Clear carry
        subb    a,#0A0h
        jc      ee_out_of_range         ; Address LT A0xx ---> out of range.

mov     a,r2                    ; No carry - address GE A0xx
        subb    a,#( high(EEPROM_END) + 1 )
        jnc     ee_out_of_range         ; Address GE A8xx or B0xx ---> out of range.
```

```
        mov     a,#1                    ; Address LE A7xx or 80xx ---> in range
        ret                             ; Return 1 - Address is in range.

ee_out_of_range:                        ; Address is out of range
        clr     a
        ret                             ; Return 0

;--------------------------------------------------------------------------------
; RPI_RAM_RANGE_CK:
; ----------------
; This routine gets an address and checks if the address is in the Ext. RAM
; memory range (8000 - 9FFF). It returns 1 if in-range or 0 if out-of-range.
;
; Input:
; R2 & R3 = Address to check.
;
; Returns:
; Acc = 1 if address is in-range.
; Acc = 0 if address is out-of-range.
;
;
rpi_ram_range_ck:
        mov     a,r2                    ; Move high byte of address to acc.
        clr     c                       ; Clear carry
        subb    a,#80h
        jc      ram_out_of_range        ; Address LT 80xx ---> out of range.

mov     a,r2                    ; No carry - address GE 80xx
        subb    a,#0A0h
        jnc     ram_out_of_range        ; Address GE A0xx ---> out of range.

mov     a,#1                    ; Address LE 9Fxx ---> in range
        ret                             ; Return 1 - Address is in range.

ram_out_of_range:                       ; Address is out of range
        clr     a
        ret                             ; Return 0

;--------------------------------------------------------------------------------
; COPY_ONOFF_SWITCH_2_RAM
; -----------------------
; This routine copys the RPI Feature switch indicated by RPI_b1 from the NAM
; indicated by RPI_b2 to RAM. It is called when an OnOff switch is updated in
; NAM which is also active.
;
copy_onoff_switch_2_ram:
        mov     dptr,#RPI_b1            ; Switch Number
        movx    a,@dptr
        mov     dptr,#rpi_feature_switches_tbl
        rl      a                       ; Table Offset = offset*2 movc    a,@a+dptr               ; Get the Switch Byte Offset from ROM
        mov     r4,a                    ; Save it in R4 mov     dptr,#RPI_b2            ; NAM Number
        movx    a,@dptr
        mov     dptr,#nam_rpi_onoff
        mov     b,#Size_Of_1_Nam
        mul     ab                      ; Offset in NAM
        add     a,dpl
        add     a,r4                    ; Offset of NAM byte containing the switch
        mov     dpl,a
        movx    a,@dptr                 ; Get one NVM byte containg 8 switches
        mov     r5,a                    ; Save it in R5

; Store it in RAM
        mov     dptr,#ram_rpi_onoff
        mov     a,dpl
        add     a,r4
        mov     dpl,a
        jnc     $+4
        inc     dph
```

```
        mov     a,r5                    ; Get the byte containing the switch
        movx    @dptr,a                 ; Stote it in RAM
        ret ;------------------------------------------------------------------------
; READ_RPI_SWITCH:
; ---------------
; This routine will read the value of the RPI Feature switch indicated by
; RPI_b1. The NAM number is contained in RPI_b2. It returns the switch
; reading (0 or 1)
;

read_rpi_switch:
        mov     dptr,#RPI_b1
        movx    a,@dptr                 ; Switch Number
        mov     dptr,#rpi_feature_switches_tbl
        rl      a                       ; Table Offset = offset*2
        mov     r0,a                    ; Save table offset in R0 movc    a,@a+dptr               ; Get the Switch Byte Offset from ROM
        mov     r4,a                    ; Save it in R4 mov     a,r0                    ; Table offset
        inc     acc                     ; Next byte
        movc    a,@a+dptr               ; Get the Switch Byte Mask
        mov     r5,a                    ; Save it in R5 mov     dptr,#RPI_b2
        movx    a,@dptr                 ; NAM Number
        mov     dptr,#nam_rpi_onoff
        mov     b,#Size_Of_1_Nam
        mul     ab                      ; Offset in NAM
        add     a,dpl
        add     a,r4                    ; Offset of NAM byte containing the switch
        mov     dpl,a
        movx    a,@dptr                 ; Get one EE byte contaning 8 switches
        anl     a,r5                    ; Get the switch value using the mask
        jnz     r_switch_on             ; Is the switch ON?
        ret                             ; Return 0 r_switch_on:                            ; Switch is ON
        mov     a,#1                    ; Return 1
        ret ;------------------------------------------------------------------------
; SET_RPI_SWITCH:
; --------------
; This routine will set the RPI Feature switch indicated by RPI_b1. The NAM
; number is indicated by RPI_b2. If NAM is active the switch setting is copied
; to RAM.
;

set_rpi_switch:
        mov     dptr,#RPI_b1
        movx    a,@dptr                 ; Switch Number
        mov     dptr,#rpi_feature_switches_tbl
        rl      a                       ; Table Offset = offset*2
        mov     r0,a                    ; Save table offset in R0 movc    a,@a+dptr               ; Get the Switch Byte Offset from ROM
        mov     r4,a                    ; Save it in R4
        mov     a,r0                    ; Table offset inc     acc                     ; Next byte
        movc    a,@a+dptr               ; Get the Switch Byte Mask
        mov     r5,a                    ; Save it in R5 mov     dptr,#RPI_b2
        movx    a,@dptr                 ; NAM Number
        push    acc                     ; Save it on the stack mov     dptr,#nam_rpi_onoff
        mov     b,#Size_Of_1_Nam
        mul     ab                      ; Offset in NAM
        add     a,dpl
```

```
        add     a,r4                    ; Offset of NAM byte containing the switch
        mov     dpl,a
        movx    a,@dptr                 ; Get one EE byte containg 8 switches
        orl     a,r5                    ; Set the switch by using the mask ; Store it in NAM (nvm)
        mov     r5,a
        mov     r2,dph
        mov     r3,dpl
        lcall   nvm_wr                  ; Write to NVM mov     dptr,#nvm_nam_mode
        movx    a,@dptr
        pop     _R+0                    ; Get NAM number from the stack
        xrl     a,r0 jnz     set_rpi_switch_out      ; Is it the active NAM ?
        call    copy_onoff_switch_2_ram ; YES - copy switch to RAM set_rpi_switch_out:
        ret ;------------------------------------------------------------------------
; RESET_RPI_SWITCH:
; ----------------
; This routine will reset the RPI Feature switch indicated by RPI_b1. The NAM
; number is indicated in RPI_b2. If NAM is active the switch setting is copied
; to RAM.
;
reset_rpi_switch:
        mov     dptr,#RPI_b1
        movx    a,@dptr                 ; Switch Number
        mov     dptr,#rpi_feature_switches_tbl
        rl      a                       ; Table Offset = offset*2
        mov     r0,a                    ; Save table offset in R0 movc    a,@a+dptr               ; Get the Switch Byte Offset from ROM
        mov     r4,a                    ; Save it in R4 mov     a,r0                    ; Table offset
        inc     acc                     ; Next byte
        movc    a,@a+dptr               ; Get the Switch Byte Mask
        cpl     a                       ; Complement the mask (for reset)
        mov     r5,a                    ; Save it in R5 mov     dptr,#RPI_b2
        movx    a,@dptr                 ; NAM Number
        push    acc                     ; Save it on the stack mov     dptr,#nam_rpi_onoff
        mov     b,#Size_Of_1_Nam
        mul     ab                      ; Offset in NAM
        add     a,dpl
        add     a,r4                    ; Offset of NAM byte containing the switch
        mov     dpl,a
        movx    a,@dptr                 ; Get one EE byte containg 8 switches
        anl     a,r5                    ; Reset the switch by using the mask ; Store it in NAM (nvm)
        mov     r5,a
        mov     r2,dph
        mov     r3,dpl
        lcall   nvm_wr                  ; Write to NVM
        mov     dptr,#nvm_nam_mode
        movx    a,@dptr
        pop     _R+0                    ; Get NAM number from the stack
        xrl     a,r0 jnz     reset_rpi_switch_out    ; Is it the active NAM ?
        call    copy_onoff_switch_2_ram ; YES - copy switch to RAM reset_rpi_switch_out:
        ret
```

```
;-------------------------------------------------------------------------------
; COPY_FGROUP_2_RAM:
; -----------------
; This routine copys nvm_rpi_onoff, nvm_rep_size and nvm_fgroup to RAM. It is
; called by select_rpi_group routine if RPI_b2 indicates NAM which is active.

copy_fgroup_2_ram:
        mov     dptr,#RPI_b2
        movx    a,@dptr                 ; NAM number
        mov     r0,a                    ; Save it in R0 mov     dptr,#ram_rpi_onoff     ; OnOff (RAM)
        mov     r2,dph
        mov     r3,dpl                  ; Save it in R2 $ R3 mov     dptr,#nam_rpi_onoff
        mov     b,#Size_Of_1_Nam
        mul     ab                      ; Offset in NVM NAM
        add     a,dpl
        mov     dpl,a                   ; OnOff (NVM) in DPTR ;
;       Set the 'ram_rpi_onoff'
;

mov     r1,#3                   ; Loop count = 3
upd_onoff_loop:
        movx    a,@dptr                 ; NVM OnOff byte
        inc     dptr
        mov     r4,dph
        mov     r5,dpl                  ; Next NVM addr in R4 $ R5 mov     dph,r2                  ; RAM OnOff addr
        mov     dpl,r3
        movx    @dptr,a                 ; Write it to RAM
        inc     dptr
        mov     r2,dph
        mov     r3,dpl                  ; Next RAM addr in R2 $ R3 mov     dph,r4
        mov     dpl,r5                  ; Load NVM addr djnz    r1,upd_onoff_loop       ; All switches moved to RAM ?
                                        ; Yes -
;
;       Set the 'ram_rep_size'
;

mov     a,r0                    ; NAM number
        mov     dptr,#nam_rep_size      ; Repertory available count
        mov     b,#Size_Of_1_Nam
        mul     ab
        add     a,dpl
        mov     dpl,a
        movx    a,@dptr                 ; Get the NVM rep_size mov     dptr,#ram_rep_size
        movx    @dptr,a                 ; Store it in RAM ;
;       Set the 'ram_fgroup'
;

mov     a,r0                    ; NAM number
        mov     dptr,#nam_fgroup        ; Feature group number
        mov     b,#Size_Of_1_Nam
        mul     ab
        add     a,dpl
        mov     dpl,a
        movx    a,@dptr                 ; Get the NVM fgroup mov     dptr,#ram_fgroup
        movx    @dptr,a                 ; Store it in RAM
        ret
```

```
;---------------------------------------------------------------------
; SELECT_RPI_GROUP:
; ----------------
; This routine will select the RPI Feature group indicated by RPI_b1. It sets
; rpi_onoff, rep_size and fgroup in the NAM which is indicated by RPI_b2.
; If NAM is active, it will call copy_fgroup_2_ram which copys rpi_onoff,
; rep_size and fgroup to RAM.

select_rpi_group:
        mov     dptr,#RPI_b2
        movx    a,@dptr                         ; NAM number
        mov     r4,a                            ; Save it in R4 mov     dptr,#nam_rpi_onoff
        mov     b,#Size_Of_1_Nam
        mul     ab                              ; Offset in NAM
        add     a,dpl
        mov     dpl,a
        mov     r2,dph                          ; Save NAM address in R2 $ R3
        mov     r3,dpl mov     dptr,#RPI_b1
        movx    a,@dptr                         ; Feature group Number
        push    acc                             ; Save it on the stack mov     b,#3                            ; 24 switches (3 bytes)
        mul     ab                              ; ROM offset (Table)
        mov     r0,a                            ; Save it R0

;----------------------------------------
;       Set the 'nam_rpi_onoff'
;---------------------------------------- mov     dptr,#rpi_feature_groups_tbl    ; Rpi Feature Groups (ROM)
        mov     r1,#3                           ; R1 = Loop count = 3
sel_grp_loop:
        mov     a,r0                            ; ROM offset
        movc    a,@a+dptr                       ; Get ROM byte (8 switches)

push    _R+0
        push    _R+2                            ; Save R0, R2, R3, DPTR
        push    _R+3
        push    dph
        push    dpl mov     r5,a
        lcall   nvm_wr                          ; Write to NAM (nvm)

pop     dpl                             ; Restore DPTR, R3, R2, R0
        pop     dph
        pop     _R+3
        pop     _R+2
        pop     _R+0 inc     _R+3                            ; Next NAM location
        inc     _R+0                            ; Next ROM Table offset
        djnz    r1,sel_grp_loop                 ; All switches moved to NAM?
                                                ; Yes -

;----------------------------------------
;       Set the 'nam_rep_size'
;----------------------------------------
        mov     dptr,#rpi_REP_available_tbl     ; ROM table
        pop     acc                             ; Feature Group Number
        mov     r1,a                            ; Save it in R1
        movc    a,@a+dptr                       ; Get the Rep Available count
        mov     r0,a                            ; Save it in R0 mov     a,r4                            ; NAM number
        mov     dptr,#nam_rep_size              ; Repertory available count
        mov     b,#Size_Of_1_Nam
        mul     ab
        add     a,dpl
        mov     dpl,a ; Store it in NAM (nvm)
        mov     a,r0                            ; Rep available count
```

```
        mov     r5,a
        mov     r2,dph
        mov     r3,dpl
        lcall   nvm_wr                  ; Write to NVM ;----------------------------------------
;       Set the 'nam_fgroup'
;---------------------------------------- mov     a,r4                    ; NAM number
        mov     dptr,#nam_fgroup        ; Feature group number
        mov     b,#Size_Of_1_Nam
        mul     ab
        add     a,dpl
        mov     dpl,a
                                        ; Store it in NAM (nvm)
        mov     a,r1                    ; Feature Group Number
        mov     r5,a
        mov     r2,dph
        mov     r3,dpl
        lcall   nvm_wr                  ; Write to NVM mov     dptr,#nvm_nam_mode
        movx    a,@dptr
        xrl     a,r4 jnz     skip_copy_ram_fgroup
        call    copy_fgroup_2_ram       ; Copy feature group to RAM skip_copy_ram_fgroup:
        ret ;--------------------------------------------------------------------
; TURN_RPI_OFF:
; -------------
; This routine will disable DUART B interrupts, Turn off the modem, Select
; Audio path. It is called when RPI session is ended.
;

turn_rpi_off:

mov     r5,#MODEM_TURNED_OFF    ; R5 = 1
        mov     r3,#MODEM_OFF           ; R3 = bit location
        lcall   misc_out call    set_handset_path        ; Select Audio path mov     dptr,#CRB
        mov     a,#4Ah                  ;Disable Rx $ Tx and Reset SRB status bits
        movx    @dptr,a
        mov     a,#5Ah                  ;Disable Rx $ Tx and Reset ISR Delta Break bit
        movx    @dptr,a clr     RPI_session_bit         ; Clear RPI session bit
        ret ;--------------------------------------------------------------------
; CHECK_RPI_REPORT_TIME
; ---------------------
;
; This routine compares between NVM_NRESET_TMR and NVM_RPI_REPORT_TMR in order
; to find out if MCP needs to originate an RPI report call.
;
; Nreset_tmr $ Rpi_report_tmr Format :
;
; [ss] [mm] [hh] [hh] = [hhhh] Hours [mm] Minutes [ss] Seconds
;  B0   B1   B2   B3
;
; If NVM_RPI_REPORT_TMR_OVF = 1, It means that NVM_RPI_REPORT_TMR has wrapped
; around, however UF_NRESET_TMR HAS NOT. In this case RPI report is NOT DUE.
;
; The RPI_REPORT_TMR_OVF is set by UPDATE_RPI_REPORT_TIME routine, and is
; reset by INC_CALL_TMR routine.
;
```

```
; RPI report is due if the following conditions are met:
;
; 1. mvm_rpi_report_tmr_ovf = 0
; 2. nvm_nreset_tmr >= nvm_rpi_report_tmr
;
; It returns TRUE if report IS DUE, or FALSE if it's NOT DUE.
;

check_rpi_report_time:
        mov     dptr,#nvm_rpi_report_tmr_ovf    ; If overflow flag is set ->
        movx    a,@dptr                         ; Report IS NOT DUE
        jnz     ck_rpi_rpt4                     ; Next report tmr overflow?
                                                ; NO mov     dptr,#(nvm_rpi_report_tmr+3)
        movx    a,@dptr                         ; Rpi report timer byte
        mov     r1,a                            ; Save it in R1 mov     r4,dph                          ; Next rpi report timer byte addr
        mov     a,dpl                           ; Save it in R4 $ R5
        dec     a
        mov     r5,a                            ; Next addr = dptr - 1
        jnc     $+3                             ; Save it R4 $ R5
        dec     r4 mov     dptr,#(nvm_nreset_tmr+3)        ; Non Reset timer addr
        mov     r0,#4                           ; Loop count ck_rpi_rpt1:
        movx    a,@dptr                         ; Nreset timer byte
        push    acc                             ; Save it on the stack mov     r2,dph                          ; Next Nreset timer byte addr
        mov     a,dpl
        dec     a
        mov     r3,a                            ; Next addr = dptr - 1
        jnc     $+3                             ; Save it in R2 $ R3
        dec     r2 pop     acc                             ; Nreset timer byte
        clr     c
        subb    a,r1                            ; Nreset_tmr - report_tmr jz      ck_rpi_3                        ; Nrest_tmr = Rpi_report_tmr
                                                ;       --> Check next byte
        jnc     ck_rpi_rpt2                     ; Nrest_tmr > Rpi_report_tmr
                                                ;       --> Report is DUE ck_rpi_rpt4:
        mov     a,#0                            ; Nrest_tmr < Rpi_report_tmr
        ret                                     ; --> Report is NOT DUE ck_rpi_3:                                       ; Process next timer byte
        mov     dph,r4
        mov     dpl,r5
        movx    a,@dptr                         ; Next rpi report timer byte
        mov     r1,a                            ; Save i in R1 mov     r4,dph                          ; Rpi report timer byte addr
        mov     a,dpl                           ; Save it in R4 $ R5
        dec     a
        mov     r5,a                            ; Next addr = dptr - 1
        jnc     $+3                             ; Save it R4 $ R5
        dec     r4 mov     dph,r2
        mov     dpl,r3                          ; Load Nrest tmr addr
        djnz    r0,ck_rpi_rpt1                  ; Loop (4 bytes)

;
; Nreset_tmr = RPI_report_tmr therefore Report is DUE
;

ck_rpi_rpt2:
        mov     a,#1                            ; Report is DUE
        ret
```

```
;--------------------------------------------------------------------
; INITIATE_RPI_CALL
; -----------------
;
; This routine will initiate an RPI call if the following conditions are met:
;
; 1. RPI Auto report bit is ENABLE
; 2. RPI Auto report call is DUE
;
; It returns TRUE if RPI call should be initiated or FALSE if it should NOT
; be initiated.
;

initiate_rpi_call:

mov     r3,#FG_RPI_AUTO_REP
        lcall   fg_test
        mov     a,r3
        jz      int_rpi_call_1          ; Is RPI report bit enable ?

call    check_rpi_report_time   ; YES; Is report DUE ?
        jz      int_rpi_call_1 mov     r3,#TRUE                ; YES - Return TRUE (DUE)
        ret int_rpi_call_1:
        mov     r3,#FALSE               ; NO - Return FALSE (NOT DUE)
        ret ;--------------------------------------------------------------------
; UPDATE_RPI_REPORT_TMR:
; ---------------------
;
; This routine updates one byte of the rpi_next_report_tmr
;
; Input:
; Dptr - Addesss of timer byte to be updated
; R0   - Current timer byte value
; R1   - Value to be added (intrvl) to current timer byte value
; R2   - Minutes/Hours indication (Minutes = 60 , Hours = 99)
;
; Output:
; Acc  - Wrap-around indication (1 or 0)
;

update_rpi_report_tmr:
        mov     r3,#0                   ; Set default return value
        mov     a,r0                    ; Get the timer byte value cjne    r1,#0,u_rpi_rpt_tmr_00  ; Is intrvl = 0 ?
        sjmp    u_rpi_rpt_tmr_99        ; Yes - Go write to NVM u_rpi_rpt_tmr_00:                       ; No
        cjne    r2,#60h,u_rpi_rpt_tmr_10 ; MINUTES/SECONDS or HOURS ?

;
; Update the MINUTES/SECONDS timer byte
;

u_rpi_rpt_tmr_0:
        add     a,#1                    ; Add one unit
        da      a                       ; Decimal adjust
        cjne    a,#60h,u_rpi_rpt_tmr_3  ; Wrap-around ?

u_rpi_rpt_tmr_1:                        ; YES
        mov     r3,#1                   ; Return value = 1
        clr     a                       ; Timer = 0 u_rpi_rpt_tmr_2:
        djnz    r1,u_rpi_rpt_tmr_0      ; Loop until 0
        sjmp    u_rpi_rpt_tmr_99        ; Go and write to NVM u_rpi_rpt_tmr_3:
        jc      u_rpi_rpt_tmr_2         ; Timer < 60h
        sjmp    u_rpi_rpt_tmr_1         ; Timer > 60h
```

```
;
; Update the HOURS timer byte
;

u_rpi_rpt_tmr_10:
        add     a,#1                            ; Add one unit
        da      a                               ; Decimal adjust
        jnc     u_rpi_rpt_tmr_11                ; Wrap-around ?
        mov     r3,#1                           ; Yes, return value = 1 u_rpi_rpt_tmr_11:
        djnz    r1,u_rpi_rpt_tmr_10             ; Loop until 0

;
; Write timer byte to NVM
;

u_rpi_rpt_tmr_99:
        push    _R+3                            ; Save Wrap-around indication
        mov     r2,dph
        mov     r3,dpl
        mov     r5,a
        lcall   nvm_wr                          ; Write to NVM pop     _R+3                            ; Get Wrap-around indication
        ret ;--------------------------------------------------------------------------
; UPDATE_RPI_REPORT_TIME
; ----------------------
;
; This routine updates the NVM_RPI_REPORT_TMR by the value indicated by
; NVM_RPI_REPORT_INTRV and UF_NRESET_TMR. It is called when RPI has completed
; the login process.
;
; Rpi_report_tmr $ Uf_nreset_tmr Format:
;
; [ss] [mm] [hh] [hh] = [hhhh] HOURES [mm] MINUTES [ss] SECONDS
;  B0   B1   B2   B3
;
; Rpi_report_intrvl Format :
; [mm] [hh]  = [hh] HOURS [mm] MINUTES
;  B0   B1
;

update_rpi_report_time:
                                                ; Seconds byte
        mov     dptr,#uf_nreset_tmr
        movx    a,@dptr
        mov     r0,a                            ; Current value
        mov     r1,#0                           ; Interval value = 0
        mov     r2,#60h                         ; Minutes indication
        mov     dptr,#nvm_rpi_report_tmr
        call    update_rpi_report_tmr           ; Returns carry in R3

; Minutes byte
        mov     dptr,#(uf_nreset_tmr + 1)
        movx    a,@dptr
        mov     r0,a                            ; Current value
        mov     dptr,#nvm_rpi_report_intrvl
        movx    a,@dptr
        mov     r1,a                            ; Interval value
        mov     r2,#60h                         ; Minutes indication
        mov     dptr,#(nvm_rpi_report_tmr + 1)
        call    update_rpi_report_tmr           ; Returns carry in R3

; Hours first byte
        mov     dptr,#(uf_nreset_tmr + 2)
        movx    a,@dptr
        mov     r0,a                            ; Current value
        mov     dptr,#(nvm_rpi_report_intrvl + 1)
        movx    a,@dptr
        add     a,r3                            ; Add carry
```

```
        mov     r1,a                    ; Interval value
        mov     r2,#99h                 ; Hours Indication
        mov     dptr,#(nvm_rpi_report_tmr + 2)
        call    update_rpi_report_tmr           ; Returns carry in R3 mov     a,r3
        jz      upd_rpi_report_time_0           ; Carry ?

; Yes
                                                ; Hours second byte
        mov     dptr,#(uf_nreset_tmr + 3)
        movx    a,@dptr
        mov     r0,a                    ; Current value
        mov     r1,#1                   ; Interval value = 1
        mov     r2,#99h                 ; Hours indication
        mov     dptr,#nvm_rpi_report_tmr
        call    update_rpi_report_tmr           ; Returns carry in R3 mov     a,r3
        jz      upd_rpi_report_time_0           ; Wrap-around ?

; YES
        mov     dptr,#nvm_rpi_report_tmr_ovf
        movx    @dptr,a                         ; Rpi_report_time_ovf = 1 upd_rpi_report_time_0:
        ret

END     ; rpi_sub1.s03

;-----------------------------------------------------------------------:
; Eng: Rony Ophir                              Rev. Date : 6-19-89      :
;-----------------------------------------------------------------------:
;               << Gold Star Products  Co., Ltd. >>                     :
;                      170 Mount Airy Road                              :
;                      Basking Ridge, NJ 07920                          :
;                           (201)  953-9001                             :
;                                                                       :
;        Copyright (C) 1989 Gold Star Products Co., Ltd                 :
;-----------------------------------------------------------------------:
; .FILENAME: RPI_sub2.s03                      .SYS: 8031
; Assembly routines used for RPI MODULE  rpi_sub2
        lstout-
$include\tru.equ
$include\bios.equ
$include\hs_com.equ
$include\rpi.equ
$include\mcp.mac
        lstout+
;---------------------------- Publics -----------------------------
;

PUBLIC execute_rpi_command, check_rpi_password, send_ack, send_nack, start_rpi_tx ;---------------------------- Externals ---------------------------
;

EXTERN rpi_rx_buf, RPI_b1, RPI_b2, RPI_b3, RPI_buf, nam_nanc
EXTERN rpi_rx_data_length, rpi_rx_src_addr, rpi_tx_buf, rpi_tx_lrc
EXTERN rpi_tx_isr_cnt, CRB_shadow, rpi_rx_lrc, rpi_tx_buf_cnt
EXTERN nvm_rpi_password EXTERN write_bytes_command, update_rpi_report_time
EXTERN copy_memory_function, generate_checksum_function, lcd_disp_num
EXTERN read_rpi_switch, reset_rpi_switch, set_rpi_switch, select_rpi_group
EXTERN stx_fill_buf, lrc_val, test_nvm_function
EXTERN clear_lcd_display_cmd,   VLSI0_mem
        extern rpi_dtone_bounce_cnt,    isr_enq_ev extern prog_ver,    cancel_tmr,    set_tmr
;---------------------------- Code --------------------------------
;
```

```
        RSEG CODE rpi_ROM_password        db      '181609'        ; RPI Undeniable password ;------------------------------------------------------------------
; START_RPI_TX :
; -------------
; Start DUART Channel B transmission. It enables TX and disables RX.
; Called when a message is ready to be sent out on UART channel B.

start_rpi_tx:
        setb    RPI_tx_bit              ; Set RPI Tx bit.
        clr     a
        mov     dptr,#rpi_tx_isr_cnt    ; Get the TX ISR count
        movx    @dptr,a                 ; rpi_tx_isr_cnt = 0 mov     dptr,#CRB_shadow        ; Command Register B shadow
        mov     a,#06h                  ; Enable Tx , Disable Rx
        movx    @dptr,a mov     dptr,#CRB               ; Get the Command Register
        movx    @dptr,a                 ; Enable Tx , Disable Rx
        ret ;------------------------------------------------------------------
; SEND_NACK
;
; This routine will send a Nack to the RPI Host to indicate that the
; requested command could not be performed. Cause indicates the reasone for
; the NACK.
;
; R3 = Nack_cause send_nack:
        mov     a,r3
        mov     r0,a                    ; Save the Nack Cause in R0 mov     dptr,#rpi_tx_buf
        mov     a,#RPI_NACK_code
        movx    @dptr,a                 ; Tx_buf [0] = RPI_NACK_CODE inc     dptr
        mov     a,r0
        movx    @dptr,a                 ; Tx_buf [1] = Nack_cause clr     acc
        mov     dptr,#rpi_tx_lrc
        movx    @dptr,a                 ; Tx_lrc = 0 mov     r5,#RPI_NACK_code
        lcall   lrc_val                 ; LRC of RPI_NACK_code mov     a,r0
        mov     r5,a
        lcall   lrc_val                 ; LRC of Nack_cause mov     dptr,#(rpi_tx_buf+2)
        movx    @dptr,a                 ; Tx_buf [2] = Tx_lrc mov     dptr,#rpi_tx_buf_cnt
        mov     a,#2
        movx    @dptr,a                 ; Rpi_tx_buf_cnt = 2
        call    start_rpi_tx            ; Start the transmission
        ret ;------------------------------------------------------------------
; SEND_ACK
;
; This routine sends an ACK message to the RPI Host along with any return
; Data to be included. RPI_TX_BUF is pre-loaded with the returned data.
;
; R3 = Size of returned data.
;
```

```
send_ack:
        mov     a,r3                    ; Length
        mov     r0,a                    ; Save it in R0 mov     dptr,#rpi_tx_buf
        mov     a,#RPI_ACK_code
        movx    @dptr,a                 ; Tx_buf [0] = RPI_ACK_CODE clr     acc
        mov     dptr,#rpi_tx_lrc
        movx    @dptr,a                 ; Tx_lrc = 0 mov     r5,#RPI_ACK_code
        lcall   lrc_val                 ; LRC of RPI_ACK_code mov     dptr,#(rpi_tx_buf +1)
        mov     a,r0                    ; Any Data bytes included ?
        jz      snd_ack1 snd_ack2:
        movx    a,@dptr                 ; Data byte inc     dptr                    ; Next data byte address
        push    dph                     ; Save it on the stack
        push    dpl mov     dptr,#rpi_tx_lrc
        mov     r5,a
        lcall   lrc_val                 ; LRC of data byte pop     dpl                     ; Restore data byte addesss
        pop     dph
        djnz    r0,snd_ack2 snd_ack1:
        push    dph                     ; Save Tx_buf [1+length] address
        push    dpl mov     dptr,#rpi_rx_lrc
        movx    a,@dptr                 ; Rpi_rx_lrc pop     dpl                     ; Get Tx_buf [1+length] address
        pop     dph
        movx    @dptr,a                 ; Rpi_tx_buf [1+length] = rpi_rx_lrc inc     dptr                    ; Next address
        push    dph                     ; Save Tx_buf [2+length] address
        push    dpl mov     r5,a
        mov     dptr,#rpi_tx_lrc
        lcall   lrc_val                 ; LRC of rpi_rx_lrc pop     dpl
        pop     dph
        movx    @dptr,a                 ; Rpi_tx_buf [2+length] = rpi_tx_lrc mov     a,r3                    ; Acc = Data length
        add     a,#2                    ; Acc = 2 + Data_length
        mov     dptr,#rpi_tx_buf_cnt
        movx    @dptr,a                 ; Rpi_tx_buf_cnt = 2 + Data_length
        call    start_rpi_tx            ; Start transmission
        ret
```

;----------------------------------------------------------------
; READ_BYTES_COMMAND
;
; This routine copys bytes requested from the address indicated in the
; READ_bytes command into an output buffer for transmission back to the
; RPI Host.
;
; 'rpi_rx_data_length' and 'rpi_rx_src_addr' are set by rpi_rx_srvice routine.
;

```
read_bytes_command:
        mov     dptr,#rpi_rx_data_length
        movx    a,@dptr                         ; Data length
        mov     r0,a                            ; Save it in R0 (loop count)
        mov     r3,a                            ; Save it in R3
        jz      rd_bytes1                       ; Length = 0 ----> Not OK clr     c
        subb    a,#(rpi_tx_buf_size - 2)
        jc      rd_bytes2                       ; Length < 126 ---> OK
rd_bytes1:                                      ; Invalid Length requested
        mov     r3,#RPI_invalid_read_bytes_length
        call    send_nack
        ret rd_bytes2:
        mov     dptr,#rpi_rx_src_addr
        movx    a,@dptr
        mov     r4,a                            ; Src address - High byte
        inc     dptr
        movx    a,@dptr
        mov     dpl,a                           ; Src address - Low byte
        mov     dph,r4                          ; Src address - High byte
        movx    a,@dptr                         ; Get data byte inc     dptr                            ; Next data byte address
        mov     r4,dph                          ; Save it in R4 $ R5
        mov     r5,dpl mov     dptr,#(rpi_tx_buf + 1)          ; Tx_buf [1] address rd_bytes3:
        movx    @dptr,a                         ; rpi_tx_buf [] = *rpi_rx_src_addr inc     dptr                            ; Next tx_buf address
        push    dph                             ; Save it on the stack
        push    dpl
        mov     dph,r4                          ; Data byte address
        mov     dpl,r5
        movx    a,@dptr                         ; Data byte inc     dptr                            ; Next data byte address
        mov     r4,dph                          ; Save it in R4 $ R5
        mov     r5,dpl pop     dpl                             ; Get next Tx_buf [] address
        pop     dph djnz    r0, rd_bytes3 call    send_ack                        ; Send ACK ( R3 = length )

ret

;--------------------------------------------------------------------------------
; RPI_PSW_CMP
;
; This routine is called to compare the password present in the RPI LOGIN
; message with the passwords registered in the MCP. It returns 1 if OK or
; 0 if not.
;
; R3 = ROM_NVM indication (This identifies which MCP password, ROM based or
; NVM based, will be compared to the Login password.
;
; Registers useage
; ----------------
; r1    = ROM_NVM_ind
; r2r3  = MCP password addr
; r4r5  = LOGIN password addr rpi_psw_cmp:
        mov     a,r3                            ; Get the ROM_NVM flag mov     p2,#(high rpi_rx_buf)           ; address of login password length
        mov     r1,#low(rpi_rx_buf+1)
```

```
            movx    a,@r1                       ; get password length
            mov     b,a                         ; register b = length
            xrl     a,#06H                      ; must be 6 characters
            jnz     psw_cmp_n_ok                ; .ne. => not okay
            inc     r1                          ;

mov     dptr,#rpi_ROM_password
            mov     a,r3                        ; Get ROM_NVM flag
            xrl     a,#rpi_ROM_password_ind
            jz      psw_cmp0                    ; ROM based password ?
            mov     dptr,#nvm_rpi_password      ; NO - RAM password psw_cmp0:
            mov     a,r3                        ; Get ROM_NVM flag
            xrl     a,#rpi_ROM_password_ind
            jz      psw_rom                     ; ROM password ?
            movx    a,@dptr                     ; NO - NVM password
            sjmp    $+3                         ; Skip the ROM "movc"

psw_rom:
            movc    a,@a+dptr                   ; ROM password mov     r0,a                        ; Save MCP password char in R0
            inc     dptr                        ; Next MCP Password char address
            mov     p2,#(high rpi_rx_buf)       ;
            movx    a,@r1                       ;
            inc     r1                          ; next location
            xrl     a,r0                        ; MCP password = LOGIN password ?
            jnz     psw_cmp_n_ok                ; Do current chars match ?
            djnz    b,psw_cmp0                  ; loop psw_cmp_ok:                                     ; Password matches
            mov     a,#1                        ; Return 1
            ret psw_cmp_n_ok:                                   ; Password does not match
            pop     acc                         ; Length
            mov     a,#0                        ; Return 0
            ret ;----------------------------------------------------------------------
; DISPLAY_MESSAGE_FUNCTION
;
; This routine will display the message contained in RPI_buf with the length
; indicated by RPI_b1 and starting cursor position indicated by RPI_b2.
;

display_message_function:
            mov     dptr,#RPI_b1
            movx    a,@dptr                     ; Get Message Length
            mov     r2,a                        ; Save it in R2
            jz      disp_mes1                   ; Length = 0 ---> Not OK clr     c
            subb    a,#31
            jc      disp_mes2                   ; Length < 31 ----> OK disp_mes1:                                      ; Invalid Message Length
            mov     r3,#RPI_invalid_message_length
            call    send_nack
            ret disp_mes2:
            mov     dptr,#RPI_b2
            movx    a,@dptr                     ; Get Starting Position
            mov     r3,a                        ; Save it in R3
            clr     c
            subb    a,#31
            jc      disp_mes3                   ; B2 < 31 ------> OK mov     r3,#RPI_invalid_starting_position
            call    send_nack
            ret
```

```
disp_mes3:
        mov     a,r2                            ; Starting position
        add     a,r3                            ; Acc = Starting Position + Length
        clr     c
        subb    a,#31
        jc      disp_mes4                       ; Ending position < 31 --> OK ; Invalid Ending Position
        mov     r3,#RPI_invalid_ending_position
        call    send_nack
        ret disp_mes4:
        mov     dptr,#RPI_buf
        mov     r4,dph
        mov     r5,dpl
        lcall   lcd_disp_num                    ; Display the message
        mov     r3,#0
        call    send_ack
        ret ;------------------------------------------------------------------------
; READ_SWITCH_FUNCTION
;
; This routine will read the value of the RPI switch indicated by RPI_b1
; register from NAM number indicated by RPI_b2 . The switch reading will be
; stored in RPI_b3 register.
;
read_switch_function:
        mov     dptr,#nam_nanc
        movx    a,@dptr                         ; Number of additional NAMs
        mov     r0,a                            ; Save it in R0 mov     dptr,#RPI_b2
        movx    a,@dptr                         ; NAM number
        clr     c
        subb    a,r0
        jz      read_sw1                        ; B2 = nanc ---> OK
        jc      read_sw1                        ; B2 < nanc ---> OK ; Invalid NAM number
        mov     r3,#RPI_invalid_NAM_number      ; B2 > nanc ---> Not OK
        call    send_nack
        ret read_sw1:
        mov     dptr,#RPI_b1
        movx    a,@dptr                         ; Switch number
        clr     c
        subb    a,#32
        jc      read_sw2                        ; B2 < 32 ---> OK ; Invalid Switch Number
        mov     r3,#RPI_invalid_switch_number
        call    send_nack
        ret read_sw2:
        lcall   read_rpi_switch                 ; read the Switch
        mov     dptr,#RPI_b3                    ; Acc = result
        movx    @dptr,a                         ; Store it in RPI_b3 mov     r3,#0
        call    send_ack                        ; Send ACK
        ret ;------------------------------------------------------------------------
; RESET_SWITCH_FUNCTION
;
; This routine will reset the RPI switch indicated by the RPI_b1 register.
; The NAM number is indicated by RPI_b2 register.
;
reset_switch_function:
        mov     dptr,#nam_nanc
        movx    a,@dptr                         ; Number of additional NAMs
        mov     r0,a                            ; Save it in R0
```

```
                mov     dptr,#RPI_b2
                movx    a,@dptr                         ; NAM number
                clr     c
                subb    a,r0
                jz      reset_sw1                       ; B2 = nanc ---> OK
                jc      reset_sw1                       ; B2 < nanc ---> OK ; Invalid NAM number
                mov     r3,#RPI_invalid_NAM_number      ; B2 > nanc ---> Not OK
                call    send_nack
                ret reset_sw1:
                mov     dptr,#RPI_b1
                movx    a,@dptr                         ; Switch number
                clr     c
                subb    a,#32
                jc      reset_sw2                       ; B2 < 32 ---> OK ; Invalid Switch Number
                mov     r3,#RPI_invalid_switch_number
                call    send_nack
                ret reset_sw2:
                lcall   reset_rpi_switch                ; reset the Switch
                mov     r3,#0
                call    send_ack
                ret ;--------------------------------------------------------------------------------
; SET_SWITCH_FUNCTION
;
; This routine will set the RPI switch indicated by RPI_b1 register into the
; NAM indicated by RPI_b2 register.
;
;

set_switch_function:
                mov     dptr,#nam_nanc
                movx    a,@dptr                         ; Number of additional NAMs
                mov     r0,a                            ; Save it in R0 mov     dptr,#RPI_b2
                movx    a,@dptr                         ; NAM number
                clr     c
                subb    a,r0
                jz      set_sw1                         ; B2 = nanc ---> OK
                jc      set_sw1                         ; B2 < nanc ---> OK
                                                        ; Invalid NAM number
                mov     r3,#RPI_invalid_NAM_number      ; B2 > nanc ---> Not OK
                call    send_nack
                ret set_sw1:
                mov     dptr,#RPI_b1
                movx    a,@dptr                         ; Switch number
                clr     c
                subb    a,#32
                jc      set_sw2                         ; B2 < 32 ---> OK ; Invalid Switch Number
                mov     r3,#RPI_invalid_switch_number
                call    send_nack
                ret set_sw2:
                lcall   set_rpi_switch                  ; Set the Switch
                mov     r3,#0
                call    send_ack
                ret
```

```
;-------------------------------------------------------------------
; SELECT_FEATURE_GROUP_FUNCTION
;
; This routine will select and make available the RPI feature group indicated
; by RPI_b1 register. RPI_b2 indicates the NAM number (0 - 7).
;
select_feature_group_function:
        mov     dptr,#nam_nanc
        movx    a,@dptr                         ; Number of additional NAMs
        mov     r0,a                            ; Save it in R0 mov     dptr,#RPI_b2
        movx    a,@dptr                         ; NAM number
        clr     c
        subb    a,r0
        jz      sel_feat1                       ; B2 = nanc ---> OK
        jc      sel_feat1                       ; B2 < nanc ---> OK ; Invalid NAM number
        mov     r3,#RPI_invalid_NAM_number      ; B2 > nanc ---> Not OK
        call    send_nack
        ret sel_feat1:
        mov     dptr,#RPI_b1
        movx    a,@dptr                         ; Feature Group Number
        clr     c
        subb    a,#8
        jc      sel_feat2                       ; B2 < 8 ---> OK ; Invalid Group Number
        mov     r3,#RPI_invalid_feature_group_number
        call    send_nack
        ret sel_feat2:
        lcall   select_rpi_group
        mov     r3,#0
        call    send_ack
        ret ;-------------------------------------------------------------------
; EXECUTE_FUNCTION_COMMAND
;
; This routine decodes the function byte of an EXECUTE_FUNC command and calls
; the appropriate routine to perform the function.
;
;
execute_function_command:
        mov     dptr,#(rpi_rx_buf+1)
        movx    a,@dptr                         ; Get Function code cjne    a,#RPI_copy_memory_func_code,ex_func1
        lcall   copy_memory_function            ; 01h - Copy
        ret ex_func1:
        cjne    a,#RPI_generate_checksum_func_code,ex_func2
        lcall   generate_checksum_function      ; 02h - Checksum
        ret ex_func2:
        cjne    a,#RPI_test_ram_func_code,ex_func3
;       lcall   test_ram_function               ; 03h - Test_ram
        mov     r3,#RPI_function_not_available
        call    send_nack
        ret ex_func3:
        cjne    a,#RPI_test_rom_func_code,ex_func4
;       lcall   test_rom_function               ; 04h - Test_rom
        mov     r3,#RPI_function_not_available
        call    send_nack
        ret
```

```
ex_func4:
        cjne    a,#RPI_test_nvm_func_code,ex_func5
        lcall   test_nvm_function                       ; 05h - Test_eeprom
        ret ex_func5:
        cjne    a,#RPI_master_reset_func_code,ex_func6
;       lcall   master_reset_function                   ; 06h - Master_reset
        mov     r3,#RPI_function_not_available
        call    send_nack
        ret ex_func6:
        cjne    a,#RPI_master_clear_func_code,ex_func7
;       lcall   master_clear_function                   ; 07h - Master_clear
        mov     r3,#RPI_function_not_available
        call    send_nack
        ret ex_func7:
        cjne    a,#RPI_clear_display_func_code,ex_func8
        call    clear_lcd_display_cmd                   ; 08h - Clear Display
        mov     r3,#0
        call    send_ack
        ret ex_func8:
        cjne    a,#RPI_display_message_func_code,ex_func9
        call    display_message_function                ; 09h - Display_message
        ret ex_func9:
        cjne    a,#RPI_select_feature_group_func_code,ex_func10
        call    select_feature_group_function           ; 0Ah - Select_group
        ret ex_func10:
        cjne    a,#RPI_read_switch_func_code,ex_func11
        call    read_switch_function                    ; 0Bh - Read_switch
        ret ex_func11:
        cjne    a,#RPI_set_switch_func_code,ex_func12
        call    set_switch_function                     ; 0Ch - Set_switch
        ret ex_func12:
        cjne    a,#RPI_reset_switch_func_code,ex_func13
        call    reset_switch_function                   ; 0Dh - Reset_switch
        ret ex_func13:
        mov     r3,#RPI_illegal_function_code
        call    send_nack                               ; illegal code
        ret ;----------------------------------------------------------------
; EXECUTE_RPI_COMMAND
;
;   This routine is called from the User Features software when a valid
;   RPI command has been received from the Host.
;

execute_rpi_command:
        mov     dptr,#rpi_rx_buf
        movx    a,@dptr                 ; Command code ex_command_ok:
        cjne    a,#RPI_LOGIN_command_code,ex_cmnd_1
        call    check_rpi_password
        ret ex_cmnd_1:
        cjne    a,#RPI_READ_bytes_command_code, ex_cmnd_2
        call    read_bytes_command                      ; READ_bytes
        ret
```

```
ex_cmnd_2:
        cjne    a, #RPI_WRITE_bytes_command_code, ex_cmnd_3
        lcall   write_bytes_command             ; WRITE_bytes
        ret ex_cmnd_3:
        cjne    a, #RPI_EXECUTE_func_command_code, ex_cmnd_4
        call    execute_function_command        ; EXECUTE_function
        ret ex_cmnd_4:
        cjne    a, #RPI_END_session_command_code, ex_cmnd_5
;----------------------------------------
;       terminate call
;----------------------------------------
        mov     dptr,#RPI_b1            ;
        clr     a
        movx    @dptr,a                 ; clear variable
        mov     dptr,#rpi_dtone_bounce_cnt
        movx    @dptr,a                 ; clear variable
        mov     dptr,#VLSI0_mem         ; turn modem off
        movx    a,@dptr
        setb    acc.(MODEM_OFF - 32)    ;
        movx    @dptr,a                 ;
        mov     dptr,#VLSI0
        movx    @dptr,a                 ;
        mov     r3,#UF_TASK             ; end call
        mov     r4,#UF_RPI_LOGIN_TOUT   ;
        mov     r5,#02h                 ; subcode
        call    isr_enq_ev              ; queue event
        ret ex_cmnd_5:
        mov     r3,#RPI_illegal_command_code
        call    send_nack                       ; Illegal command
        ret ;----------------------------------------------------------------
; CHECK_RPI_PASSWORD
;
;   This routine is called from the User Features software when a Login
;   Message is received from the Host. It calls an assembly routine to compare
;   the Login password with the MCP passwords
;
;   Note: There are two passwords, One is called the 'Undeniable password'.
;         This password is ROM based and therefore is not changable by RPI.
;         The second password is NVM based and therefore is changable.
;

check_rpi_password:
        mov     r3,#rpi_ROM_password_ind        ; Compare with ROM password
        call    rpi_psw_cmp                     ; Acc = result
        jnz     ck_rpi_psw_ok mov     r3,#rpi_NVM_password_ind        ; Compare with NVM password
        call    rpi_psw_cmp                     ; Acc = result
        jnz     ck_rpi_psw_ok mov     r3,#RPI_invalid_password        ; Invalid password
        call    send_nack
        ret ck_rpi_psw_ok:                                  ; Valid password
        clr     RPI_password_bit
        lcall   update_rpi_report_time          ; Update RPI report time
        %mac_cancel_tmr D_RPI_THR0              ; cancel login timer
        %mac_set_tmr    D_RPI_THR0, RPI_NO_ACTIVITY ; activate activity timer
        clr     a                               ; Get the MCP Version Number
        mov     dptr,#prog_ver                  ; Program version Number in ROM
        movc    a,@a+ dptr
        mov     dptr,#(rpi_tx_buf + 1)
        movx    @dptr,a                         ; Store it in rpi_tx_buf [1]
```

```
        mov     r3,#1                    ; R3 = length
        lcall   send_ack                 ; Send ACK with the version # ret

END     ; rpi_sub2.s03
```

```
;--------------------------------------------------------------------:
; Eng: Rony Ophir                                Rev. Date : 6-19-89 :
;--------------------------------------------------------------------:
;           << Gold Star Products  Co., Ltd. >>                      :
;                   170 Mount Airy Road                              :
;                   Basking Ridge, NJ 07920                          :
;                      (201) 953-9001                                :
;                                                                    :
;       Copyright (C) 1989 Gold Star Products Co., Ltd               :
;--------------------------------------------------------------------:
; .FILENAME: RPI_sub3.s03                         .SYS: 8031
; Assembly routines used for RPI MODULE  rpi_sub3
        lstout-
$include\tru.equ
$include\rpi.equ
$include\mcp.mac
        lstout+

;------------------------------ Publics ------------------------------
PUBLIC write_bytes_command, copy_memory_function, generate_checksum_function
PUBLIC test_nvm_mem_loc, test_nvm_function ;------------------------------ Externals ----------------------------

EXTERN rpi_rx_data_length, rpi_rx_dst_addr, RPI_w1, RPI_w2, RPI_w3, RPI_b1

EXTERN rpi_ram_range_ck, rpi_ee_range_ck, send_nack, rpi_wr_ee_byte, send_ack
EXTERN isr_enq_ev, nvm_wr EXTERN rpi_nvm_wr_count, rpi_rx_src_addr, rpi_loop_cnt,  rpi_ram_wr_count ;------------------------------ Code ---------------------------------
;
        RSEG CODE ;---------------------------------------------------------------------
; UPDATE_SRC_AND_DEST:
; ------------------
;
; This routine is called by WRITE_bytes_command.
;
; It returns:
; R5     = *rpi_rx_dst_addr
; R2 $ R3 = rpi_rx_dst_addr
;
; It sets:
; o    rpi_rx_src_addr++
; o    rpi_rx_dst_addr++
;

update_src_and_dest:
        mov     dptr,#rpi_rx_src_addr
        movx    a,@dptr                  ; High addr byte
        mov     r0,a
        inc     dptr
        movx    a,@dptr                  ; Low addr byte
        mov     dpl,a
        mov     a,r0
        mov     dph,a
        movx    a,@dptr
        mov     r5,a                     ; R5 = *rpi_rx_src_addr inc     dptr
        mov     r2,dph
        mov     r3,dpl
```

```
            mov     dptr,#rpi_rx_src_addr
            mov     a,r2
            movx    @dptr,a
            inc     dptr
            mov     a,r3
            movx    @dptr,a                 ; Rpi_rx_src_addr++
            mov     dptr,#rpi_rx_dst_addr
            movx    a,@dptr
            mov     r0,a
            inc     dptr
            movx    a,@dptr
            mov     dpl,a
            mov     a,r0
            mov     dph,a                   ; Dptr = rpi_rx_dst_addr push    dph
            push    dpl
            inc     dptr
            mov     r2,dph
            mov     r3,dpl
            mov     dptr,#rpi_rx_dst_addr
            mov     a,r2
            movx    @dptr,a
            inc     dptr
            mov     a,r3
            movx    @dptr,a                 ; Rpi_rx_dst_addr++ pop     _R+3                    ; r2r3 = rpi_dst_addr
            pop     _R+2
            ret ;------------------------------------------------------------------------
; UPDATE_w1_and_w2:
; ---------------
; This routine is called by COPY_bytes_function.
;
; It returns:
; R5      = *RPI_w1
; R2 $ R3 = RPI_w2
;
; It sets:
; o    RPI_w1++
; o    RPI_w2++
;
update_w1_and_w2:
            mov     dptr,#RPI_w1
            movx    a,@dptr                 ; High addr byte
            mov     r0,a
            inc     dptr
            movx    a,@dptr                 ; Low addr byte
            mov     dpl,a
            mov     a,r0
            mov     dph,a
            movx    a,@dptr                 ; *RPI_w1
            mov     r5,a inc     dptr
            mov     r2,dph
            mov     r3,dpl
            mov     dptr,#RPI_w1
            mov     a,r2
            movx    @dptr,a
            inc     dptr
            mov     a,r3
            movx    @dptr,a                 ; RPI_w1++ mov     dptr,#RPI_w2
            movx    a,@dptr
            mov     r0,a
            inc     dptr
            movx    a,@dptr
            mov     dpl,a
            mov     a,r0
            mov     dph,a                   ; Dptr = RPI_w2
```

```
        push    dph
        push    dpl
        inc     dptr
        mov     r2,dph
        mov     r3,dpl
        mov     dptr,#RPI_w2
        mov     a,r2
        movx    @dptr,a
        inc     dptr
        mov     a,r3
        movx    @dptr,a                         ; RPI_w2++ pop     _R+3
        pop     _R+2                            ; r2r3 = RPI_w2
        ret ;-----------------------------------------------------------------------
;   WRITE_BYTES_COMMAND
;
;   This routine will copy the data bytes received in a WRITE_bytes command to
;   the destination address pointed by rpi_rx_dst_addr.
;

write_bytes_command:
        mov     dptr,#rpi_rx_dst_addr           ; destination address
        movx    a,@dptr
        mov     r2,a                            ; High Address byte
        inc     dptr
        movx    a,@dptr
        mov     r3,a                            ; Low address byte push    _R+2                            ; Save r2r3 on the stack
        push    _R+3
        lcall   rpi_ee_range_ck
        pop     _R+3                            ; Get rpi_rx_dst_address
        pop     _R+2
        jz      wr_bytes_1                      ; Is address in EE memory ?

mov     dptr,#rpi_rx_data_length        ; YES - check top address
        movx    a,@dptr                         ; Rpi_rx_data_length
        dec     a
        add     a,r3
        mov     r3,a
        jnc     $+3
        inc     r2                              ; R2 $ R3 = rpi_rx_dst_addr + rpi_rx_data_length - 1 lcall   rpi_ee_range_ck
        jz      wr_bytes_1                      ; Is Address in EE memory ?

;
; Write bytes to EE memory
;
        clr     a                               ; YES
        mov     dptr,#rpi_nvm_wr_count
        movx    @dptr,a                         ; Rpi_nvm_wr_count = 0 wr_bytes_00:
        lcall   update_src_and_dest             ; r2r3 = dest addr r5 = *src_addr
        lcall   rpi_wr_ee_byte                  ; write to EE memory mov     dptr,#rpi_rx_data_length
        movx    a,@dptr
        dec     a
        movx    @dptr,a                         ; rpi_rx_data_length--
        jnz     wr_bytes_01                     ; More bytes to write ?
;
; All bytes written to NVM - send ACK
;
        ljmp    send_ack_2_host                 ; NO - send ACK wr_bytes_01:                                    ; YES - there are more bytes
        mov     dptr,#rpi_nvm_wr_count
        movx    a,@dptr
        cjne    a,#rpi_max_nvm_wrs,wr_bytes_00  ; Max NVM bytes per cycle ?
                                                ; YES
```

```
;
; Max allowed bytes per cycle written to NVM - send an event to myself
; in order to write more bytes later
;
        ljmp    send_event_2_me wr_bytes_1:

;
; Is destination addr is in RAM ?
;
        mov     dptr,#rpi_rx_dst_addr
        movx    a,@dptr
        mov     r2,a                            ; High Address byte
        inc     dptr
        movx    a,@dptr
        mov     r3,a                            ; Low address byte push    _R+2                            ; Save r2r3 on the stack
        push    _R+3
        lcall   rpi_ram_range_ck
        pop     _R+3                            ; Get rpi_rx_dst_address
        pop     _R+2
        jz      wr_bytes_2                      ; Is Address in RAM memory ?

mov     dptr,#rpi_rx_data_length        ; YES - check top address
        movx    a,@dptr                         ; Rpi_rx_data_length
        dec     a
        add     a,r3
        mov     r3,a
        jnc     $+3
        inc     r2                              ; R2 $ R3 = rpi_rx_dst_addr + rpi_rx_data_length - 1 lcall   rpi_ram_range_ck
        jz      wr_bytes_2                      ; IS Address in RAM memory ?
                                                ; YES
;
; Write bytes to RAM memory
;

wr_bytes_11:
        lcall   update_src_and_dest             ; r2r3 = dest_addr ; r5 = *src_addr
        mov     dph,r2
        mov     dpl,r3
        mov     a,r5
        movx    @dptr,a                         ; Rpi_rx_dst_addr = *rpi_rx_src_addr mov     dptr,#rpi_rx_data_length
        movx    a,@dptr
        dec     a
        movx    @dptr,a                         ; Rpi_rx_data_length--
        jnz     wr_bytes_11                     ; More bytes to write ?
                                                ; NO
;
; All bytes written to RAM - send ACK
;
        ljmp    send_ack_2_host                 ; Send ACK ;
; Destination address is not in EE or RAM memory
;
wr_bytes_2:                                     ; Invalid destination addr
        mov     r3,#RPI_invalid_address
        lcall   send_nack
        ret ;-------------------------------------------------------------------------
; COPY_MEMORY_FUNCTION:
; --------------------
;
;
; This routine will copy the data bytes pointed to by RPI_w1 register to
; the destination address pointed to by RPI_w2 register.
;
```

```
copy_memory_function:
        mov     dptr,#RPI_w2
        movx    a,@dptr
        mov     r2,a                    ; High Address byte
        inc     dptr
        movx    a,@dptr
        mov     r3,a                    ; Low address byte push    _R+2                    ; Save r2r3 on the stack
        push    _R+3
        lcall   rpi_ee_range_ck
        pop     _R+3                    ; Get RPI_w2
        pop     _R+2
        jz      cp_bytes_1              ; Is address in EE memory ?
                                        ; YES - check top address
        mov     dptr,#RPI_w3
        movx    a,@dptr
        mov     r0,a                    ; RPI_w3 High byte
        inc     dptr
        movx    a,@dptr
        add     a,r3                    ; RPI_w3 Low byte
        jnc     $+3
        inc     r2 clr     c
        subb    a,#1
        mov     r3,a
        jnc     $+3
        dec     r2 mov     a,r2
        add     a,r0
        mov     r2,a                    ; r2r3 = RPI_w2 + RPI_w3 - 1 lcall   rpi_ee_range_ck
        jz      cp_bytes_1              ; Address is in EE memory ?
        ljmp    cp_bytes_2_EE           ; YES - copy bytes to EE memory
cp_bytes_1:                             ; NO - Is it in RAM ?

;
; Check if address is in RAM ?
;
        mov     dptr,#RPI_w2
        movx    a,@dptr
        mov     r2,a                    ; High Address byte
        inc     dptr
        movx    a,@dptr
        mov     r3,a                    ; Low address byte push    _R+2                    ; Save r2r3 on the stack
        push    _R+3
        lcall   rpi_ram_range_ck
        pop     _R+3                    ; Get RPI_w2
        pop     _R+2
        jz      cp_bytes_2              ; Is address in RAM memory ?
        mov     dptr,#RPI_w3            ; YES - check top address
        movx    a,@dptr
        mov     r0,a                    ; RPI_w3 High byte
        inc     dptr
        movx    a,@dptr
        add     a,r3                    ; RPI_w3 Low byte
        jnc     $+3
        inc     r2 clr     c
        subb    a,#1
        mov     r3,a
        jnc     $+3
        dec     r2 mov     a,r2
        add     a,r0
        mov     r2,a                    ; r2r3 = RPI_w2 + RPI_w3 - 1
```

```
            lcall   rpi_ram_range_ck
            jnz     cp_bytes_2_RAM          ; Is Address in RAM memory ?
                                            ; NO cp_bytes_2:                                 ; Invalid address
;
; Destination address is not in EE or RAM memory
;
            mov     r3,#RPI_invalid_address
            lcall   send_nack               ; Send NACK
            ret cp_bytes_2_RAM:
;
; Copy bytes to RAM memory
;
            clr     a
            mov     dptr,#rpi_ram_wr_count
            movx    @dptr,a                 ; Rpi_ram_wr_count = 0
cp_bytes_10:
            lcall   update_w1_and_w2        ; r2r3 = RPI_W2 ; r5 = *RPI_W1
            mov     dph,r2
            mov     dpl,r3
            mov     a,r5
            movx    @dptr,a                 ; RPI_W2 = *RPI_W1 mov     dptr,#RPI_W3
            movx    a,@dptr                 ; RPI_W3 High byte
            mov     r0,a
            inc     dptr
            movx    a,@dptr                 ; RPI_W3 Low byte
            clr     c
            subb    a,#1
            movx    @dptr,a
            mov     r1,a                    ; Low byte
            jnc     $+3
            dec     r0                      ; High byte mov     dptr,#RPI_W3
            mov     a,r0
            movx    @dptr,a                 ; RPI_W3-- jnz     cp_bytes_11
            mov     a,r1
            jnz     cp_bytes_11             ; All bytes were copied ?
                                            ; YES
;
; All bytes copied to RAM - send ACK
;
            ljmp    send_ack_2_host         ; Send ACK cp_bytes_11:                                ; There are more bytes to copy
            mov     dptr,#rpi_ram_wr_count
            movx    a,@dptr                 ; rpi_ram_wr_count
            inc     a
            movx    @dptr,a                 ; Rpi_ram_wr_count++
            cjne    a,#rpi_max_ram_wrs,cp_bytes_10  ; Max RAM bytes per cycle ?
;
; Max allowed bytes per cycle copied to RAM - send an event to myself
; in order to copy more bytes.
;
            ljmp    send_event_2_me cp_bytes_2_EE:
```

```
;
; Copy bytes to EE memory
;
        clr     a
        mov     dptr,#rpi_loop_cnt
        movx    @dptr,a                 ; rpi_loop_cnt = 0
        mov     dptr,#rpi_nvm_wr_count
        movx    @dptr,a                 ; Rpi_nvm_wr_count = 0
cp_bytes_00:
        lcall   update_w1_and_w2        ; r2r3 = RPI_w2 ; r5 = *RPI_w1
        lcall   rpi_wr_ee_byte          ; Write to EE memory mov     dptr,#RPI_w3
        movx    a,@dptr                 ; RPI_w3 High byte
        mov     r0,a
        inc     dptr
        movx    a,@dptr                 ; RPI_w3 Low byte clr     c
        subb    a,#1
        movx    @dptr,a                 ; Low byte
        mov     r1,a
        jnc     $+3
        dec     r0                      ; High byte mov     dptr,#RPI_w3
        mov     a,r0
        movx    @dptr,a                 ; RPI_w3-- jnz     cp_bytes_01
        mov     a,r1
        jnz     cp_bytes_01             ; More bytes to copy ?
                                        ; NO
;
; All bytes copied to NVM - send ACK
;
        ljmp    send_ack_2_host         ; Send ACK cp_bytes_01:                            ; There are more bytes to copy
        mov     dptr,#rpi_loop_cnt
        movx    a,@dptr                 ; rpi_loop_cnt
        inc     a
        movx    @dptr,a                 ; rpi_loop_cnt++
        cjne    a,#rpi_max_ee_loop_cnt,cp_bytes_02 ; Max bytes per loop ?
                                        ; YES
;
; Max allowed bytes per loop were processed - send an event to myself
; in order to copy more bytes.
;
        ljmp    send_event_2_me cp_bytes_02:
        mov     dptr,#rpi_nvm_wr_count
        movx    a,@dptr
        cjne    a,#rpi_max_nvm_wrs,cp_bytes_00 ; Max bytes copied to EE per cycle ?
                                        ; YES
;
; Max allowed bytes per cycle copied to NVM - send an event to myself
; in order to copy more bytes.
;
        ljmp    send_event_2_me ;----------------------------------------------------------------
; GENERATE_CHECKSUM_FUNCTION
; ------------------------
;
;  This routine will generate a checksum for the data range which statrs
;  at the address pointed to by RPI_w1. RPI_w2 registers contains the length
;  of the data range. RPI_b1 is should be set to 0 by the Host.
;  The result is stored in the RPI_b1 register.
;
```

```
generate_checksum_function:
        clr     a
        mov     dptr,#rpi_loop_cnt
        movx    @dptr,a                 ; Rpi_loop_cnt = 0 gn_checksum_0:
        mov     dptr,#RPI_w1
        movx    a,@dptr                 ; High addr byte
        mov     r0,a
        inc     dptr
        movx    a,@dptr                 ; Low addr byte
        mov     dpl,a
        mov     a,r0
        mov     dph,a
        movx    a,@dptr                 ; *RPI_w1
        mov     r5,a inc     dptr
        mov     r2,dph
        mov     r3,dpl
        mov     dptr,#RPI_w1
        mov     a,r2
        movx    @dptr,a
        inc     dptr
        mov     a,r3
        movx    @dptr,a                 ; RPI_w1++
        mov     dptr,#RPI_b1
        movx    a,@dptr                 ; RPI_b1
        add     a,r5
        movx    @dptr,a                 ; RPI_b1 += *RPI_w1 mov     dptr,#RPI_w2
        movx    a,@dptr                 ; RPI_w2 High byte
        mov     r0,a
        inc     dptr
        movx    a,@dptr                 ; RPI_w2 Low byte clr     c
        subb    a,#1
        movx    @dptr,a                 ; Low byte
        mov     r1,a
        jnc     $+3
        dec     r0                      ; High byte mov     dptr,#RPI_w2
        mov     a,r0
        movx    @dptr,a                 ; RPI_w2-- jnz     send_event_2_me
        mov     a,r1
        jnz     send_event_2_me         ; More bytes ?
                                        ; NO - send ACK
send_ack_2_host:
;
; All bytes done - send ACK
;
        mov     r3,#0
        lcall   send_ack                ; send ACK
        ret send_event_2_me:
;
; Max allowed bytes were processed - send an event to myself
; in order to process more bytes.
;
        %send_event UF_TASK, UF_RPI_MSG_IN, NO_SUBCODE
        ret ;----------------------------------------------------------------
; TEST_NVM_MEM_LOC
; ----------------
;
; This routine tests the NVM location pointed by DPTR. It returns 1 if OK, or
; 0 if not OK. The test is done as follows:
;
```

```
; - Read NVM location and save it
; - Complement it
; - Write it to NVM
; - Read it back from NVM
; - Complement it
; - Write it to NVM
; - Read it back from NVM
; - Compare current NVM value against original NVM value
; - If match --> OK  ; Otherwise -----> Failure
;

test_nvm_mem_loc:
        movx    a,@dptr                 ; Read NVM location
        push    acc                     ; Save it on the STACk cpl     a                       ; Complement it
        mov     r5,a
        mov     r2,dph
        mov     r3,dpl push    _R+2
        push    _R+3
        lcall   nvm_wr                  ; Write it to NVM
        pop     dpl
        pop     dph movx    a,@dptr                 ; Read it
        cpl     a                       ; Complement it
        mov     r5,a
        mov     r2,dph
        mov     r3,dpl push    _R+2
        push    _R+3
        lcall   nvm_wr                  ; Write it to NVM
        pop     dpl
        pop     dph movx    a,@dptr                 ; Read it
        pop     _R+0                    ; Get the original value xrl     a,r0
        jnz     test_nvm_0              ; Equal to current value ?

mov     a,#1                    ; YES - OK
        ret test_nvm_0:                             ; NO - Failure
        mov     a,#0
        ret ;------------------------------------------------------------------
; TEST_NVM_FUNCTION
; --------------------
;
; This routine will test the entire NVM. It calls test_nvm_mem_loc which
; tests individual NVM location. If failure is detected RPI_b1 is set to 0
; and RPI_w1 indicates the NVM location. Otherwise RPI_b1 is set to 0FFh.
;
; It is assumed that initially RPI_w1 is set to 0 by the HOST (before executing
; this function).
;

test_nvm_function:

mov     a,#0FFh
        mov     dptr,#RPI_b1
        movx    @dptr,a                 ; RPI_b1 = TRUE mov     dptr,#RPI_w1
        movx    a,@dptr                 ; High offset byte
        mov     r0,a                    ; Save it
        inc     dptr
        movx    a,@dptr                 ; Low offset byte
```

```
            mov     dpl,a
            mov     a,#0A0h
            add     a,r0
            mov     dph,a                           ; DPTR = NVM address mov     r0,#rpi_max_ee_loop_cnt         ; R0 = Loop count test_nvm_loop:
            push    dph                             ; NVM address (high addr byte)
            push    dpl                             ; NVM address (low byte)
            push    _R+0                            ; Loop count
            call    test_nvm_mem_loc                ; Test NVM location, result returned in ACC
            pop     _R+0                            ; Get Loop count
            pop     _R+3                            ; NVM address (low addr byte)
            pop     _R+2                            ; NVM address (High addr byte)

jz      test_nvm_02                     ; NVM Failure ?

mov     dptr,#(RPI_w1+ 1)               ; NO -
            movx    a,@dptr
            add     a,#1
            movx    @dptr,a                         ; RPI_w1 += 1 (low byte)
            jnc     test_nvm_00 mov     dptr,#RPI_w1
            movx    a,@dptr
            inc     a
            movx    @dptr,a                         ; RPI_w1 += 1 (high byte)

;
; All NVM bytes tested ?
;

test_nvm_00:
            mov     dptr,#RPI_w1
            movx    a,@dptr cjne    a,#high (EEPROM_SIZE), test_nvm_01
            inc     dptr
            movx    a,@dptr
            cjne    a,#low (EEPROM_SIZE), test_nvm_01

;
; All NVM bytes have been tested OK
;
            ljmp    send_ack_2_host test_nvm_01:
            mov     dph,r2
            mov     dpl,r3
            djnz    r0,test_nvm_loop                ; Max EE loop reached ?
;
; Max number of bytes have been processed
; Send an event to myself in order to process additional bytes
;
            ljmp    send_event_2_me                 ; YES test_nvm_02:                                        ; NVM Failure
            mov     dptr,#RPI_b1
            mov     a,#0
            movx    @dptr,a                         ; RPI_b1 = FALSE
            ljmp    send_ack_2_host                 ; Send ACK END     ; rpi_sub.s03
```

```
;-------------------------------------------------------------------;
; Eng: Rony Ophir                    Rev. Date : 5-24-89            :
;-------------------------------------------------------------------;
;           << Gold Star Products  Co., Ltd. >>                     :
;                  170 Mount Airy Road                              :
;                  Basking Ridge, NJ 07920                          :
;                    (201)  953-9001                                :
;                                                                   :
;         Copyright (C) 1989 Gold Star Products Co., Ltd            :
;-------------------------------------------------------------------;
; .FILENAME: RPI_isr.s03                        .SYS: 8031
; Interrupt service routines used for RPI MODULE   rpi_isr
           lstout-
$include\tru.equ
$include\bios.equ
$include\rpi.equ
        lstout+
;-------------------------- Publics --------------------------------
;
PUBLIC duart_B_isr, lrc_val ;-------------------------- Externals ------------------------------
;
EXTERN error_handler, nvm_wr
EXTERN isr_enq_ev, stx_fill_buf, sbint_exit, misc_out EXTERN rpi_rx_state, rpi_rx_data_length, rpi_rx_data_len, rpi_rx_lrc
EXTERN rpi_rx_src_addr, rpi_rx_dst_addr, CRB_shadow
EXTERN rpi_tx_isr_cnt,  rpi_tx_buf_cnt
EXTERN rpi_tx_buf, rpi_rx_buf_cnt, rpi_rx_buf, RPI_w1, RPI_w2, RPI_w3
EXTERN RPI_b1, RPI_b2, rpi_nack_cause EXTERN RPI_rx_MB_cnt, RPI_rx_EOR_cnt ;-------------------------- Code -----------------------------------
;
        RSEG CODE ;-------------------------------------------------------------------
; LRC_VAL :
; ---------
; Calculates the LRC value as each character is processed, either on receipt
; or transmission.
;
; Calling sequence: DPTR = Holding LRC byte pointer, R5 = char.
;
lrc_val:
        movx    a,@dptr             ; Get current LRC value.
        add     a,r5                ; Add new char (ignore carry).
        rl      a                   ; Rotate acc one bit left.
        movx    @dptr,a             ; Store new LRC value.
        ret ;-------------------------------------------------------------------
; DUART_B_ISR:
; ------------
; This routine is called to process interrupts on DUART channel B
; The Interrupt sources are: Rx, Tx, Break change .
;
duart_B_isr:
        mov     dptr,#SRB           ; Get the Status Register
        movx    a,@dptr
        jb      acc.0,rpi_rx_isr    ; RPI Rx interrupt
        jb      acc.2,rpi_tx_isr    ; RPI Tx interrupt mov     dptr,#ISR           ; Get the Interrupt Service Register
        movx    a,@dptr
        jb      acc.6,break_end     ; End of Break interrupt ljmp    sbint_exit          ; Nothing? Just exit .
```

```
;---------------------------------------------------------------------
; RPI_TX_ISR:
; -----------
; This routine transmits bytes from the RPI_TX_BUF. Transmission is disabled
; when the last byte is sent out. RPI_TX_ISR_CNT is set to 0 at the start of
; transmission (by RPI_START_TX_ROUTINE).
;
rpi_tx_isr:
        mov     dptr,#rpi_tx_isr_cnt    ; Tx ISR buffer count.
        movx    a,@dptr
        inc     a                       ; New Tx ISR buffer count.
        movx    @dptr,a                 ; Save new Tx count.
        dec     a                       ; Current Tx count.
        mov     r0,a                    ; Save current TX count in R0 mov     dptr,#rpi_tx_buf        ; Get the rpi_tx_buf address.
        add     a,dpl                   ; Current addr of byte to be sent out
        mov     dpl,a                   ; Store new dpl.
        jnc     $+4                     ; If no carry, don't change dph.
        inc     dph                     ; Store new dph.

movx    a,@dptr                 ; Current byte to be transmitted.
        mov     dptr,#THRB              ; Get the Transmit Holding Register
        movx    @dptr,a                 ; Transmit byte on UART channel B.

mov     dptr,#rpi_tx_buf_cnt    ; Check for last byte?
        movx    a,@dptr                 ; Get RPI Tx buffer count.
        xrl     a,r0
        jnz     tx_exit                 ; End of transmission (EOT) ?
                                        ; YES - End of Transmission clr     a
        mov     dptr,#rpi_rx_buf_cnt
        movx    @dptr,a                 ; rpi_rx_buf_cnt = 0 mov     dptr,#rpi_rx_state
        movx    @dptr,a                 ; rpi_rx_state = 0 (command exp.)

mov     dptr,#CRB               ; Get the Command Register
        mov     a,#09h                  ; Disable Tx & Enable Rx
        movx    @dptr,a
        mov     dptr,#CRB_shadow
        movx    @dptr,a                 ; Save command in CRB_shadow
        clr     RPI_tx_bit              ; Clear RPI Tx bit.

tx_exit:
        ljmp    sbint_exit              ; Exit from interrupt

;---------------------------------------------------------------------
; RPI_rx_ISR :
; -----------
; This routine receives an RPI message. The message format is :
;
;       Command   Length    Address   Data      LRC
;         Code     Exp?      Exp?     Size?     Exp?
;       -------   ------    -------   ----      ----
;       Login     Yes       No        Length    Yes
;       Read      Yes*      Yes       0         Yes
;       Write     Yes       Yes       Length    Yes
;       Execute   No        No        1         Yes
;       End       No        No        0         Yes
;
; * LENGTH is not the DATA field size
;
; Two timers are related to the RPI message reception.
; ---------------------------------------------------
; (1) - RPI_rx_MB_cnt
; (2) - RPI_rx_EOR_cnt
;
; These 2 timers are initiated by the RPI rx software and are checked for
; expiration by the 5_ms ISR routine.
;
; RPI_rx_MB_cnt
; -------------
; The role of this timer is to detect the following:
```

```
; - A valid command code has been received.
; - Message reception has been stopped in the middle for some reasons.
; MCP should be able to do the following:
; - Detect the above conditions.
; - Recover and be prepared to receive a new message.
;
; If this timer expires it means that End of Message has not been received
; due to a reception failure. MCP resets its receive driver and should be
; ready to receive a new message.
;
; RPI_rx_EOR_cnt
; --------------
; The role of this timer is to detect the following:
; - Frame error or RX buffer overflow is detected.
; MCP should be able to do the following:
; - Detect the above condition.
; - Recover and be prepared to receive a new message.
;
; If this timer expires, it means that reception of the current message has
; been stopped and MCP should be ready for a new message.
;
;         TIMER = RPI_rx_EOR_cnt (End Of Reception)
;         ------------------------------------------------
; Initiated By : Frame Error (FE), Break_end or RX buffer overflow.
; Restarted By : Error free char rcvd in rx_ignore state.
; Stopped  By : None.
; Expired  Act: Next state is som_exp_state.
;
;         TIMER = RPI_rx_MB_cnt (Message Break)
;         ------------------------------------------------
; Initiated By : Error free char && valid command code is received.
; Restarted By : Error free char rcvd in all state except rx_ignore_state.
; Stopped  By : Error free char rcvd in LRC_exp_state, Frame Error, Break_
;                start or RX buffer overflow.
; Expired  Act: Next state is som_exp_state, && rx_buf_cnt = 0
;
;
; When the timers are not running their value is 0. When they are running
; their value is 3 char time (100 ms).
;

rpi_rx_isr:                                 ; Acc contains the Rx status byte
        mov     r1,a                        ; Save status in R1 mov     dptr,#RHRB                  ; Received Holding Register
        movx    a,@dptr                     ; Get the rcvd char
        mov     r0,a                        ; Save rcvd char in R0 mov     a,r1                        ; Get the Rx status byte
        jb      acc.4,overrun_err           ; overrun error
        jb      acc.6,frame_err             ; frame error
        jb      acc.7,break_start           ; Start of break detected sjmp    rpi_rx_ok                   ; OK - no Rx error break_end:                                  ; End of Break detected
        mov     dptr,#CRB                   ; Get Command Register
        mov     a,#59h                      ; Reset Break, Enable Rx, Disable Tx
        movx    @dptr,a
        mov     dptr,#CRB_shadow
        movx    @dptr,a                     ; Save command in CRB_shadow mov     dptr,#rpi_rx_state
        movx    a,@dptr                     ; Get the RX state
        jnz     break_end1                  ; If state != SOM, Abort current message
        ljmp    sbint_exit                  ; If state = SOM exit break_end1:                                 ; Abort current message
        mov     a,#RPI_break_err
        mov     dptr,#rpi_nack_cause
        movx    @dptr,a                     ; rpi_nack_cause = RPI_break_err mov     a,#rpi_ignore_state
        mov     dptr,#rpi_rx_state
```

```
                movx    @dptr,a                         ; rpi_rx_state = rpi_ignore_state
                mov     RPI_rx_EOR_cnt,#11              ; Start 100ms countdown to detect EOR
                ljmp    sbint_exit overrun_err:                                            ; Rx overrun error
                mov     dptr,#CRB                       ; Get Command Register
                mov     a,#4Ah                          ; Reset Rx errors, Disable Rx & Tx
                movx    @dptr,a
                mov     dptr,#CRB_shadow
                movx    @dptr,a                         ; Save command in CRB_shadow
                mov     r3,#RPIrx_ovrun_ERR             ; Jump to error_handler
                ljmp    error_handler frame_err:                                              ; Char Frame Error
                mov     dptr,#CRB                       ; Get Command Register
                mov     a,#49h                          ; Reset Rx errors, Enable Rx, Disable Tx
                movx    @dptr,a
                mov     dptr,#CRB_shadow
                movx    @dptr,a                         ; Save command in CRB_shadow mov     dptr,#rpi_rx_state
                movx    a,@dptr                         ; Get the RX state
                jnz     frame_err1                      ; If state != SOM, Abort current message
                ljmp    sbint_exit                      ; If state = SOM exit frame_err1:
                clr     a                               ; Abort current message
                mov     RPI_rx_MB_cnt,a                 ; Stop the MB timer
                mov     a,#RPI_frame_err
                mov     dptr,#rpi_nack_cause
                movx    @dptr,a                         ; rpi_nack_cause = RPI_frame_err mov     a,#rpi_ignore_state
                mov     dptr,#rpi_rx_state
                movx    @dptr,a                         ; rpi_rx_state = rpi_ignore_state
                mov     RPI_rx_EOR_cnt,#11              ; Start 100ms timer to detect an EOR
                ljmp    sbint_exit                      ; Exit break_start:                                            ; Start of Break detected
                clr     a
                mov     RPI_rx_MB_cnt,a                 ; Stop the MB timer
                mov     RPI_rx_EOR_cnt,a                ; Stop the EOR timer mov     dptr,#CRB                       ; Get Command Register
                mov     a,#59h                          ; Reset Break, Enable Rx, Disable Tx
                movx    @dptr,a
                mov     dptr,#CRB_shadow
                movx    @dptr,a                         ; Save command in CRB_shadow
                                                        ; Stay in the same state
                                                        ; Wait for Break_End interrupt
                ljmp    sbint_exit                      ; Exit rpi_rx_ok:                                              ; Rx_ready - no Rx errors
                mov     dptr,#rpi_rx_state              ; If Rx state = IGNORE, dont check buffer overflow
                movx    a,@dptr
                cjne    a,#rpi_ignore_state,rpi_rx_ok2
                sjmp    rpi_rx_ok3 rpi_rx_ok2:                                             ; Check for Rx buffer overflow
                mov     dptr,#rpi_rx_buf_cnt
                movx    a,@dptr
                inc     a                               ; New Rx buffer count
                movx    @dptr,a                         ; Store new Rx buffer count
                dec     a                               ; Current Buffer count
                mov     r1,a                            ; Save current Rx buffer count in R1 xrl     a,#rpi_rx_buf_size              ; Compare against the Rx buffer size
                jnz     $+4                             ; Buffer overflow error ?
                sjmp    rpi_rx_b_overflow               ; YES -

; NO - Buffer is OK
                mov     a,r1                            ; Get current buffer count
                mov     dptr,#rpi_rx_buf
                add     a,dpl                           ; Calculate the addr of the loc.
                mov     dpl,a
                jnc     $+4                             ; to store the rcvd byte
                inc     dph                             ; Update DPH
```

```
            mov     a,r0                        ; Get the rcvd char
            movx    @dptr,a                     ; Store rcvd char in buffer rpi_rx_ok3:
            mov     dptr,#rpi_rx_state          ; Where should I go ?
            movx    a,@dptr                     ; Get the Rx state
            mov     r1,a                        ; Save Rx state in R1
            clr     c                           ; Clear carry
            subb    a,#7                        ; If state > 6 --> invalid value.
            jc      rpi_rx_ok1                  ; Is state valid ?
            mov     r3,#RPIrx_state_ERR         ; No - Invalid state value !
            ljmp    error_handler               ; Go to error_handler rpi_rx_ok1:
            mov     dptr,#rx_jmp_tbl            ; Load RX jump table address.
            mov     a,r1                        ; Get rx state value.
            rl      a                           ; Clalulate the table offset
            rl      a                           ; Offset = state * 4.
            jmp     @a+dptr                     ; Jump to execute a step routine.

rpi_rx_b_overflow:                              ; Rx buffer overflow
            clr     a
            mov     RPI_rx_MB_cnt,a             ; Stop the MB timer mov     a,#RPI_rx_message_overflow_err
            mov     dptr,#rpi_nack_cause
            movx    @dptr,a                     ; rpi_nack_cause = rpi_message_overflow _err mov     a,#rpi_ignore_state
            mov     dptr,#rpi_rx_state
            movx    @dptr,a                     ; Rx next state = rpi_ignore_state
            mov     RPI_rx_EOR_cnt,#11          ; Start 100ms Timer to detect EOR
            ljmp    sbint_exit rx_jmp_tbl:
            ljmp rpi_som_exp                    ; Start Of Message (SOM) expected.
            db   0
            ljmp rpi_length_exp                 ; Length byte expected.
            db   0
            ljmp rpi_addr_1_exp                 ; Address (first byte) expected.
            db   0
            ljmp rpi_addr_2_exp                 ; Address (second byte) expected.
            db   0
            ljmp  rpi_data_exp                  ; Data bytes expected.
            db    0
            ljmp rpi_lrc_exp                    ; LRC byte expected.
            db   0
            ljmp rpi_ignore                     ; Ignore any rcvd bytes.

;------------------------------------------------------------------------
; Start Of Message (SOM) is expected.
; Received byte should contain a valid "RPI Command" code (1 - 5).
;
rpi_som_exp:
            mov     a,r0                        ; Get the command code
            dec     a                           ; Command code (0 base)
            clr     c                           ; Clear carry
            subb    a,#5                        ; If code > 5 --> invalid value.
            jc      rpi_som_ok                  ; If carry - command code is valid rpi_som_not_ok:                                 ; Invalid Command code !
            clr     a
            mov     dptr,#rpi_rx_buf_cnt
            movx    @dptr,a                     ; Rpi_rx_buf_cnt = 0
            ljmp    sbint_exit                  ; Invalid Host Command Code rpi_som_ok:                                     ; Valid Command code
            mov     RPI_rx_MB_cnt,#11           ; Start 100ms Timer to detect Message Break
            mov     a,#RPI_message_continuation_err
            mov     dptr,#rpi_nack_cause
            movx    @dptr,a                     ; Nack_cause = RPI_message_continuation_err
            clr     RPI_skip_data_bit           ; Clear skip_data bit
```

```
        clr     RPI_skip_addr_bit       ; Clear skip_Addr bit
        clr     RPI_write_bytes_bit     ; Clear write_bytes bit clr     a
        mov     dptr,#rpi_rx_lrc
        movx    @dptr,a                 ; RPI_rx_LRC = 0.
        mov     a,r0                    ; Move received char to Acc.
        mov     r5,a                    ; Move char to R5
        call    lrc_val                 ; Calculate Rx LRC mov     a,r0                    ; Get Command code
        dec     a                       ; Command code (0 based)
        rl      a                       ; Offset = offset*2.
        mov     dptr,#som_jmp_tbl       ; Load jump table address.
        jmp     @a+dptr                 ; Jump to execute a step routine.
som_jmp_tbl:
        sjmp    login                   ; LOGIN command.
        sjmp    read_bytes              ; READ_bytes command.
        sjmp    write_bytes             ; WRITE_bytes command.
        sjmp    execute_func            ; EXECUTE_function command.
        sjmp    end_session             ; END_session command.

login:                                  ; LOGIN COMMAND
        setb    RPI_skip_addr_bit       ; Skip the Address field.
        mov     a,#rpi_length_exp_state
        mov     dptr,#rpi_rx_state
        movx    @dptr,a                 ; Next state = Length_exp.
        ljmp    sbint_exit              ; Exit the ISR read_bytes:                             ; READ_bytes COMMAND
        setb    RPI_skip_data_bit       ; Skip the data field.
        mov     dptr,#rpi_rx_state
        mov     a,#rpi_length_exp_state
        movx    @dptr,a                 ; Next state = Length_exp.
        ljmp    sbint_exit              ; Exit the ISR write_bytes:                            ; WRITE_bytes COMMAND
        setb    RPI_write_bytes_bit
        mov     dptr,#rpi_rx_src_addr   ; Set source address for the write.
        mov     a,#HIGH(rpi_rx_buf+4)   ; Data Field
        movx    @dptr,a                 ; Store low byte of source addr.
        inc     dptr
        mov     a,#LOW(rpi_rx_buf+4)
        movx    @dptr,a                 ; Store high byte of source addr.

mov     a,#rpi_length_exp_state
        mov     dptr,#rpi_rx_state
        movx    @dptr,a                 ; Next state = Length_exp.
        ljmp    sbint_exit              ; Exit from the ISR execute_func:                           ; EXECUTE_func command
        mov     dptr,#rpi_rx_data_len
        mov     a,#1
        movx    @dptr,a                 ; Data_length = 1.
        mov     a,#rpi_data_exp_state
        mov     dptr,#rpi_rx_state
        movx    @dptr,a                 ; Next state = Data_exp.
        ljmp    sbint_exit end_session:                            ; END_session command
        mov     a,#rpi_lrc_exp_state
        mov     dptr,#rpi_rx_state
        movx    @dptr,a                 ; Next state = LRC_expected.
        ljmp    sbint_exit ;--------------------------------------------------------------------
; RPI rx length field is expected.
; Length field is not present in EXECUTE_func or END_session messages.
; Length field is present in READ_bytes, However does not represent the size
; of the DATA field
;
rpi_length_exp:
        mov     RPI_rx_MB_cnt,#11       ; Start 100ms Timer to detect Message Break
        mov     a,#RPI_message_continuation_err
        mov     dptr,#rpi_nack_cause
```

```
movx    @dptr,a              ; Nack_cause = RPI_message_continuation_err
mov     dptr,#rpi_rx_lrc
mov     a,r0                 ; Move received char to r0.
mov     r5,a                 ; Move value to r5
call    lrc_val              ; Calculate the Rx LRC
mov     dptr,#rpi_rx_data_length
mov     a,r0
movx    @dptr,a              ; Rpi_rx_data_length = rcvd char.
mov     dptr,#rpi_rx_data_len
movx    @dptr,a mov     dptr,#rpi_rx_state   ; Assume 'Dont Skip Address Field'
mov     a,#rpi_addr_1_exp_state ; Therefore next state = addr_exp.

jnb     RPI_skip_addr_bit,dont_skip_addr ; Skip address ?
mov     a,#rpi_data_exp_state   ; Skip addr, next state = Data_exp.

dont_skip_addr:
movx    @dptr,a              ; Next state = Addr_exp or Data_Exp.
ljmp    sbint_exit           ; Exit the ISR
```

What is claimed is:

1. A method of operating a cellular telephone system to program software feature switches in a mobile telephone, comprising the steps of:

(a) operating a host computer to initiate a first call to the mobile telephone, thereby causing a cell site facility to broadcast an initiate signal via a control channel;

(b) operating a first processor in the mobile telephone to monitor the control channel and generate an alert signal in the mobile telephone in response to the initiate signal;

(c) generating a first answer signal in the mobile telephone if an operator answers the first call in response to the alert signal;

(d) operating the first processor to effectuate broadcasting of a first acknowledge signal via the control channel in response to the first answer signal, to thereby cause the cell site facility to complete a voice channel connection between a modem associated with the host computer and the mobile telephone;

(e) operating a tone generator associated with the host computer to generate a distinct tone on the voice channel connection;

(f) detecting the distinct tone on the voice channel connection in the mobile telephone;

(g) operating the first processor to cause the mobile telephone to broadcast a second acknowledge signal to the host computer in response to the detecting;

(h) operating the host computer to effectuate broadcasting of feature switch data via the voice channel connection in response to the second acknowledge signal;

(i) operating the first processor to write feature switch data received via the voice channel connection into a plurality of the software feature switches in the mobile telephone, wherein the feature switch data includes first feature switch data to prevent a user from placing a call with the mobile telephone;

(j) operating the first processor in response to the first feature switch data to prevent the user from placing a call to a user-selected telephone number with the mobile telephone, wherein the feature switch data includes second feature switch data to cause any call attempted to be made from the mobile telephone to be forwarded to a telephone having a predetermined telephone number, the second feature data including the selected telephone number;

(k) operating the first processor to effectuate forwarding a call placed on the mobile telephone to the telephone having the predetermined telephone number; and (l) operating the first processor to self-initiate calls to the host computer by auto-dialing a telephone number of the modem associated with the host computer in response to a timing circuit in the mobile telephone.

2. The method of claim 1 including operating the first processor to read stored feature switch data in the mobile telephone, and operating the first processor to cause the mobile telephone to broadcast the stored feature switch data over the voice channel connection, and operating the host processor to effectuate reading of the broadcast feature switch data from the voice channel connection.

3. The method of claim 1 wherein the feature switch data includes a password code, the method including causing the host computer to broadcast a password corresponding to the password code, and operating the first processor to effectuate reading of the broadcast password and comparing it to the password code and obtaining a match therebetween before step (g).

4. The method of claim 1 wherein step (e) includes operating a second processor in an adapter containing the tone generator to cause the tone generator to generate the distinct tone, the distinct tone being different than any tone utilized in touch tone dialing.

5. The method of claim 1 including operating the first processor to read a value of a timer, compare the value of the timer to a previously stored value of the timer, and self-initiate the call if the value of the timer exceeds the prior value by a predetermined amount.

6. The method of claim 1 including operating the first processor to read a value of a first timer and a second timer, compare the value of the first timer to the value of the second timer, and self-initiate the call if the value of the first timer exceeds the value of the second timer by a predetermined amount, wherein the first timer is a cumulative call timer and the second timer is a cumulative report update timer.

7. The method of claim 1 wherein step (g) includes broadcasting the second acknowledge signal via the voice channel connection.

8. A system for programming software feature switches stored in a first processor in a mobile telephone, comprising in combination:

(a) a host computer;

(b) means for operating the host computer to initiate a first call to the mobile telephone, thereby causing a cell site facility to broadcast an initiate signal via a control channel;

(c) means for operating the first processor in response to the initiate signal to cause the mobile telephone to monitor the control channel;

(d) generating an alert signal in the mobile telephone;

(e) means for generating a first answer signal in the mobile telephone if a user answers the first call in response to the alert signal;

(f) means for operating the first processor to broadcast a first acknowledge signal via the control channel in response to the first answer signal, to thereby cause the cell site facility to complete a voice channel connection between the mobile telephone and a modem of the host computer;

(g) tone generating means responsive to the host computer for generating a distinct tone;

(h) means for broadcasting the distinct tone via the voice channel;

(i) means in the mobile telephone for receiving the distinct tone via the voice channel connection and detecting the distinct tone received via the voice channel connection;

(j) means for operating the first processor to cause the mobile telephone to send a second acknowledge signal to the host computer in response to the detecting;

(k) means for operating the host computer to broadcast feature switch data via the voice channel connection in response to the second acknowledge signal;

(l) means for operating the first processor to write feature switch data received via the voice channel connection into a plurality of the software feature switches in the mobile telephone;

(m) an EEPROM coupled to the first processor and storing the software feature switches;

(n) a PROM coupled to the first processor and storing a plurality of software feature routines executable by the first processor if the software feature switches, respectively, are set, wherein a first software feature routine is stored in the PROM and is executed by the first processor to prevent the user from placing a call from the mobile telephone if a software feature switch corresponding to the first software feature routine is set, and wherein a second software feature routine is stored in the PROM and is executed by the first processor to forward any call attempted to be made from the mobile telephone to a predetermined telephone if a software feature switch corresponding to the second software feature routine is set;

(o) a timer circuit in the mobile telephone coupled to the first processor; and (p) means in the first processor responsive to the timer circuit for automatically initiating a call to the host computer.

9. The system of claim 8 wherein the second processor and the modem are included in an adapter including a UART coupling the host computer to the modem, the modem coupling the UART to the cell site facility via land side telephone lines, the adapter including a tone generator operative in response to the second processor to generate a distinct tone that is different than any tone used in tone telephone dialing, the system including means for sending the distinct tone to the cell site facility via the voice channel.

10. The system of claim 9 wherein the tone generator generates first and second tones of first and second frequencies, respectively, and the tone detecting means produces a tone detect signal only if both the first and second tones are detected by the tone detecting means, and the first processor causes the second acknowledge signal to be sent in response to the tone detect signal.

11. The system of claim 8 including means in the first processor for reading stored feature switch data in the mobile telephone and means for operating the first processor to effectuate broadcasting of the stored feature switch data from the mobile telephone via the voice channel connection, and means for operating the host processor to effectuate reading of the broadcast feature switch data received via the voice channel connection from the mobile telephone.

12. The system of claim 8 wherein the feature switch data includes a password code, the system including means for operating the host computer to broadcast a password corresponding to the password code, and means in the mobile telephone to effectuate operating the first processor to read the broadcast password and compare it to the password code, and means responsive to the comparing means for preventing broadcasting of the second acknowledge signal if the broadcast password does not match the password code.

13. The system of claim 8 including an adapter coupling the host computer to the cell site facility, the adapter including the tone generating means, a second processor, and means for operating the second processor to cause the tone generating means to generate the distinct tone such that the distinct tone is different than any tone used in touch tone dialing.

14. The system of claim 8 including means in the mobile telephone for causing the first processor to self-initiate a call to the host computer by auto dialing a telephone number of the modem associated with the host computer.

15. The system of claim 8 including means for sending the second acknowledge signal to the host computer via the voice channel connection in response to the detecting.

* * * * *